(12) United States Patent
Pachter et al.

(10) Patent No.: US 8,321,250 B2
(45) Date of Patent: Nov. 27, 2012

(54) ARCHITECTURAL DESIGN FOR SELL FROM STOCK APPLICATION SOFTWARE

(75) Inventors: Nir Pachter, Moshav Gealia (IL); Thomas Bach, Muehlhausen (DE); Cordula Ude, Muehlhausen (DE); Tao Yu, Wiesloch (DE); Stefan Adelmann, Mannheim (DE); Rainer Heun, Reilingen (DE); Katja Kasteleiner, Mannheim (DE); Andrea Sudbrack, Heidelberg (DE); Steffen Hartig, Nussloch (DE); Ralf Reinke, Rauenberg (DE); Thomas Breitling, Edingen-Neckarhausen (DE); Sandra Boehringer, Erlenbach (DE); Daniel Pascariu, Heidelberg (DE); Theo Zimmermann, Foster City, CA (US); Martin Von Der Emde, Wiesloch (DE); Frank Krueger, Heidelberg (DE); Andreas Huppert, Neulussheim (DE); Andreas Bettin, Bad Schoenborn (DE); Renzo Colle, Stutensee (DE); Jochen Hirth, Weinheim (DE); Thomas Hoffmann, Roemerberg (DE); Alexander Krasinskiy, Sandhausen (DE); Irena Kull, Yehud (IL); Klaus Reinelt, Kraichtal (DE); Jochen Steinbach, Bad Schoenborn (DE); Stephan Hetzer, Oestringen-Eichelberg (DE)

(73) Assignee: SAP AG, Walldorf (DE)

( * ) Notice: Subject to any disclaimer, the term of this patent is extended or adjusted under 35 U.S.C. 154(b) by 695 days.

(21) Appl. No.: 12/233,417

(22) Filed: Sep. 18, 2008

(65) Prior Publication Data
US 2010/0070317 A1    Mar. 18, 2010

(51) Int. Cl.
G06Q 10/00    (2006.01)

(52) U.S. Cl. .................................................. 705/7.11

(58) Field of Classification Search .................... None
See application file for complete search history.

(56) References Cited

U.S. PATENT DOCUMENTS
4,947,321 A    8/1990    Spence et al.
(Continued)

FOREIGN PATENT DOCUMENTS
WO    00/023874    4/2000
(Continued)

OTHER PUBLICATIONS

"American Software Announces ASP Pricing Model for It's a-Applications Expense Business Solution"; PR Newswire; Mar. 6, 2000; 2 pages.

(Continued)

Primary Examiner — Johnna Loftis
Assistant Examiner — Brett Feeney
(74) Attorney, Agent, or Firm — Fish & Richardson P.C.

(57) ABSTRACT

Methods, systems, and apparatus, including computer program products, for implementing a software architecture design for a software application implementing sell from stock software useful to process quotations, capture orders, process delivery and invoice. The application is structured as multiple process components interacting with each other through service interfaces, and multiple service operations, each being implemented for a respective process component. The process components include an Accounting process component; a Financial Accounting Master Data Management process component; an Outbound Delivery Processing process component; a Site Logistics Processing process component; an Inventory Processing process component; a Customer Requirement Processing process component; a Supply and Demand Matching process component; a Logistics Execution Control process component; a Due Item Processing process component; a Balance of Foreign Payment Management process component; a Payment Processing process component; a Customer Invoice Processing process component; a Customer Quote Processing process component; and a Sales Order Processing process component.

18 Claims, 37 Drawing Sheets

U.S. PATENT DOCUMENTS

| | | | | |
|---|---|---|---|---|
| 5,550,734 | A | 8/1996 | Tarter et al. | |
| 5,560,005 | A | 9/1996 | Hoover et al. | |
| 5,586,312 | A | 12/1996 | Johnson et al. | |
| 5,632,022 | A | 5/1997 | Warren et al. | |
| 5,634,127 | A | 5/1997 | Cloud et al. | |
| 5,680,619 | A | 10/1997 | Gudmundson et al. | |
| 5,704,044 | A | 12/1997 | Tarter et al. | |
| 5,710,917 | A | 1/1998 | Musa et al. | |
| 5,768,119 | A | 6/1998 | Havekost et al. | |
| 5,822,585 | A | 10/1998 | Nobel et al. | |
| 5,832,218 | A | 11/1998 | Gibbs et al. | |
| 5,848,291 | A | 12/1998 | Milne et al. | |
| 5,867,495 | A | 2/1999 | Elliott et al. | |
| 5,881,230 | A | 3/1999 | Christensen et al. | |
| 5,893,106 | A | 4/1999 | Brobst et al. | |
| 5,918,219 | A | 6/1999 | Isherwood | |
| 5,987,247 | A | 11/1999 | Lau | |
| H001830 | H | 1/2000 | Petrimoulx et al. | |
| 6,028,997 | A | 2/2000 | Leymann et al. | |
| 6,049,838 | A | 4/2000 | Miller et al. | |
| 6,070,197 | A | 5/2000 | Cobb et al. | |
| 6,151,582 | A | 11/2000 | Huang et al. | |
| 6,167,563 | A * | 12/2000 | Fontana et al. | 717/107 |
| 6,167,564 | A | 12/2000 | Fontana et al. | |
| 6,177,932 | B1 | 1/2001 | Galdes et al. | |
| 6,182,133 | B1 | 1/2001 | Horvitz | |
| 6,208,345 | B1 | 3/2001 | Sheard et al. | |
| 6,272,672 | B1 | 8/2001 | Conway | |
| 6,311,170 | B1 | 10/2001 | Embrey | |
| 6,338,097 | B1 | 1/2002 | Krenzke et al. | |
| 6,424,991 | B1 | 7/2002 | Gish | |
| 6,434,740 | B1 | 8/2002 | Monday et al. | |
| 6,442,748 | B1 | 8/2002 | Bowman-Amuah | |
| 6,445,782 | B1 | 9/2002 | Elfe et al. | |
| 6,446,045 | B1 | 9/2002 | Stone et al. | |
| 6,446,092 | B1 | 9/2002 | Sutter | |
| 6,473,794 | B1 | 10/2002 | Guheen et al. | |
| 6,493,716 | B1 | 12/2002 | Azagury et al. | |
| 6,571,220 | B1 | 5/2003 | Ogino et al. | |
| 6,594,535 | B1 | 7/2003 | Constanza | |
| 6,601,233 | B1 * | 7/2003 | Underwood | 717/102 |
| 6,601,234 | B1 | 7/2003 | Bowman-Amuah | |
| 6,606,744 | B1 | 8/2003 | Mikurak | |
| 6,609,100 | B2 | 8/2003 | Smith et al. | |
| 6,671,673 | B1 * | 12/2003 | Baseman et al. | 705/7.26 |
| 6,678,882 | B1 | 1/2004 | Hurley et al. | |
| 6,687,734 | B1 | 2/2004 | Sellink et al. | |
| 6,691,151 | B1 | 2/2004 | Cheyer et al. | |
| 6,721,783 | B1 | 4/2004 | Blossman et al. | |
| 6,738,964 | B1 | 5/2004 | Zink et al. | |
| 6,747,679 | B1 | 6/2004 | Finch et al. | |
| 6,750,885 | B1 | 6/2004 | Finch et al. | |
| 6,764,009 | B2 | 7/2004 | Melick et al. | |
| 6,772,216 | B1 | 8/2004 | Ankireddipally et al. | |
| 6,789,252 | B1 | 9/2004 | Burke et al. | |
| 6,847,854 | B2 | 1/2005 | Discenzo | |
| 6,859,931 | B1 | 2/2005 | Cheyer et al. | |
| 6,889,197 | B2 * | 5/2005 | Lidow | 705/5 |
| 6,889,375 | B1 | 5/2005 | Chan et al. | |
| 6,895,438 | B1 | 5/2005 | Ulrich | |
| 6,898,783 | B1 | 5/2005 | Gupta et al. | |
| 6,904,399 | B2 | 6/2005 | Cooper et al. | |
| 6,907,395 | B1 | 6/2005 | Hunt et al. | |
| 6,954,736 | B2 * | 10/2005 | Menninger et al. | 705/28 |
| 6,985,939 | B2 | 1/2006 | Fletcher et al. | |
| 6,990,466 | B1 | 1/2006 | Hu | |
| 7,003,474 | B2 | 2/2006 | Lidow | |
| 7,031,998 | B2 | 4/2006 | Archbold | |
| 7,043,448 | B2 | 5/2006 | Campbell | |
| 7,047,518 | B2 | 5/2006 | Little et al. | |
| 7,050,056 | B2 | 5/2006 | Meyringer | |
| 7,050,873 | B1 | 5/2006 | Discenzo | |
| 7,055,136 | B2 | 5/2006 | Dzoba et al. | |
| 7,058,587 | B1 | 6/2006 | Horne | |
| 7,069,536 | B2 | 6/2006 | Yaung | |
| 7,072,855 | B1 | 7/2006 | Godlewski et al. | |
| 7,076,766 | B2 | 7/2006 | Wirts et al. | |
| 7,117,447 | B2 | 10/2006 | Cobb et al. | |
| 7,120,597 | B1 * | 10/2006 | Knudtzon et al. | 705/30 |
| 7,120,896 | B2 | 10/2006 | Budhiraja et al. | |
| 7,131,069 | B1 | 10/2006 | Rush et al. | |
| 7,155,409 | B1 | 12/2006 | Stroh | |
| 7,181,694 | B2 | 2/2007 | Reiss et al. | |
| 7,184,964 | B2 | 2/2007 | Wang | |
| 7,194,431 | B1 * | 3/2007 | Land et al. | 705/30 |
| 7,197,740 | B2 | 3/2007 | Beringer et al. | |
| 7,200,569 | B2 * | 4/2007 | Gallagher et al. | 705/31 |
| 7,206,768 | B1 * | 4/2007 | deGroeve et al. | 705/54 |
| 7,216,091 | B1 | 5/2007 | Blandina et al. | |
| 7,219,107 | B2 | 5/2007 | Beringer | |
| 7,222,786 | B2 | 5/2007 | Renz et al. | |
| 7,225,240 | B1 | 5/2007 | Fox et al. | |
| 7,249,044 | B2 * | 7/2007 | Kumar et al. | 705/7.25 |
| 7,257,254 | B2 | 8/2007 | Tunney | |
| 7,283,973 | B1 | 10/2007 | Loghmani et al. | |
| 7,293,254 | B2 | 11/2007 | Bloesch et al. | |
| 7,299,970 | B1 | 11/2007 | Ching | |
| 7,315,830 | B1 | 1/2008 | Wirtz et al. | |
| 7,324,966 | B2 | 1/2008 | Scheer | |
| 7,353,180 | B1 | 4/2008 | Silverstone et al. | |
| 7,356,492 | B2 | 4/2008 | Hazi et al. | |
| 7,367,011 | B2 | 4/2008 | Ramsey et al. | |
| 7,370,315 | B1 | 5/2008 | Lovell et al. | |
| 7,376,601 | B1 | 5/2008 | Aldridge | |
| 7,376,604 | B1 | 5/2008 | Butcher | |
| 7,376,632 | B1 | 5/2008 | Sadek et al. | |
| 7,383,201 | B2 | 6/2008 | Matsuzaki et al. | |
| 7,386,833 | B2 | 6/2008 | Granny et al. | |
| 7,406,716 | B2 | 7/2008 | Kanamori et al. | |
| 7,415,697 | B1 | 8/2008 | Houlding | |
| 7,418,409 | B1 | 8/2008 | Goel | |
| 7,418,424 | B2 | 8/2008 | Martin et al. | |
| 7,448,022 | B1 | 11/2008 | Ram et al. | |
| 7,451,432 | B2 | 11/2008 | Shukla et al. | |
| 7,461,030 | B2 | 12/2008 | Hibler et al. | |
| 7,469,233 | B2 | 12/2008 | Shooks et al. | |
| 7,516,088 | B2 | 4/2009 | Johnson et al. | |
| 7,523,054 | B2 | 4/2009 | Tyson-Quah | |
| 7,529,699 | B2 * | 5/2009 | Fuse et al. | 705/30 |
| 7,536,325 | B2 * | 5/2009 | Randell et al. | 705/30 |
| 7,536,354 | B1 * | 5/2009 | deGroeve et al. | 705/54 |
| 7,546,520 | B2 * | 6/2009 | Davidson et al. | 715/200 |
| 7,546,575 | B1 | 6/2009 | Dillman et al. | |
| 7,565,640 | B2 | 7/2009 | Shukla et al. | |
| 7,624,371 | B2 | 11/2009 | Kulkarni et al. | |
| 7,631,291 | B2 | 12/2009 | Shukla et al. | |
| 7,640,195 | B2 * | 12/2009 | Von Zimmermann et al. | 705/30 |
| 7,640,291 | B2 | 12/2009 | Maturana et al. | |
| 7,644,390 | B2 * | 1/2010 | Khodabandehloo et al. | 717/105 |
| 7,657,406 | B2 | 2/2010 | Tolone et al. | |
| 7,657,445 | B1 | 2/2010 | Goux | |
| 7,665,083 | B2 | 2/2010 | Demant et al. | |
| 7,668,761 | B2 | 2/2010 | Jenkins et al. | |
| 7,672,888 | B2 | 3/2010 | Allin et al. | |
| 7,681,176 | B2 | 3/2010 | Wills et al. | |
| 7,693,586 | B2 | 4/2010 | Dumas et al. | |
| 7,703,073 | B2 | 4/2010 | Illowsky et al. | |
| 7,739,160 | B1 | 6/2010 | Ryan et al. | |
| 7,742,985 | B1 * | 6/2010 | Digrigoli et al. | 705/39 |
| 7,747,980 | B2 | 6/2010 | Illowsky et al. | |
| 7,765,156 | B2 * | 7/2010 | Staniar et al. | 705/40 |
| 7,765,521 | B2 | 7/2010 | Bryant | |
| 7,788,145 | B2 | 8/2010 | Wadawadigi et al. | |
| 7,797,698 | B2 | 9/2010 | Diament et al. | |
| 7,814,142 | B2 | 10/2010 | Mamou et al. | |
| 7,822,682 | B2 * | 10/2010 | Arnold et al. | 705/39 |
| 7,835,971 | B2 * | 11/2010 | Stockton et al. | 705/37 |
| 7,904,350 | B2 | 3/2011 | Ayala et al. | |
| 7,925,985 | B2 | 4/2011 | Moore | |
| 2001/0052108 | A1 | 12/2001 | Bowman-Amuah | |
| 2002/0026394 | A1 * | 2/2002 | Savage et al. | 705/34 |
| 2002/0042756 | A1 * | 4/2002 | Kumar et al. | 705/26 |
| 2002/0049622 | A1 * | 4/2002 | Lettich et al. | 705/7 |
| 2002/0073114 | A1 | 6/2002 | Nicastro et al. | |
| 2002/0078046 | A1 | 6/2002 | Uluakar et al. | |
| 2002/0082892 | A1 | 6/2002 | Raffel et al. | |
| 2002/0103660 | A1 * | 8/2002 | Cramon et al. | 705/1 |

| | | |
|---|---|---|
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1* | 10/2002 | Scheer ............... 705/9 |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0093268 A1 | 5/2004 | Ramchandani et al. |
| 2004/0111304 A1 | 6/2004 | Meka et al. |
| 2004/0111639 A1 | 6/2004 | Schwartz et al. |
| 2004/0128180 A1* | 7/2004 | Abel et al. ............... 705/9 |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1* | 9/2004 | Grounds ............... 705/31 |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1* | 9/2005 | Ballow et al. ............... 705/35 |
| 2005/0216325 A1 | 9/2005 | Ziad et al. |
| 2005/0222896 A1 | 10/2005 | Rhyne et al. |
| 2005/0235020 A1 | 10/2005 | Gabelmann et al. |
| 2005/0240592 A1 | 10/2005 | Mamou et al. |
| 2005/0246250 A1* | 11/2005 | Murray ............... 705/30 |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156430 A1 | 7/2007 | Kaetker et al. |
| 2007/0156475 A1* | 7/2007 | Berger et al. ............... 705/7 |
| 2007/0156476 A1* | 7/2007 | Koegler et al. ............... 705/7 |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1* | 7/2007 | Merkel et al. ............... 705/9 |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Moosmann et al. |
| 2007/0233539 A1 | 10/2007 | Suenderhauf et al. |
| 2007/0233541 A1 | 10/2007 | Schorr et al. |
| 2007/0233574 A1* | 10/2007 | Koegler et al. ............... 705/26 |
| 2007/0233575 A1 | 10/2007 | Berger et al. |
| 2007/0233598 A1 | 10/2007 | Der Emde et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265862 A1* | 11/2007 | Freund et al. ............... 705/1 |
| 2008/0004929 A9 | 1/2008 | Raffel et al. |
| 2008/0017722 A1 | 1/2008 | Snyder et al. |
| 2008/0027831 A1 | 1/2008 | Gerhardt |
| 2008/0065437 A1* | 3/2008 | Dybvig ............... 705/7 |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2009/0037287 A1 | 2/2009 | Baitalmal et al. |
| 2009/0037492 A1 | 2/2009 | Baitalmal et al. |
| 2009/0171716 A1 | 7/2009 | Suenderhauf et al. |
| 2009/0171818 A1 | 7/2009 | Penning et al. |
| 2009/0172699 A1 | 7/2009 | Jungkind et al. |
| 2009/0189743 A1 | 7/2009 | Abraham et al. |
| 2009/0192858 A1 | 7/2009 | Johnson |
| 2010/0070324 A1* | 3/2010 | Bock et al. ............... 705/8 |
| 2010/0070331 A1 | 3/2010 | Koegler et al. |
| 2010/0070336 A1* | 3/2010 | Koegler et al. ............... 705/10 |
| 2010/0070395 A1 | 3/2010 | Elkeles et al. |
| 2010/0070555 A1 | 3/2010 | Duparc et al. |

| | | | |
|---|---|---|---|
| 2010/0100464 A1 | 4/2010 | Ellis et al. | |
| 2010/0138269 A1 | 6/2010 | Cirpus et al. | |
| 2011/0252395 A1 | 10/2011 | Charisius et al. | |

FOREIGN PATENT DOCUMENTS

| | | |
|---|---|---|
| WO | WO 2004/083984 | 9/2004 |
| WO | WO 2005/114381 | 12/2005 |

OTHER PUBLICATIONS

Bastani et al.; "Complex Open System Design by Quasi Agents: Process Oriented Modeling in Agent Based Systems"; ACM SIGSOFT; vol. 34, No. 4; 2009; pp. 1-14.

Bastani et al.; "Process Oriented Abstraction of the Complex Evolvable Systems: Problem Model Construction"; ACM SIGSOFT; vol. 33, No. 3; 2008; pp. 1-13.

Cascallar, Eduardo et al.; "Assessment in the Evaluation of Self-Regulation as a Process"; Educational Psychology Review; vol. 18, No. 3; Sep. 2006; pp. 297-306.

"Cendant Announces Comprehensive Online Travel Booking to Meet President Bush's eTravel Initiative"; PR Newswire; Jul. 9, 2002; 3 pages.

Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.

Cool, David W.; "Activity Fund Accounting"; School Business Affairs; vol. 49, No. 6; Jun. 1983; pp. 50-52.

Duc et al.; "Uniform Object Modeling Methodology and Reuse of Real Time System Using UML"; EMSOFT '05; Sep. 19-22, 2005; pp. 44-47.

Gomaa et al.; "Model Based Software Design and Adaption"; International Workshop on Software Engineering for Adaptive and Self-Managing Systems (SEAMS '07); IEEE; 2007; 10 pages.

Huang, S. et al.; "Computer-Assisted Supply Chain Configuration Based on Supply Chain Operations Reference (SCOR) Model"; Computers & Industrial Engineering 48; 2005; pp. 377-394.

Intuit Canada Ltd.; "Startup Guide—QuickBooks Basic for Windows, QuickBooks Pro for Windows, QuickBooks Premier for Windows"; 2002; 230 pages.

Lambert et al.; "Supply Chain Metrics"; International Journal of Logistics Management; vol. 12, No. 1; 2001; pp. 1-19.

Lockamy III, et al.; "Linking SCOR Planning Practices to Supply Chain Performance"; International Journal of Operationgs & Production Management; vol. 24, No. 12; pp. 1192-1218.

mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.

"Oracle Expands E-Commerce Offerings with the Acquisition of E-Travel, Inc."; PR Newswire; Mar. 9, 1999; 3 pages.

Ouyang et al.; "From Business Process Models to Process Oriented Software Systems"; ACM Transactions on Software Engineering and Methodology; vol. 19, No. 1, Article 2; Aug. 2009; pp. 1-37.

Rossi et al.; "Designing and Architecturing Process-aware Web Applications with EPML"; SAC '08; Mar. 16-20, 2008; pp. 2409-2414.

"SAP Delivers Next-generation ERP to Customers"; PR Newswire; New York; Mar. 10, 2005; 7 pages.

Schultz, G.J.; "Keeping SCOR on Your Supply Chain: Basic Operations Reference Model Updates with the Times"; Information Strategy: The Executive's Journal; Summer 2003; pp. 12-20.

Stephens, S.; "Supply Chain Council & Supply Chain Operations Reference (SCOR) Model Overview"; <http://www.supply-chain.org>; Version 5.0a; Aug. 2001; 29 pages.

Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.

"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.

Vogel et al.; "mySAP ERP for Dummies"; Published on Sep. 30, 2005; Downloaded on Mar. 23, 2001 from <http://proquest.safaribooksonline.com/9780764599958> 41 pages.

International Search Report and Written Opinion of the International Searching Authority issued in International Application No. PCT/EP2007/002841; Aug. 16, 2007; 12 pages.

International Preliminary Report on Patentability under Chapter I issued in International Application No. PCT/EP2007/002841; Sep. 30, 2008; 8 pages.

Office Action issued in U.S. Appl. No. 11/396,312 on Mar. 30, 2010; 23 pages.

Office Action issued in U.S. Appl. No. 11/396,312 on Sep. 10, 2010; 23 pages.

Office Action issued in U.S. Appl. No. 11/322,611 on Mar. 31, 2010; 17 pages.

Office Action issued in U.S. Appl. No. 11/322,611 on Sep. 16, 2010; 21 pages.

Notice of Allowance issued in U.S. Appl. No. 11/322,610 on Mar. 1, 2010; 12 pages.

Notice of Allowance issued in U.S. Appl. No. 11/322,610 on Jun. 14, 2010; 6 pages.

Notice of Allowance issued in U.S. Appl. No. 11/322,610 on Sep. 23, 2010; 6 pages.

Office Action issued in U.S. Appl. No. 11/322,772; Jul. 12, 2010; 18 pages.

Office Action issued in U.S. Appl. No. 11/322,398 on Apr. 2, 2010; 39 pages.

Notice of Allowance issued in U.S. Appl. No. 11/322,398 on Jul. 23, 2010; 38 pages.

Office Action issued in U.S. Appl. No. 11/322,398 on Oct. 29, 2010; 18 pages.

Office Action issued in U.S. Appl. No. 11/322,383; May 12, 2010; 23 pages.

Office Action issued in U.S. Appl. No. 11/322,382 on Mar. 29, 2010; 28 pages.

Notice of Allowance issued in U.S. Appl. No. 11/322,382 on Sep. 20, 2010; 6 pages.

Office Action issued in U.S. Appl. No. 11/323,041 on Mar. 19, 2010; 26 pages.

Advisory Action issued in U.S. Appl. No. 11/323,041 on Jun. 7, 2010; 3 pages.

Notice of Allowance issued in U.S. Appl. No. 11/396,259 on Mar. 29, 2010; 19 pages.

Notice of Allowance issued in U.S. Appl. No. 11/396,259 on Jul. 6, 2010; 6 pages.

Notice of Allowance issued in U.S. Appl. No. 11/396,259 on Oct. 15, 2010; 6 pages.

Notice of Allowance issued in U.S. Appl. No. 11/396,288; May 20, 2010; 15 pages.

Notice of Allowance issued in U.S. Appl. No. 11/396,288; Sep. 24, 2010; 4 pages.

Office Action issued in U.S. Appl. No. 11/396,250 on Oct. 18, 2010; 15 pages.

Notice of Allowance issued in U.S. Appl. No. 11/396,258 on Mar. 31, 2010; 9 pages.

Supplemental Notice of Allowance issued in U.S. Appl. No. 11/396,258 on May 19, 2010; 8 pages.

Notice of Allowance issued in U.S. Appl. No. 11/396,258 on Jul. 28, 2010; 9 pages.

Office Action issued in U.S. Appl. No. 11/396,236 on Mar. 31, 2010; 20 pages.

Office Action issued in U.S. Appl. No. 11/396,236 on Oct. 28, 2010; 19 pages.

Office Action issued in U.S. Appl. No. 11/323,039; Apr. 14, 2010; 15 pages.

Office Action issued in U.S. Appl. No. 11/322,851; May 12, 2010; 15 pages.

Office Action issued in U.S. Appl. No. 11/322,845; Jul. 15, 2010; 16 pages.

Office Action issued in U.S. Appl. No. 11/323,040; Apr. 29, 2010; 17 pages.

Office Action issued in U.S. Appl. No. 11/323,040 on Nov. 5, 2010; 33 pages.

Office Action issued in U.S. Appl. No. 11/322,612; Apr. 1, 2010; 23 pages.
Advisory Action issued in U.S. Appl. No. 11/322,612; Jun. 24, 2010; 3 pages.
Notice of Allowance issued in U.S. Appl. No. 11/397,026 on Mar. 29, 2010; 17 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 12/233,554 on May 14, 2010; 11 pages.
Notice of Allowance issued in U.S. Appl. No. 12/233,554 on Sep. 17, 2010; 10 pages.
Notice of Allowance issued in U.S. Appl. No. 11/968,054 on Sep. 7, 2010; 11 pages.
Office Action issued in U.S. Appl. No. 12/233,557 on Sep. 16, 2010; 16 pages.
Notice of Allowance issued in U.S. Appl. No. 12/233,534 on Jun. 24, 2010; 15 pages.
Notice of Allowance issued in U.S. Appl. No. 12/233,534 on Oct. 20, 2010; 15 pages.
Notice of Allowance issued in U.S. Appl. No. 12/327,354 on Jun. 25, 2010; 16 pages.
Notice of Allowance issued in U.S. Appl. No. 12/327,354 on Oct. 18, 2010; 16 pages.
Notice of Allowance issued in U.S. Appl. No. 11/967,865 on Mar. 31, 2010; 16 pages.
Notice of Allowance issued in U.S. Appl. No. 11/967,865 on Oct. 6, 2010; 6 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 11/967,483; Aug. 20, 2010; 10 pages.
Office Action issued in U.S. Appl. No. 12/333,085; Mar. 23, 2010; 5 pages.
Notice of Allowance issued in U.S. Appl. No. 12/333,085; Sep. 13, 2010; 8 pages.
Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.
Arch-int, S. et al.; "Development of Industrial Information Systems on the Web Using Busienss Components"; Computers in Industry; vol. 60; 2003; pp. 231-250.
Astudillo, H.; "How Conceptual System Architecture Leads to Business Process"; ACM; 2000; pp. 35-36.
Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.
Cowan, D.D. et al.; "Application Integration: Constructing Composite Applications from Interactive Components"; Software Practice and Experience; vol. 23, No. 3; Mar. 1993; pp. 255-275.
Deimel, A.; "The SAP R/3 Business Framework"; Software—Concepts & Tools; vol. 19, No. 1; 1998; pp. 29-36.
Fellner, K.J., et al.; "Classification Framework for Business Components"; System Sciences; Proceedings of the 33rd Annual Hawaii International Conference; Jan. 2000; pp. 3239-3248.
Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.
Gauthier, P. and OSS-J Architecture Board; "OSS through Java (TM) J2EE Design Guidelines"; [online]; Oct. 31, 2001; http://www.ossj.org/downloads/design_guidelines.shtml.
Gessford, J.E.; "Object-Oriented System Design"; Emerging Information Technologies for Competitive Advantage and Economic Development; Proceedings of the 1992 Information Resources Management Association International Conference; 1992; pp. 110-118.
He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.
Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.
Kythe, D.K.; "The Promise of Distributed Business Components"; Bell Labs Technical Journal; vol. 75, No. 2; Mar./Apr. 1999; pp. 20-28.
Linthicum, D.S.; "Chapter 9: RPCs, Messaging, and B2B Application Integration"; B2B Application Integration: E-Business Enable Your Enterprise; 2001; pp. 167-181.
Nori A.K. et al.; "Composite Applications: Process Based Application Development"; Lecture Notes in Computer Science; vol. 2444; Aug. 2003; pp. 48-53.
Pilhofer, F.; "Writing and Using CORBA Components"; Apr. 2002; http://www.fpx.de/MicoCCM/download/mico-ccm.pdf; 17 pages.
Ravichandran, T.; "Special Issue on Component-Based Software Development"; The Data Base for Advances in Information Systems; 2003; pp. 45-46.
SAP AG; "Designing Cross Solutions"; SAP XAPPS, [online]; Sep. 2003; pp. 1-2; http://www.sap.com/belux/platform/netweaver/pdf/BWP_CAF.pdf.
Schmid, H.A.; "Business Entity Components and Buisness Process Components"; Joop; vol. 12, No. 6; Oct. 1999; pp. 6-10, 12-15.
Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.
Singh, I. et al.; "Designing Enterprise Applications with the J2EE Platform, Second Edition"; Jun. 15, 2002.
Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
Vergil Technology Ltd.; "Vergil Composite Application Builder Suite"; Product Datasheet [online]; 2003; pp. 1-5; http://www.webservicesmall.com.docs/VCAB_datasheet.pdf.
Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.
Office Action issued in U.S. Appl. No. 11/396,288; Apr. 15, 2008; 26 pages.
Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports™ 13,000 MAS 90® for Windows® Shipments in First Nine Months of Availability"; PR Newswire; Apr. 28, 1997.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyer's Guide to Software for Purchasing 2000.(Directory)"; Purchasing, vol. 129, No. 1; p. 179; Jul. 13, 2000.
"Hudson's Bay Company Realizes Fast ROI with the Oracle E-Business Suite"; PR Newswire; New York; Jan. 15, 2002; p. 1.
Office Action issued in U.S. Appl. No. 11/397,029; Jul. 21, 2009;28 pages.
Office Action issued in U.S. Appl. No. 11/323,040; Jul. 24, 2009; 35 pages.

Office Action issued in U.S. Appl. No. 11/323,590; Jul. 10, 2009; 32 pages.
Office Action issued in U.S. Appl. No. 11/322,816; Jul. 23, 2006; 41 pages.
Office Action issued in U.S. Appl. No. 11/322,851; Sep. 2, 2009; 32 pages.
Office Action issued in U.S. Appl. No. 11/323,590; Dec. 30, 2009; 31 pages.
Office Action issued in U.S. Appl. No. 11/322,482; Jan. 7, 2010; 19 pages.
Office Action issued in U.S. Appl. No. 11/322,772; Dec. 9, 2009; 14 pages.
Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.
Bin et al.; "Component Model Optimization for Distributed Real-Time Embedded Software"; IEEE International Conference on Systems, Man and Cybernetics; Oct. 13, 2004; 6 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Papazoglou et al; "Service-Oriented Computing Research Road Map"; http://infolab.uvt.nl/pub/papazogloump-2006-96.pdf; Mar. 1, 2006; 29 pages.
SAP AG; "SAP NetWeaver Visual Composer: User Guide (SAP NetWeaver Visual Composer release 6.0)"; Document version 1.1; pp. 1-208.
SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.
Strelich, Thomas P. et al.; "Simulation-Based Transformation with the Service Integration/Interoperation Infrastructure"; Technology Review Journal; Fall/Winter 2005; pp. 99-115.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Notice of Allowanced issued in U.S. Appl. No. 11/322,398 on Nov. 15, 2010; 20 pages.
Notice of Allowanced issued in U.S. Appl. No. 11/322,398 on May 27, 2011; 21 pages.
Notice of Allowance issued in U.S. Appl. No. 1/322,382 on Jan. 6, 2011; 7 pages.
Notice of Allowance issued in U.S. Appl. No. 11/396,259 on Jan. 20, 2011; 6 pages.
Notice of Allowance issued in U.S. Appl. No. 11/396,288; Dec. 28, 2010; 4 pages.

Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,258 on Nov. 16, 2010; 8 pages.
Notice of Allowance issued in U.S. Appl. No. 11/396,258 on Jun. 28, 2011; 9 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Office Action issued in U.S. Appl. No. 12/233,550 on Jan. 12, 2011; 29 pages.
Notice of Allowance issued in U.S. Appl. No. 12/233,550 on May 11, 2011; 20 pages.
Office Action issued in U.S. Appl. No. 11/323,634 on Apr. 29, 2011; 8 pages.
Office Action issued in U.S. Appl. No. 12/233,557 on Mar. 4, 2011; 19 pages.
Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Appl. No. 12/327,354 on Feb. 1, 2011; 16 pages.
Office Action issued in U.S. Appl. No. 11/322,973 on Dec. 7, 2010; 13 pages.
Office Action issued in U.S. Appl. No. 11/322,973 on May 27, 2011; 15 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Notice of Allowance issued in U.S. Appl. No. 12/233,462 on Feb. 2, 2011; 11 pages.
Notice of Allowance issued in U.S. Appl. No. 12/233,462 on May 18, 2011; 6 pages.
Office Action issued in U.S. Appl. No. 12/233,457 on May 26, 2011; 19 pages.
Office Action issued in U.S. Appl. No. 11/967,483 on Mar. 4, 2011; 6 pages.
Office Action issued in U.S. Appl. No. 12/327,232 on May 26, 2011; 20 pages.
Office Action issued in U.S. Appl. No. 12/327,590 on Jun. 23, 2011; 16 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,489 on May 13, 2011; 15 pages.
Office Action issued in U.S. Appl. No. 11/967,393 on. Apr. 15, 2011; 12 pages.
Notice of Allowance issued in U.S. Appl. No. 11/967,865 on Jun. 24, 2011; 8 pages.
Finin et al.; "KQML as an Agent Communication Language"; retrieved on Jul. 26, 2011; pp. 456-463. <http://portal.acm.org/citation.cfm?id=191322>.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Office Action issued in U.S. Appl. No. 12/333,146 on Sep. 6, 2011; 21 pages.
Notice of Allowance issued in U.S. Appl. No. 11/396,327 on Sep. 28, 2011; 31 pages.
Office Action issued in U.S. Appl. No. 11/404,147 on Aug. 4, 2011; 26 pages.
Office Action issued in U.S. Appl. No. 12/233,479 on Oct. 27, 2011; 24 pages.
Office Action issued in U.S. Appl. No. 12/332,965 on Oct. 11, 2011; 6 pages.
Notice of Allowance issued in U.S. Appl. No. 12/233,462 on Sep. 2, 2011; 7 pages.
Office Action issued in U.S. Appl. No. 12/233,289 on Oct. 27, 2011; 15 pages.
Notice of Allowance issued in U.S. Appl. No. 12/233,457 on Nov. 3, 2011; 12 pages.
Notice of Allowance issued in U.S. Appl. No. 12/327,232 on Nov. 2, 2011; 16 pages.
Office Action issued in U.S. Appl. No. 12/327,701 on Nov. 8, 2011; 20 pages.
Office Action issued in U.S. Appl. No. 12/233,087 on Aug. 18, 2011; 42 pages.
Notice of Allowance issued in U.S. Appl. No. 11/322,382 on Jul. 25, 2011; 5 pages.
Notice of Allowanced issued in U.S. Appl. No. 11/322,398 on Oct. 18, 2011; 7 pages.
Office Action issued in U.S. Appl. No. 11/322,383 on May 12, 2010; 23 pages.
Office Action issued in U.S. Appl. No. 11/322,383 on Nov. 12, 2009; 23 pages.
Examiner's Answer to Appeal Brief issued in U.S. Appl. No. 11/396,236 on Nov. 10, 2011; 19 pages.
Notice of Allowance issued in U.S. Appl. No. 11/396,259 on Aug. 5, 2011; 7 pages.
Office Action issued in U.S. Appl. No. 11/396,288 on Oct. 17, 2011; 38 pages.
Office Action issued in U.S. Appl. No. 11/396,252 on Nov. 10, 2011; 18 pages.
Notice of Allowance issued in U.S. Appl. No. 11/322,851 on Sep. 2, 2011; 8 pages.
Notice of Allowance issued in U.S. Appl. No. 11/322,845; Nov. 13, 2011; 9 pages.
Office Action issued in U.S. Appl. No. 11/323,040 on Jul. 26, 2011; 34 pages.
Notice of Allowance issued in U.S. Appl. No. 11/397,026 on Jul. 20, 2011; 8 pages.
Notice of Allowance issued in U.S. Appl. No. 11/968,054 on Aug. 2, 2011; 5 pages.
Office Action issued in U.S. Appl. No. 12/233,458 on Oct. 12, 2011; 19 pages.
Office Action issued in U.S. Appl. No. 11/967,489 on Sep. 28, 2011; 7 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,890 on Jul. 15, 2011; 7 pages.

* cited by examiner

ARCHITECTURAL DESIGN FOR SELL FROM STOCK APPLICATION SOFTWARE

BACKGROUND

The subject matter of this patent application relates to computer software architecture, and, more particularly, to the architecture of application software for sell from stock.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application implementing sell from stock functionality.

In various aspects, the software architecture design can be implemented as methods, systems, and apparatus, including computer program products, for implementing a software architecture design for a software application implementing sell from stock software useful to process quotations, capture orders, process delivery and invoice. The application is structured as multiple process components interacting with each other through service operations, each implemented for a respective process component. The process components include an Accounting process component; a Financial Accounting Master Data Management process component; an Outbound Delivery Processing process component; a Site Logistics Processing process component; an Inventory Processing process component; a Customer Requirement Processing process component; a Supply and Demand Matching process component; a Logistics Execution Control process component; a Due Item Processing process component; a Balance of Foreign Payment Management process component; a Payment Processing process component; a Customer Invoice Processing process component; a Customer Quote Processing process component; and a Sales Order Processing process component.

The software architecture design can further be implemented as methods, systems, and apparatus, including computer program products, implementing a software architecture design for a software application that is adapted to interact with external software systems through the service operations described in reference to external process components, or a subcombination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

DETAILED DESCRIPTION

Figure 1:
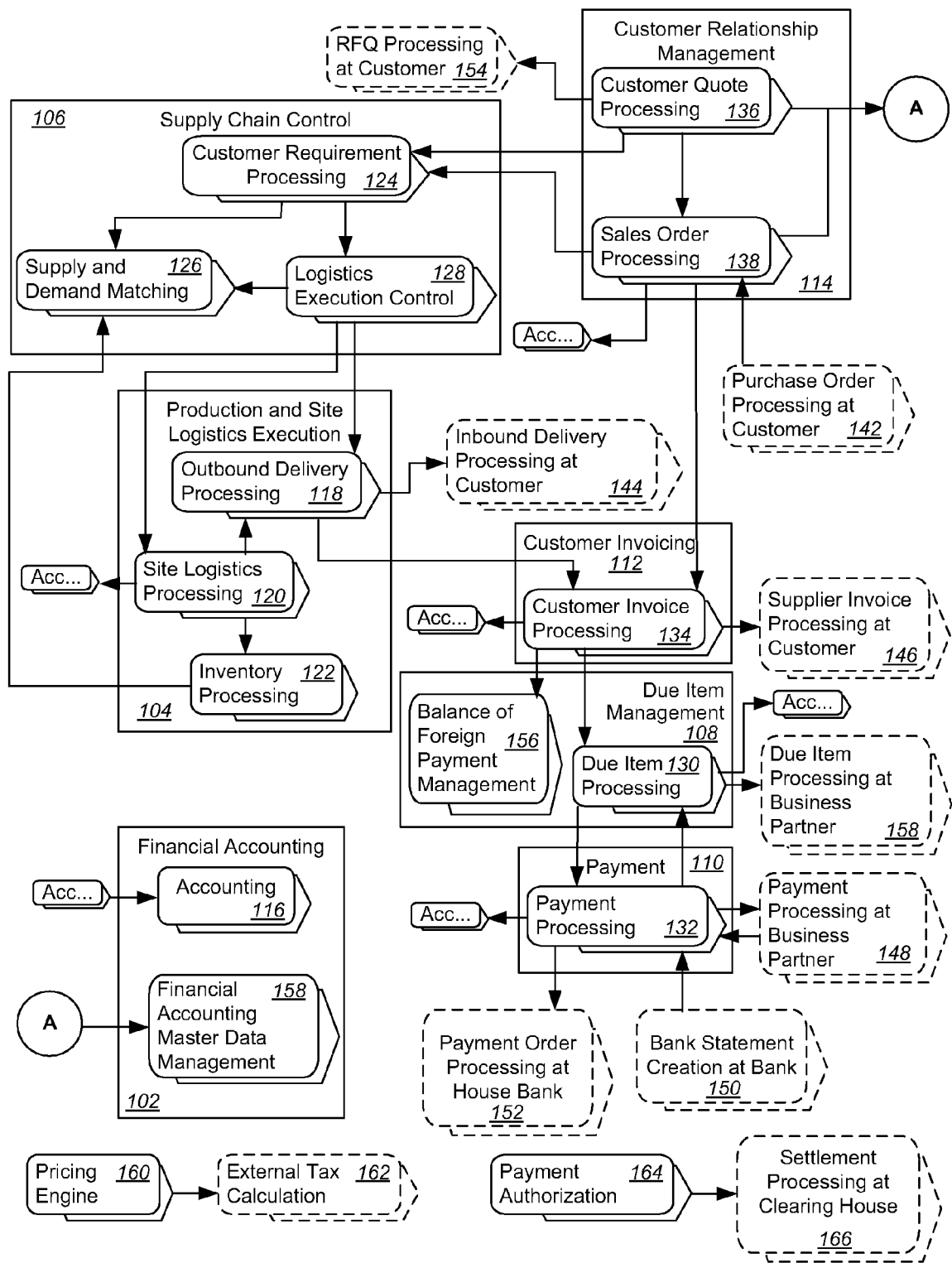
FIG. 1 is a block diagram of a software architectural design for a sell from stock software application.

FIG. 1 shows the software architectural design for a sell from stock software application. The sell from stock application is software that implements an end-to-end process used to sell materials from stock to customers. This includes processing customer quotes, planning, and executing sales orders. The materials provided are invoiced, and customers' payments are monitored. Accounting is continually updated throughout the integration scenario.

As shown in FIG. 1, the sell from stock design includes seven deployment units: a Financial Accounting deployment unit 102, a Production and Site Logistics Execution deployment unit 104, a Supply Chain Control deployment unit 106, a Due Item Management deployment unit 108, a Payment deployment unit 110, a Customer Invoicing deployment unit 112, and a Customer Relationship Management deployment unit 114.

The Financial Accounting deployment unit 102 includes two process components: an Accounting process component 116 that records all relevant business transactions for valuation and profitability analysis, and a Financial Accounting Master Data Management process component 158 that is responsible for the management of financial accounting master data that is used both for accounting and costing purposes.

The Production and Site Logistics Execution deployment unit 104 includes three process components: an Outbound Delivery Processing process component 118, a Site Logistics Processing process component 120, and an Inventory Processing process component 122.

The Outbound Delivery Processing process component 118 manages and processes the outbound delivery requirements for shipping goods to a product recipient. It combines document-based tasks for the outbound delivery process, and enables communication with the originating document (e.g., fulfillment), the product recipient, and invoicing.

The Site Logistics Processing process component 120 combines tasks concerning the preparation, physical execution, and confirmation of logistics processes within a site. Logistics processes, which are based on site logistics process models, include picking, packing, shipping, and receiving, as well as value added services.

The Inventory Processing process component 122 combines tasks required for the management of inventory and recording of inventory changes. The Inventory process component 122 can provide services to maintain current stock and handle unit content, logistics operating unit content and allocation content.

The Supply Chain Control deployment unit 106 includes three process components: a Customer Requirement Processing process component 124, a Supply and Demand Matching process component 126, and a Logistics Execution Control process component 128.

The Customer Requirement Processing process component 124 combines the tasks required for controlling customer requirements in the supply chain. This involves checking material availability, receiving, preparing, and passing customer requirements on to supply planning and logistics, and providing feedback on fulfillment.

The Supply and Demand Matching process component 126 combines all the tasks necessary to ensure that sufficient material receipt elements exist to cover material demand, while taking available capacity into account. For example, the supply and demand matching component may collect all the various material demands from customer requirement processing, in-house requirement processing, demand forecast processing and sales scheduling agreement processing and attempt to assign all the existing material receipts. The matching component may also plan the internal or external procurement of further material receipts where necessary.

The Logistics Execution Control process component 128 creates, controls and monitors the supply chain execution activities necessary for the fulfillment of an order on a macro logistics level. It triggers the necessary site logistics activities and receives information about the supply chain execution progress. For example, sales order activities or purchase order activities may be controlled and monitored by the logistics execution control process component. The Logistics Execution Control process component 128 sends information to the logistics execution to trigger the necessary supply chain execution activities, receives information about supply chain execution progress, and updates data relevant for both fulfillment and supply and demand planning.

The Due Item Management deployment unit 108 includes a Due Item Processing process component 130 and a Balance of Foreign Payment Management process component 156. The Due Item Processing process component 130 is used for the collection, management and monitoring of trade receivables or payables and corresponding sales or withholding tax. The Balance of Foreign Payment Management process component 156 is used for the collection, processing, and reporting of receivables and payables according to foreign trade regulations that are required by the central banks to create the balance of payments of a country.

The Payment deployment unit 110 includes a Payment Processing process component 132. The Payment Processing process component 132 combines all the tasks necessary for the processing and management of all payments. Payment Processing is also responsible for the associated communication with financial institutions such as banks, and provides the primary input for liquidity management.

The Customer Invoicing deployment unit 112 includes a Customer Invoice Processing process component 134 that is used for invoicing a customer for the delivery of goods or the provision of services.

The Customer Relationship Management deployment unit 114 includes two process components: a Customer Quote Processing process component 136, and a Sales Order Processing process component 138.

The Customer Quote Processing process component 136 is used to process quotes to customers offering the delivery of goods according to specific terms.

The Sales Order Processing process component 138 handles customers' requests to a seller for the delivery of goods on a specific date, for a specific quantity, and for a specific price. For example, a sales area receives the request and is then responsible for fulfilling the contract.

The foundation layer, described below, includes a Pricing Engine process component 162 and a Payment Authorization process component 164. The Pricing Engine process component 162 processes price and tax calculations. The Payment Authorization process component 164 represents a reusable service that is used to process the authorization request for a payment made using a payment card at the clearing house, for example, to authorize the payment for goods or services purchased from an online store using a credit card.

A number of external process components, described below, will be used to describe the architectural design. These include a Purchase Order Processing at Customer process component 142, an Inbound Delivery Processing at Customer process component 144, a Supplier Invoice Processing at Customer process component 146, a Payment Processing at Business Partner process component 148, a Bank Statement Creation at Bank process component 150, a Payment Order Processing at House Bank process component 152, an RFQ Processing at Customer process component 154, a Due Item Processing at Business Partner process component 158, an External Tax Calculation process component 162, and a Settlement Processing at Clearing House process component 166.

Figure 2:
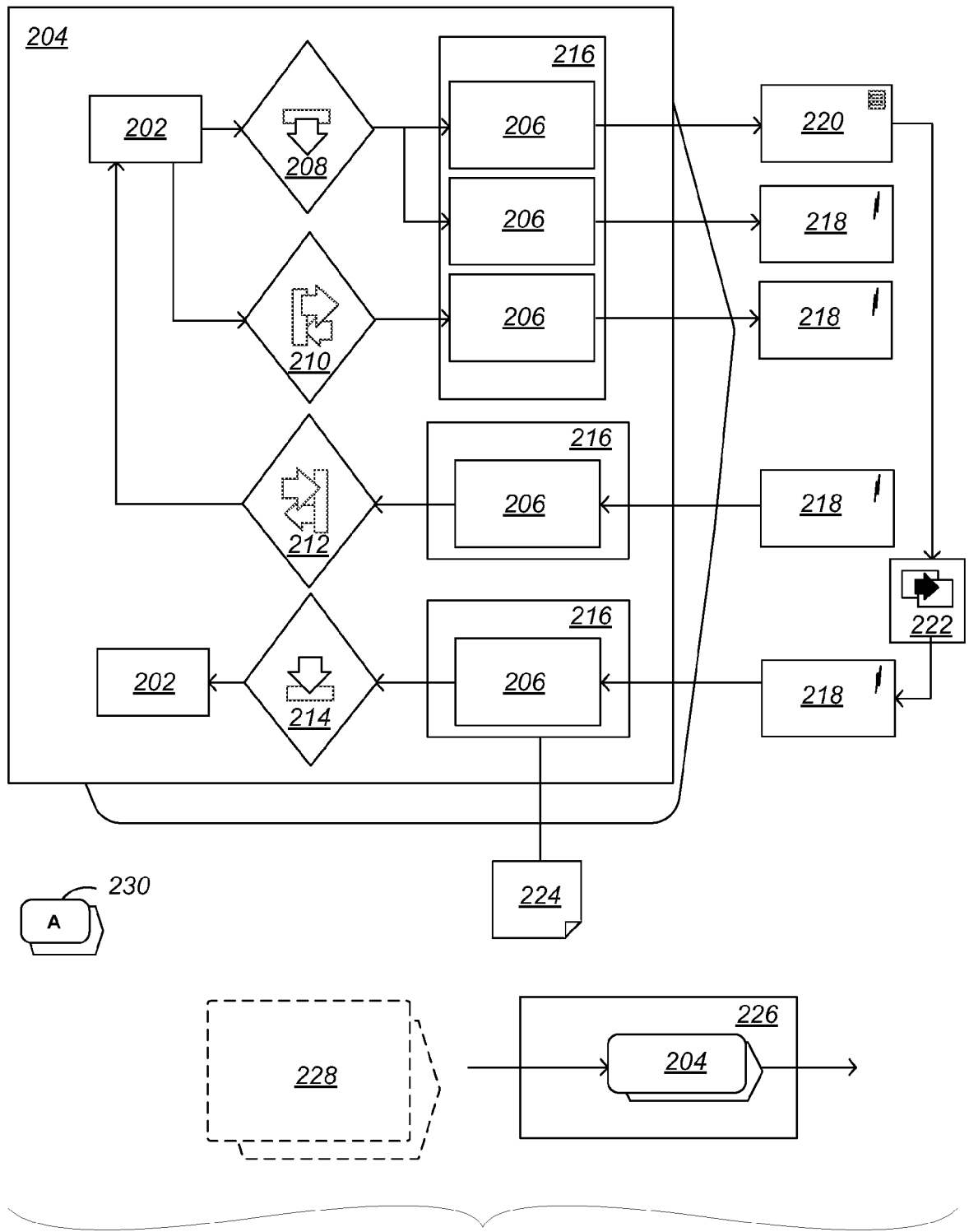
FIG. 2 illustrates the elements of the architecture as they are drawn in the figures.

FIG. 2 illustrates the elements of the architecture as they are drawn in the figures of this patent application. The elements of the architecture include the business object 202, the process component 204, the operation 206, the outbound process agent 208, the synchronous outbound process agent 210, the synchronous inbound process agent 212, the inbound process agent 214, the service interface or interface 216, the message 218, the form message 220, the mapping entity 222, the communication channel template 224, and the deployment unit 226.

Not explicitly represented in the figures is a foundation layer that contains all fundamental entities that are used in multiple deployment units 226. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

A process component of an external system is drawn as a dashed-line process component 228. Such a process component 228 represents the external system in describing interactions with the external system; however, the process component 228 need not represent more of the external system than is needed to produce and receive messages as required by the process component that interacts with the external system.

The connector icon 230 is used to simplify the drawing of interactions between process components 204. Interactions between process component pairs 204 involving their respective business objects 202, process agents (at 208, 210, 212, and 214), operations 206, interfaces 216, and messages (at 218 and 22) are described as process component interactions, which determine the interactions of a pair of process components across a deployment unit boundary, i.e., from one deployment unit 226 to another deployment unit 226. Interactions between process components 204 are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components 204, but interfaces 216, process agents (at 208, 210, 212, and 214), and business objects 202 that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component 204 is described as being contained in a deployment unit 226. It should be understood, however, that such operational inclusion can be realized in a variety of ways and is not limited to a physical inclusion of the entirety of one element in another.

The architectural elements include the business object 202. A business object 202 is a representation of a type of a uniquely identifiable business entity (an object instance) described by a structural model. Processes operate on business objects. This example business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component 204, is an object that encapsulates transactional data (i.e., data that is valid for a point in time). The term business object will be used generically to refer to a business process object and a master data object, unless the context requires otherwise. Properly implemented, business objects 202 are implemented free of redundancies.

The architectural elements also include the process component 204. A process component 204 is a software package that realizes a business process and generally exposes its functionality as services. The functionality includes the ability to perform all or parts of particular kinds of business transactions. A process component 204 contains one or more semantically related business objects 202. Any business object belongs to no more than one process component. Process components can be categorized as a standard process component, a process component at a business partner, a third party process component, or a user centric process component. The standard process component (named simply process component) is a software package that realizes a business process and exposes its functionality as services. The process component at a business partner is a placeholder for a process component (or other technology that performs the essential functions of the process component) used at a business partner. The third party process component is a process component (or other technology that performs the essential functions of the process component) provided by a third party. The user centric process component is a process component containing user interface parts.

Process components 204 are modular and context-independent. That they are context-independent means that a process component 204 is not specific to any specific application and is reusable. The process component 204 is often the smallest (most granular) element of reuse in the architecture.

The architectural elements also include the operation 206. An operation 206 belongs to exactly one process component 204. A process component 204 generally is able to perform multiple operations 206. Operations 206 can be synchronous or asynchronous, corresponding to synchronous or asynchronous process agents (e.g. at 208, 210, 212, and 214), which will be described below. Operation 206 may be the smallest, separately-callable function, described by a set of data types used as input, output, and fault parameters serving as a signature.

The architectural elements also include the service interface 216, referred to simply as the interface. An interface 216 is a named group of operations 206. Interface 216 typically specifies inbound service interface functionality or outbound service interface functionality. Each operation 206 belongs to exactly one interface 216. An interface 216 belongs to exactly one process component 204. A process component 204 might contain multiple interfaces 216. In some implementations, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations 206 directed to the same other process component 204 are in one interface 216.

The architectural elements also include the message 218. Operations 206 transmit and receive messages 218. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component. In some implementations, the message is a form based message 220 that can be translated into a recognized format for an external process component 228. The form message type 220 is a message type used for documents structured in forms. The form message type 220 can be used for printing, faxing, emailing, or other events using documents structured in forms. In some implementations, the form message type 220 provides an extended signature relative to the normal message type. For example, the form message type 220 can include text information in addition to identification information to improve human reading.

The architectural elements also include the process agent (e.g. at 208, 210, 212, and 214). Process agents do business processing that involves the sending or receiving of messages 218. Each operation 206 will generally have at least one associated process agent. The process agent can be associated with one or more operations 206. Process agents (at 208, 210, 212, and 214) can be either inbound or outbound, and either synchronous or asynchronous.

Asynchronous outbound process agents 208 are called after a business object 202 changes, e.g., after a create, update, or delete of a business object instance. Synchronous outbound process agents 210 are generally triggered directly by a business object 202.

An outbound process agent (208 and 210) will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents (212 and 214) are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents (210 and 212) are used when a process component requires a more or less immediate response from another process component, and is waiting for that response to continue its work.

Operations and process components are described in this specification in terms of process agents. However, in alternative implementations, process components and operations can be implemented without use of agents by using other conventional techniques to perform the functions described in this specification.

The architectural elements also include the communication channel template. The communication channel template is a modeling entity that represents a set of technical settings used for communication. The technical settings can include details for inbound or outbound processing of a message. The details can be defined in the communication channel template. In particular, the communication channel template defines an adapter type, a transport protocol, and a message protocol. In some implementations, various other parameters may be defined based on a selected adapter type. For example, the communication channel template can define a security level, conversion parameters, default exchange infrastructure parameters, processing parameters, download URI parameters, and specific message properties.

The communication channel template 224 can interact with internal or external process components (at 204 and 228). To interact with an internal process component, the communication channel template is received and uploaded to be used with an operation and interface pair. To interact with an external process component, the communication channel template is received and uploaded to be used with an external entity, such as an external bank, business partner, or supplier.

The architectural elements also include the deployment unit 226. A deployment unit 226 includes one or more process components 204 that are deployed together on a single computer system platform. Conversely, separate deployment units can be deployed on separate physical computing systems. For this reason, a boundary of a deployment unit 226 defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components 204 of one instance of one deployment unit 226.

The process components 204 of one deployment unit 226 interact with those of another deployment unit 226 using messages 218 passed through one or more data communication networks or other suitable communication channels. Thus, a deployment unit 226 deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units 226 is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components 204 that interact with other process components 204 or external systems only through messages 218, e.g., as sent and received by operations 206, can also be replaced as long as the replacement supports the operations 206 of the original 204.

In contrast to a deployment unit 226, the foundation layer does not define a limit for application-defined transactions. Deployment units 226 communicate directly with entities in the foundation layer, which communication is typically not message based. The foundation layer is active in every system instance on which the application is deployed. Business objects 202 in the foundation layer will generally be master data objects. In addition, the foundation layer will include some business process objects that are used by multiple deployment units 226. Master data objects and business process objects that should be specific to a deployment unit 226 are assigned to their respective deployment unit 226.

Interactions Between Process Components "Bank Statement Creation at Bank" and "Payment Processing"

Figure 3:
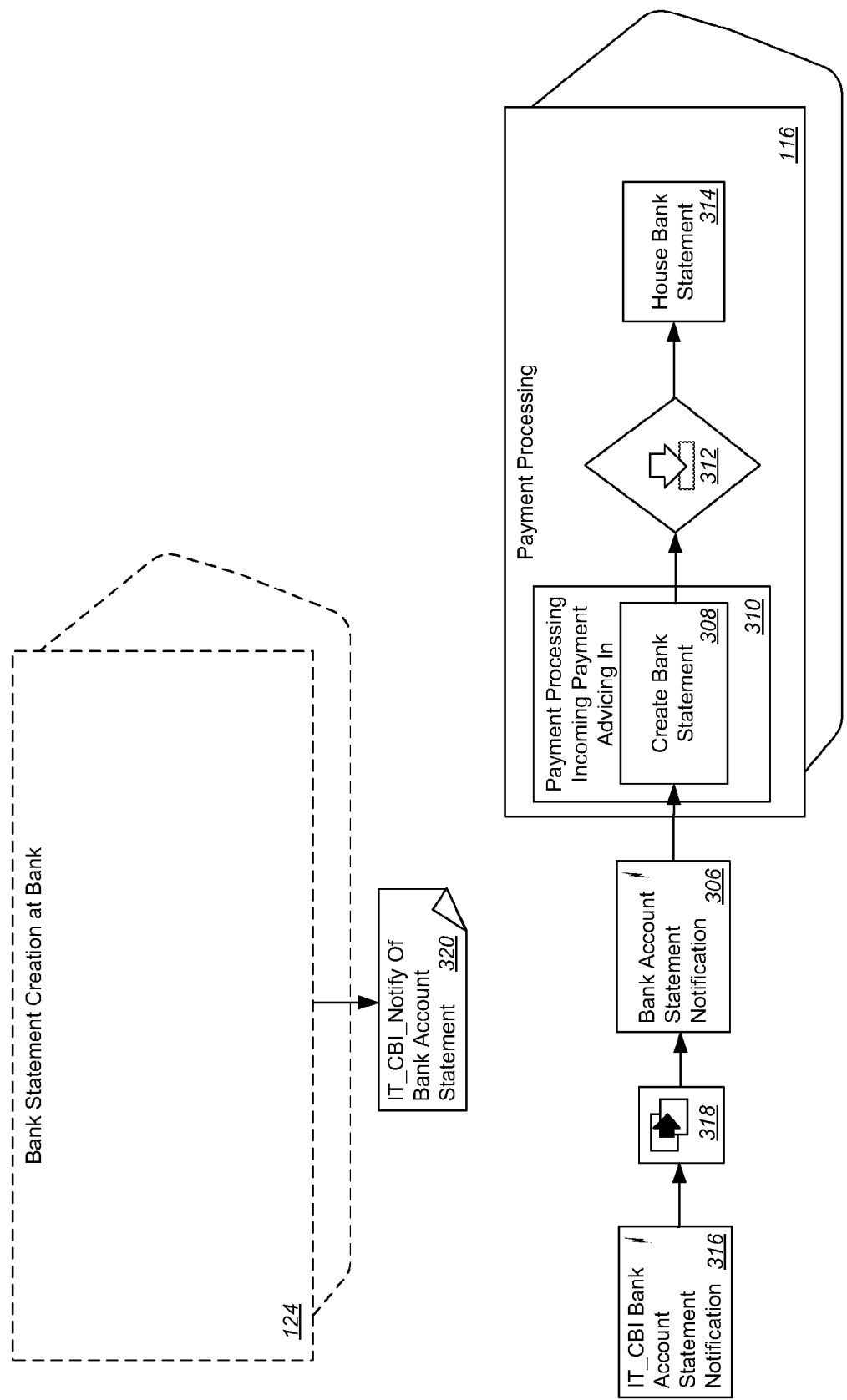
FIG. 3 is a block diagram showing interactions between a Bank Statement Creation at Bank process component and a Payment Processing process component.

FIG. 3 is a block diagram showing interactions between the Bank Statement Creation at Bank process component 124 and the Payment Processing process component 116 in the architectural design of FIG. 1. The interactions start when a bank statement is created at a bank. The Bank Statement Creation at Bank process component 124 notifies the Payment Processing process component 116 about transactions on a bank account. In some implementations, a bank account statement can be in the format of the national electronic banking standard CBI (Corporate Banking Interbancario), established by the Italian Banking Association (ABI) and the major Italian (IT) banks.

As shown in FIG. 3, a bank statement is created at a bank and an IT_CBI Bank Account Statement Notification message 316 with statement information is generated. The IT_CBI Bank Account Statement Notification message 316 uses Mapping Entity 318 to transform the IT_CBI formatted message to a Bank Account Statement Notification message 306. The message 306 is received in the Payment Processing process component 116 where a Create Bank Statement operation 308 is invoked to create a bank statement. The Create Bank Statement operation 308 is included in a Payment Processing Incoming Payment Advicing In interface 310. A Maintain Bank Statement inbound process agent 312 updates a House Bank Statement business object 314 by creating a new bank statement. The House Bank Statement business object 314 represents a legally binding notification from the house bank about the revenues items within a specific time period at a house bank account with a defined starting and closing balance.

The Bank Statement Creation at Bank process component 124 sends information to Payment Processing process component 116 using an IT_CBI_Notify of Bank Account Statement communication channel template 320. The communication channel template 320 can provide information from an external party about a bank statement.

Interactions Between Process Components "Customer Quote Processing" and "RFQ Processing at Customer"

Figure 4:
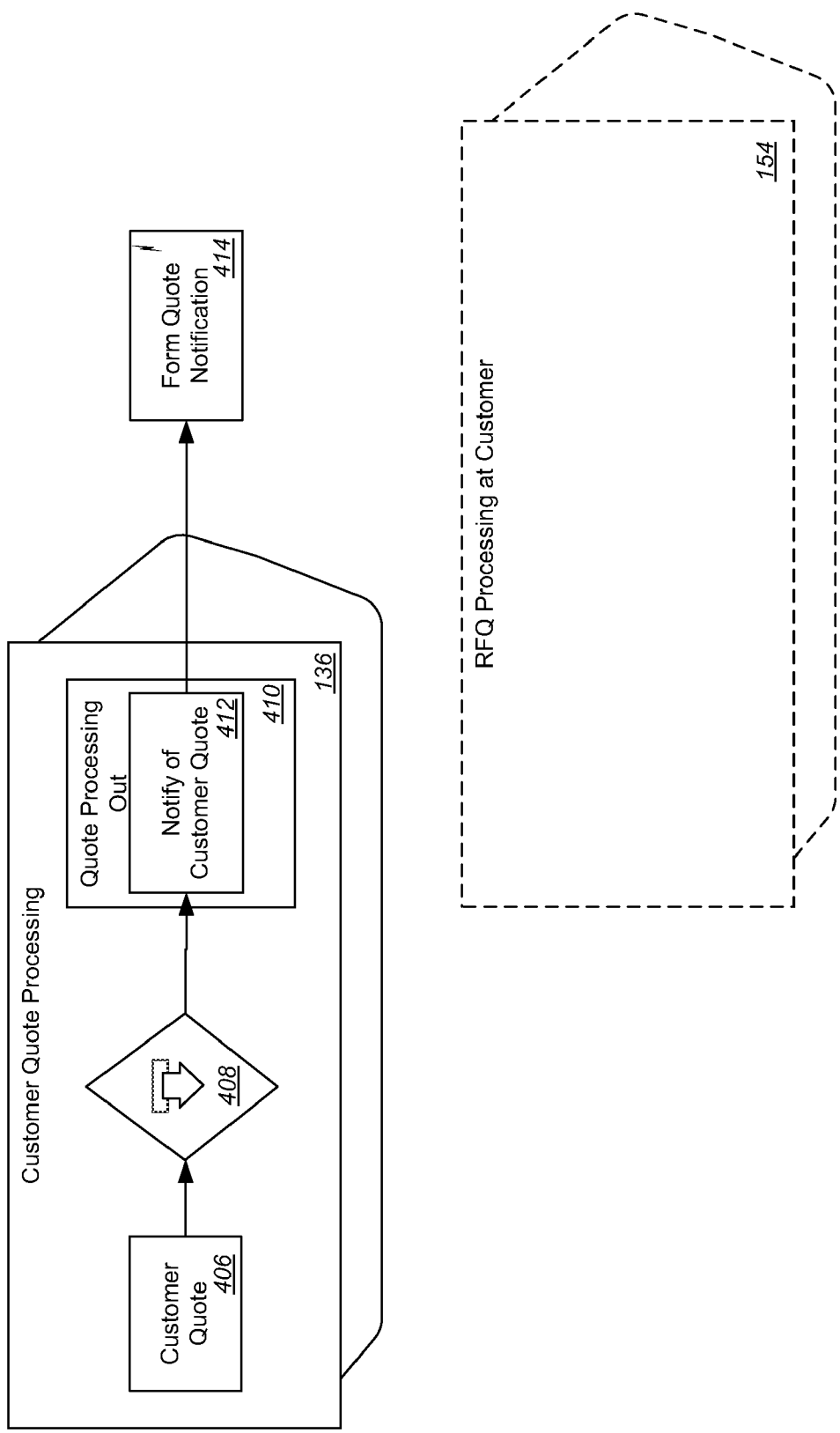
FIG. 4 is a block diagram showing interactions between a Customer Quote Processing process component and an RFQ Processing at Customer process component.

FIG. 4 is a block diagram showing interactions between the Customer Quote Processing process component 136 and the RFQ Processing at Customer process component 154 in the architectural design of FIG. 1. The interaction starts in the Customer Quote Processing process component 136 with the creation and release of a customer quote. A customer quote can be created, released and then sent, using a message, from the Customer Quote Processing process component 136 to the RFQ Processing at Customer process component 154.

As shown in FIG. 4, the Customer Quote Processing process component 136 includes a Customer Quote business object 406. The Customer Quote business object 406 represents an offer by a seller to a customer for the delivery of goods or services according to fixed terms. The offer is legally binding for the seller for a specific period of time.

A Notify Customer Quote to Customer outbound process agent 408 uses a Notify of Customer Quote operation 412 to initiate messages to the RFQ Processing at Customer process component 154. The Notify of Customer Quote operation 412 is included in a Quote Processing Out interface 410. The Notify of Customer Quote operation 412 sends a Form Quote Notification message 414 to the RFQ Processing at Customer process component 154.

Interactions Between Process Components "Payment Processing" and "Accounting"

Figure 5A:
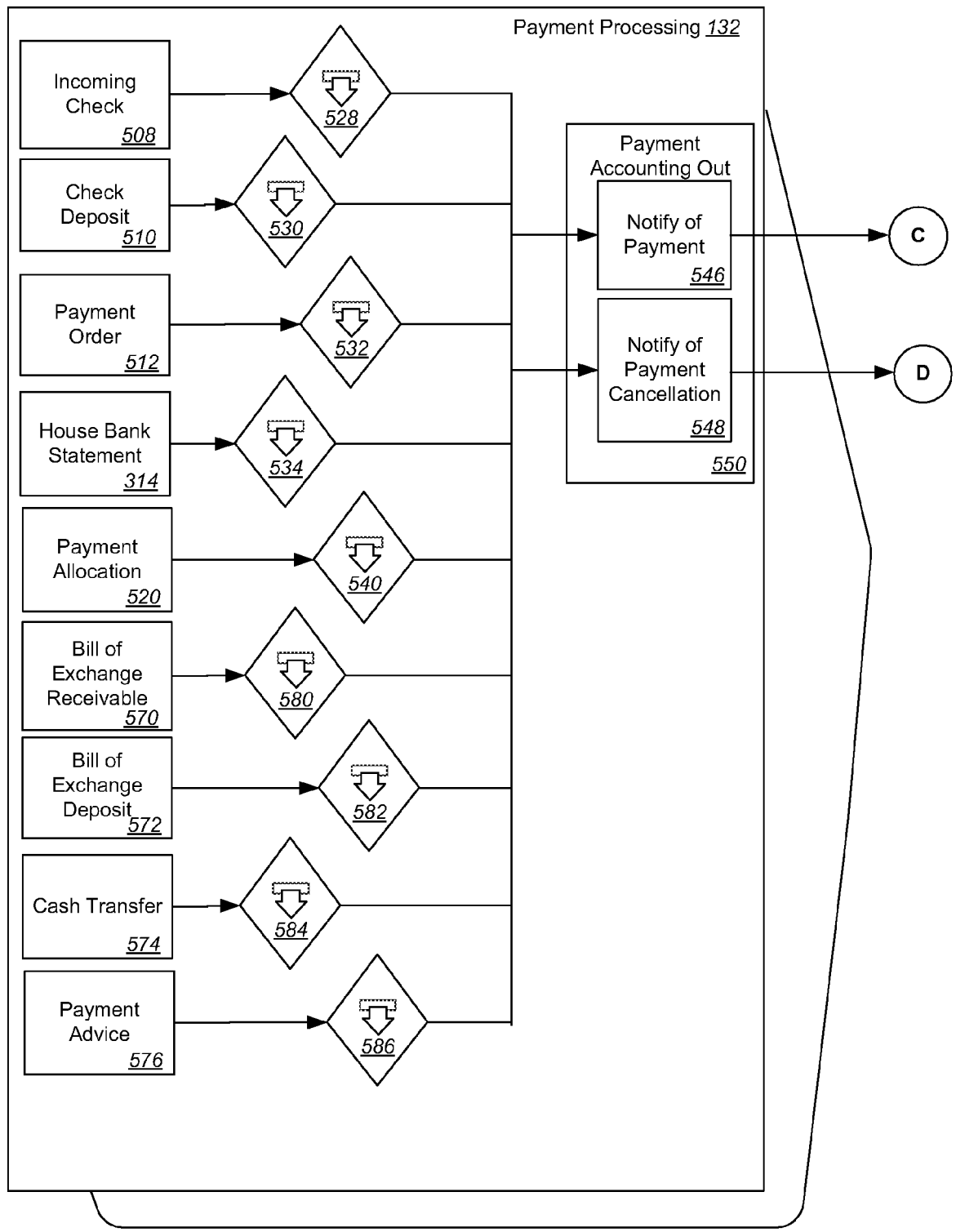
FIGS. 5A and 5B are block diagrams collectively showing interactions between a Payment Processing process component and an Accounting process component.
Figure 5B:
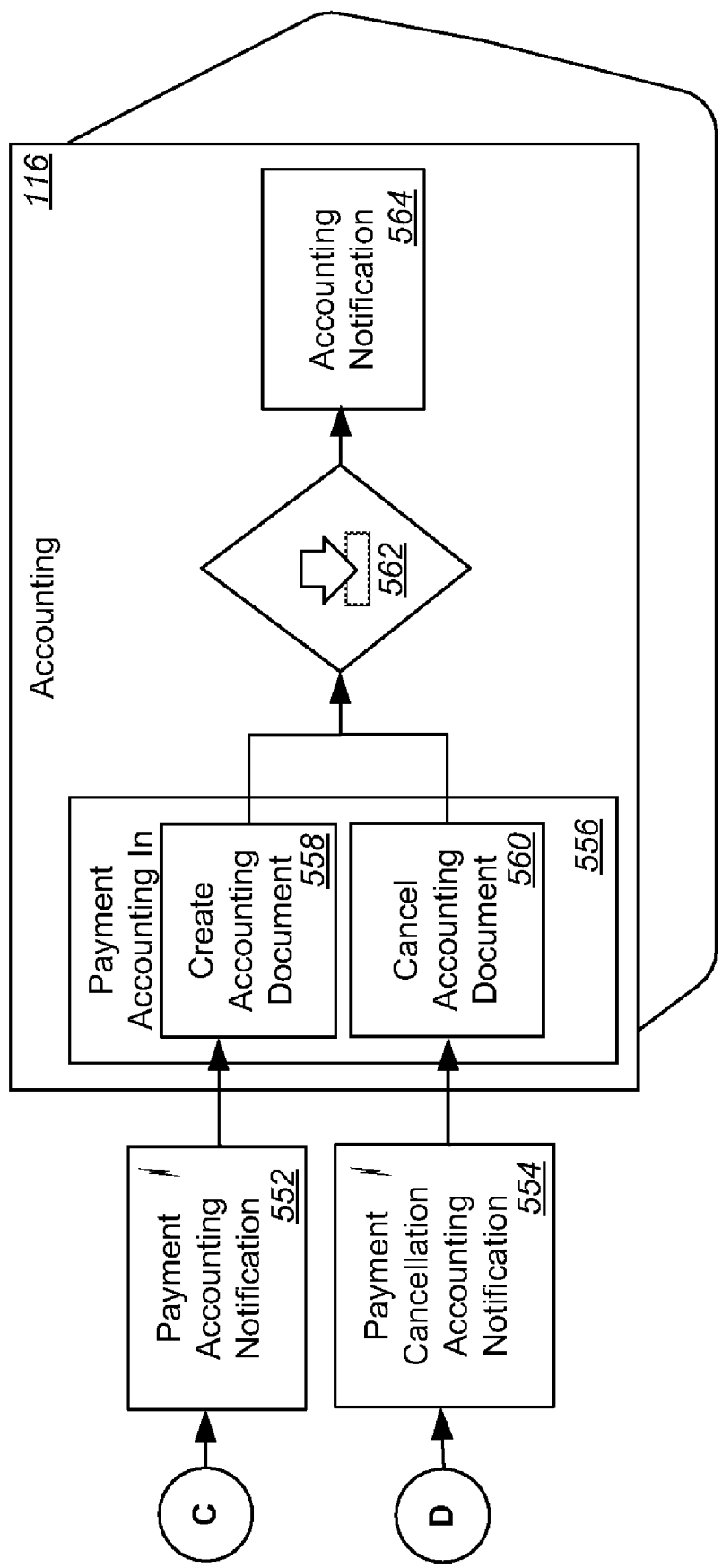

FIGS. 5A and 5B are block diagrams collectively showing interactions between the Payment Processing process component 132 and the Accounting process component 116 in the architectural design of FIG. 1. The Payment Processing process component 132 can notify the Accounting process component 116 about the creation or cancellation of a payment ordered, received, or allocated. The Payment Processing process component 132 processes and manages payments received, as well as the associated communication with financial institutions such as banks. In addition, the Payment Processing process component 132 provides input for liquidity management.

As shown in FIG. 5A, the Payment Processing process component 132 includes an Incoming Check business object 508, a Check Deposit business object 510, the Payment Order business object 512, the House Bank Statement business object 314, a Payment Allocation business object 520, a Bill of Exchange Receivable business object 570, a Bill of Exchange Deposit business object 572, a Cash Transfer business object 574, and a Payment Advice business object 576. The Incoming Check business object 508 represents a check issued by a business partner. The Check Deposit business object 510 represents an index of checks deposited at a house bank (e.g., the house bank can credit the total amount specified in check deposit to a house bank account). The Payment Allocation business object 520 represents the assignment of a payment item to the payment reasons from which the payment item originated. The Bill of Exchange Receivable business object 570 represents a bill of exchange issued either by the company or by a business partner for the benefit of the company. The Bill of Exchange Deposit business object 572 represents a deposit of bills of exchange receivable at a house bank for credit to a house bank account. The Cash Transfer business object 574 represents a company-internal money transfer that includes: payments from one house bank account to another (house bank account transfer), payments from one cash storage to another (cash transfer), payments from a cash storage to a house bank account (cash deposit), and/or payments from a house bank account to a cash storage (cash withdrawal). The Payment Advice business object 576 represents an announcement of a payment transaction by a business partner to the company, specifying payment reasons.

An update in one or more of the above business objects can trigger the Payment Processing process component 132 to update an Accounting Notification business object 564 in the Accounting process component 116. The Accounting Notification business object 564 represents a notification sent to Financial Accounting by an operational component regarding a business transaction. It represents this operational business transaction in a standardized form for all business transaction documents and contains the data needed to valuate the business transaction. In one example, an update in the Incoming Check business object 508 triggers a Notify of Payment from Incoming Check to Accounting outbound process agent 528 to send a notification to the Financial Accounting deployment unit 102 of an incoming check. The Notify of Payment from Incoming Check to Accounting outbound process agent 528 invokes either a Notify of Payment operation 546 or a Notify of Payment Cancellation operation 548. The operations 546 and 548 are included in a Payment Accounting Out interface 550. The Notify of Payment operation 546 can notify accounting of cash receipts and cash disbursements. The Notify of Payment Cancellation operation 548 can notify accounting about the cancellation of cash receipts and cash disbursements.

As shown in FIG. 5B, if the Notify of Payment operation 546 is invoked (e.g., a status of the Incoming Check business object 508 is "saved"), then a Payment Accounting Notification message 552 is sent to the Accounting process component 116. If the Notify of Payment Cancellation operation 548 is invoked (e.g., a status of the Incoming Check business object 508 is "cancelled"), then a Payment Cancellation Accounting Notification message 554 is sent to the Accounting process component 116.

The Accounting process component 116 includes a Payment Accounting In interface 556. The interface 556 includes a Create Accounting Document operation 558 and a Cancel Accounting Document interface 560. If the Payment Accounting Notification message 552 is received, the Create Accounting Document operation 558 is invoked. If the Payment Cancellation Accounting Notification message 554 is received, then the Cancel Accounting Document operation 560 is invoked. The operations 558, 560 can trigger a Maintain Accounting Document based on Payment inbound process agent 562 to update the Accounting Notification business object 564.

In another example, an update in the Check Deposit business object 510 triggers a Notify of Payment from Check Deposit to Accounting outbound process agent 530 to send a notification to the Financial Accounting deployment unit 102 of a deposition of one or more checks. The Notify of Payment from Check Deposit to Accounting outbound process agent 530 invokes either the Notify of Payment operation 546 or the Notify of Payment Cancellation operation 548. If the Notify of Payment operation 546 is invoked (e.g., a status of the Check Deposit business object 510 is "ready for transfer"), then the Payment Accounting Notification message 552 is sent to the Accounting process component 116. If the Notify of Payment Cancellation operation 548 is invoked (e.g., a status of the Check Deposit business object is "cancelled"), then the Payment Cancellation Accounting Notification message 554 is sent to the Accounting process component 116 to update the Accounting Notification business object 564.

In another example, an update in the Payment Order business object 512 triggers a Notify of Payment from Payment Order to Accounting outbound process agent 532 to send a notification to the Financial Accounting deployment unit 116 of a self-initiated payment. The Notify of Payment from Payment Order to Accounting outbound process agent 532 invokes either the Notify of Payment operation 546, or the Notify of Payment Cancellation operation 548. If the Notify of Payment operation 546 is invoked (e.g., a status of the Payment Order business object 512 is "final"), then the Payment Accounting Notification message 552 is sent to the Accounting process component 116. If the Notify of Payment Cancellation operation 548 is invoked (e.g., a status of the Payment Order business object 512 is "cancelled"), then the Payment Cancellation Accounting Notification message 554 is sent to the Accounting process component 116 to update the Accounting Notification business object 564.

In another example, an update in the House Bank Statement business object 314 triggers a Notify of Payment from Bank Statement to Accounting outbound process agent 534 to send a notification to the Financial Accounting deployment unit 102 concerning payments on bank accounts. For example, these payments may be sent to the system via the House Bank Statement business object 314. The Notify of Payment from Bank Statement to Accounting outbound process agent 534 invokes either the Notify of Payment operation 546 or the Notify of Payment Cancellation operation 548. If the Notify of Payment operation 546 is invoked (e.g., a status of the House Bank Statement business object 314 is "saved"), then the Payment Accounting Notification message 552 is sent to the Accounting process component 116. If the Notify of Payment Cancellation operation 548 is invoked (e.g., a status of the House Bank Statement business object 314 is "cancelled"), then the Payment Cancellation Accounting Notification message 554 is sent to the Accounting process component 116 to update the Accounting Notification business object 564.

In yet another example, an update in the Payment Allocation business object 520 triggers a Notify of Payment from Payment Allocation to Accounting outbound process agent 540 to send a notification to the Financial Accounting deployment unit 102 from the Payment Allocation business object 520. The Notify of Payment from Payment Allocation to Accounting outbound process agent 540 invokes either the Notify of Payment operation 546 or the Notify of Payment Cancellation operation 548. If the Notify of Payment operation 546 is invoked (e.g., a status of the Payment Allocation business object 520 is "saved"), then the Payment Accounting Notification message 552 is sent to the Accounting process component 116. If the Notify of Payment Cancellation operation 548 is invoked (e.g., a status of the Payment Allocation business object 520 is "cancelled"), then the Payment Cancellation Accounting Notification message 554 is sent to the Accounting process component 116 to update the Accounting Notification business object 564.

In yet another example, an update in the Bill of Exchange Receivable business object 570 triggers a Notify of Payment from Bill of Exchange Receivable to Accounting outbound process agent 580 to send a notification to the Financial Accounting deployment unit 102 from the Bill of Exchange Receivable business object 570. The Notify of Payment from Bill of Exchange Receivable to Accounting outbound process agent 580 invokes either the Notify of Payment operation 546 or the Notify of Payment Cancellation operation 548. If the Notify of Payment operation 546 is invoked (e.g., a status of the Bill of Exchange Receivable business object 570 is "saved"), then the Payment Accounting Notification message 552 is sent to the Accounting process component 116. If the Notify of Payment Cancellation operation 548 is invoked (e.g., a status of the Bill of Exchange Receivable business object 570 is "cancelled"), then the Payment Cancellation Accounting Notification message 554 is sent to the Accounting process component 116 to update the Accounting Notification business object 564.

In yet another example, an update in the Bill of Exchange Deposit business object 572 triggers a Notify of Payment from Bill of Exchange Deposit to Accounting outbound process agent 582 to send a notification to the Financial Accounting deployment unit 102 from the Bill of Exchange Deposit business object 572. The Notify of Payment from Bill of Exchange Deposit to Accounting outbound process agent 582 invokes either the Notify of Payment operation 546 or the Notify of Payment Cancellation operation 548. If the Notify of Payment operation 546 is invoked (e.g., a status of the Bill of Exchange Deposit business object 572 is "saved"), then the Payment Accounting Notification message 552 is sent to the Accounting process component 116. If the Notify of Payment Cancellation operation 548 is invoked (e.g., a status of the Bill of Exchange Deposit business object 572 is "cancelled"), then the Payment Cancellation Accounting Notification message 554 is sent to the Accounting process component 116 to update the Accounting Notification business object 564.

In yet another example, an update in the Cash Transfer business object 574 triggers a Notify of Payment from Cash Transfer to Accounting outbound process agent 584 to send a notification to the Financial Accounting deployment unit 102 from the Cash Transfer business object 574. The Notify of Payment from Cash Transfer to Accounting outbound process agent 584 invokes either the Notify of Payment operation 546 or the Notify of Payment Cancellation operation 548. If the Notify of Payment operation 546 is invoked (e.g., a status of the Cash Transfer business object 574 is "saved"), then the Payment Accounting Notification message 552 is sent to the Accounting process component 116. If the Notify of Payment Cancellation operation 548 is invoked (e.g., a status of the Cash Transfer business object 574 is "cancelled"), then the Payment Cancellation Accounting Notification message 554 is sent to the Accounting process component 116 to update the Accounting Notification business object 564.

In yet another example, an update in the Payment Advice business object 576 triggers a Notify of Payment from Payment Advice to Accounting outbound process agent 586 to send a notification to the Financial Accounting deployment unit 102 from the Payment Advice business object 576. The Notify of Payment from Payment Advice to Accounting outbound process agent 586 invokes either the Notify of Payment operation 546 or the Notify of Payment Cancellation operation 548. If the Notify of Payment operation 546 is invoked (e.g., a status of the Payment Advice business object 576 is "saved"), then the Payment Accounting Notification message 552 is sent to the Accounting process component 116. If the Notify of Payment Cancellation operation 548 is invoked (e.g., a status of the Payment Advice business object 576 is "cancelled"), then the Payment Cancellation Accounting Notification message 554 is sent to the Accounting process component 116 to update the Accounting Notification business object 564.

Interactions Between Process Components "Due Item Processing" and "Accounting"

Figure 6:
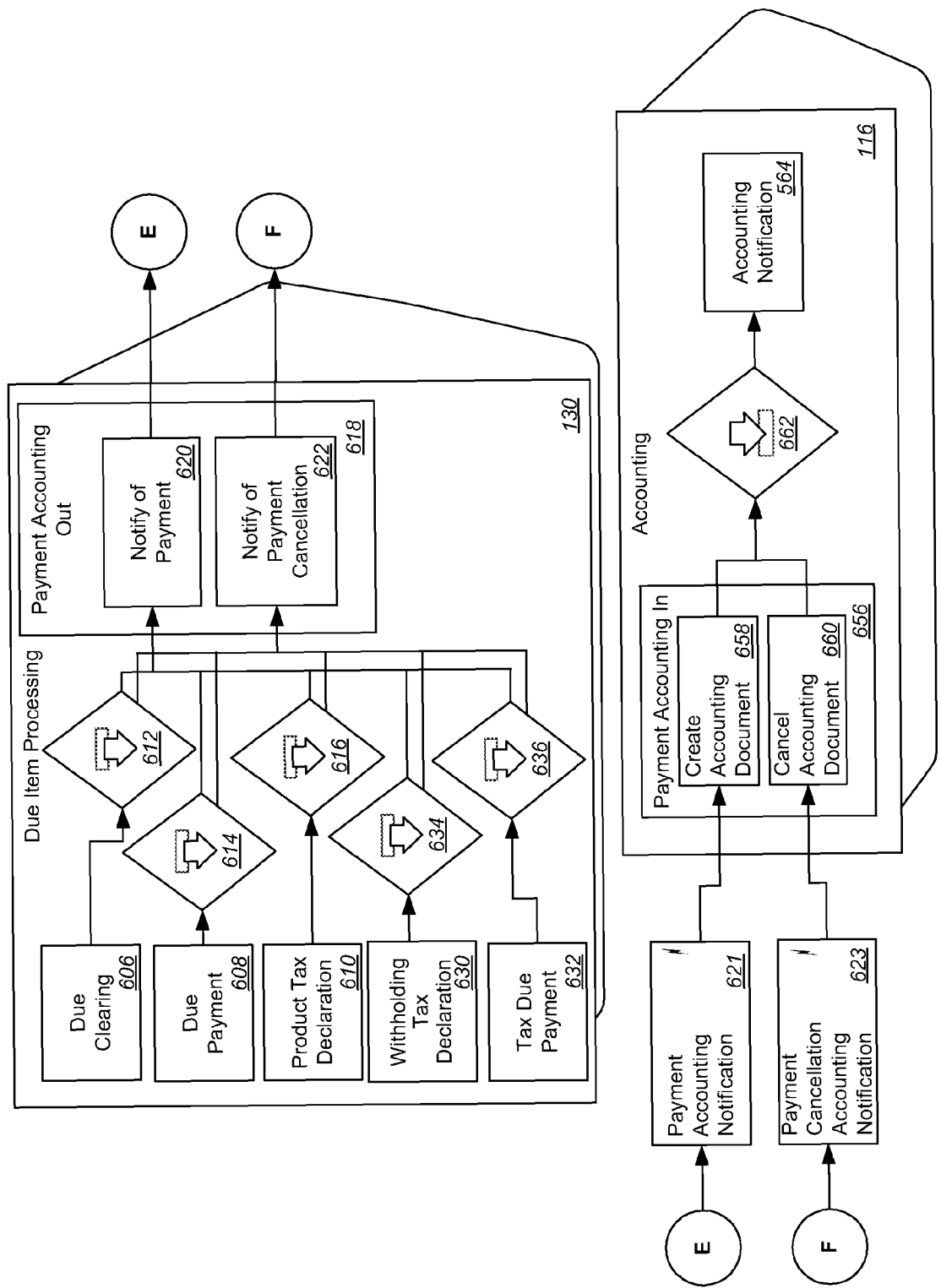
FIG. 6 is a block diagram showing interactions between a Due Item Processing process component and an Accounting process component.

FIG. 6 is a block diagram showing interactions between the Due Item Processing process component 130 and the Accounting process component 116 in the architectural design of FIG. 1. The Due Item Processing process component 130 can notify the Accounting process component 116 about the creation or cancellation of a payment, clearing for trade, tax receivables, or payables.

As shown in FIG. 6, the Due Item Processing process component 130 includes a Due Clearing business object 606, a Due Payment business object 608, a Product Tax Declaration business object 610, a Withholding Tax Declaration business object 630, and a Tax Due Payment business object 632. The Accounting process component 116 includes the Accounting Notification business object 564. The Accounting Notification business object 564 represents a notification sent to Financial Accounting by an operational component regarding a business transaction. It represents this operational business transaction in a standardized form for all business transaction documents and contains the data needed to valuate the business transaction. Updates in some or all of the Due Clearing business object 606, the Due Payment business object 608, the Product Tax Declaration business object 610, the Withholding Tax Declaration business object 630, or the Tax Due Payment business object 632 can trigger messages to be sent to update the Accounting Notification business object 564.

The Due Clearing business object 606 represents a group of receivables and payables for clearing. The Due Payment business object 608 represents a payment request or payment confirmation with regard to trade receivables and payables from goods and services. The Product Tax Declaration business object 610 represents a declaration of the product tax payables or receivables of a company to the responsible tax authority according to the tax declaration arrangement and country specific legal requirements that triggers the payment to the tax authority if required. The Withholding Tax Declaration business object 630 represents a declaration of withholding tax payables of a company to a tax authority according to the tax declaration arrangement and country specific legal requirements that triggers the payment to the tax authority if required. The Tax Due Payment business object 632 represents a payment request or payment confirmation with regard to tax payables and receivables.

As shown in FIG. 6, an update in the Due Clearing business object 606 may trigger a Notify of Payment from Due Clearing to Accounting outbound process agent 612. The Notify of Payment from Due Clearing to Accounting outbound process agent 612 invokes a Notify of Payment operation 620 or a Notify Payment Cancellation operation 622. The Notify of Payment operation 620 and the Notify Payment Cancellation operation 622 are included in a Payment Accounting Out interface 618. The Notify of Payment from Due Clearing to Accounting outbound process agent 612 may invoke the Notify of Payment operation 620 if the due clearing is released. The Notify of Payment from Due Clearing to Accounting outbound process agent 612 may invoke the Notify of Payment Cancellation operation 622 if the due clearing is cancelled.

The Notify of Payment operation 620 notifies accounting of payments or clearings of trade and tax receivables or payables. The Notify of Payment operation 620 sends a Payment Accounting Notification message 621 to the Accounting process component 116. The Notify of Payment Cancellation operation 622 notifies accounting of payment or clearing cancellations for trade and tax receivables or payables. The Notify of Payment Cancellation operation 622 sends a Payment Cancellation Accounting Notification message 623 to the Accounting process component 116.

The Payment Accounting In interface 656 includes a Create Accounting Document operation 658 and a Cancel Accounting Document operation 660. The Create Accounting Document operation 658 receives the Payment Accounting Notification message 621. The Create Accounting Document operation 658 receives the Payment Cancellation Accounting Notification message 623. Both operations 658, 660 trigger a Maintain Accounting Document based on Payment inbound process agent 662 to update the Accounting Notification business object 564.

An update in the Due Payment business object 608 triggers a Notify of Payment from Due Payment to Accounting outbound process agent 614. The outbound process agent 614 sends a notification to Accounting for inward or outward trade receivables and/or payables payments. The Notify of Payment from Due Payment to Accounting outbound process agent 614 invokes the Notify of Payment operation 620 or the Notify Payment Cancellation operation 622. The Notify of Payment from Due Payment to Accounting outbound process agent 614 invokes the Notify of Payment operation 620 if a value added tax (VAT) declaration is released. The Notify of Payment from Due Payment to Accounting outbound process agent 614 invokes the Notify of Payment Cancellation operation 622 if the VAT declaration is cancelled.

An update in the Product Tax Declaration business object 610 triggers a Notify of Payment from Product Tax Declaration to Accounting outbound process agent 616. The outbound process agent 616 sends a notification to the Accounting process component 116 for a payment of tax receivables and/or payables. The Notify of Payment from Product Tax Declaration to Accounting outbound process agent 616 invokes the Notify of Payment operation 620 or the Notify Payment Cancellation operation 622. The Notify of Payment from Product Tax Declaration to Accounting outbound process agent 616 invokes the Notify of Payment operation 620 if a VAT declaration is released. The Notify of Payment from Product Tax Declaration to Accounting outbound process agent 616 invokes the Notify of Payment Cancellation operation 622 if the VAT declaration is cancelled.

An update in the Withholding Tax Declaration business object 630 triggers a Notify of Payment from Withholding Tax Declaration to Accounting outbound process agent 634. The outbound process agent 634 sends a notification to the Accounting process component 116 for a declaration of withholding tax payables. The Notify of Payment from Withholding Tax Declaration to Accounting outbound process agent 634 invokes the Notify of Payment operation 620 or the Notify Payment Cancellation operation 622. The Notify of Payment from Withholding Tax Declaration to Accounting outbound process agent 634 invokes the Notify of Payment operation 620 if a withholding tax declaration is released. The Notify of Payment from Withholding Tax Declaration to Accounting outbound process agent 634 invokes the Notify of Payment Cancellation operation 622 if the withholding tax declaration is cancelled.

An update in the Tax Due Payment business object 632 triggers a Notify of Payment from Tax Due Payment to Accounting outbound process agent 636. The outbound process agent 636 sends a notification to the Accounting process component 116 for a payment of tax due. The Notify of Payment from Tax Due Payment to Accounting outbound process agent 636 invokes the Notify of Payment operation 620 or the Notify Payment Cancellation operation 622. The Notify of Payment from Tax Due Payment to Accounting outbound process agent 636 invokes the Notify of Payment operation 620 if tax is due. The Notify of Payment from Tax Due Payment to Accounting outbound process agent 636 invokes the Notify of Payment Cancellation operation 622 if the tax due is cancelled.

Interactions Between Process Components "Customer Invoice Processing" and "Supplier Invoice Processing at Customer"

Figure 7:
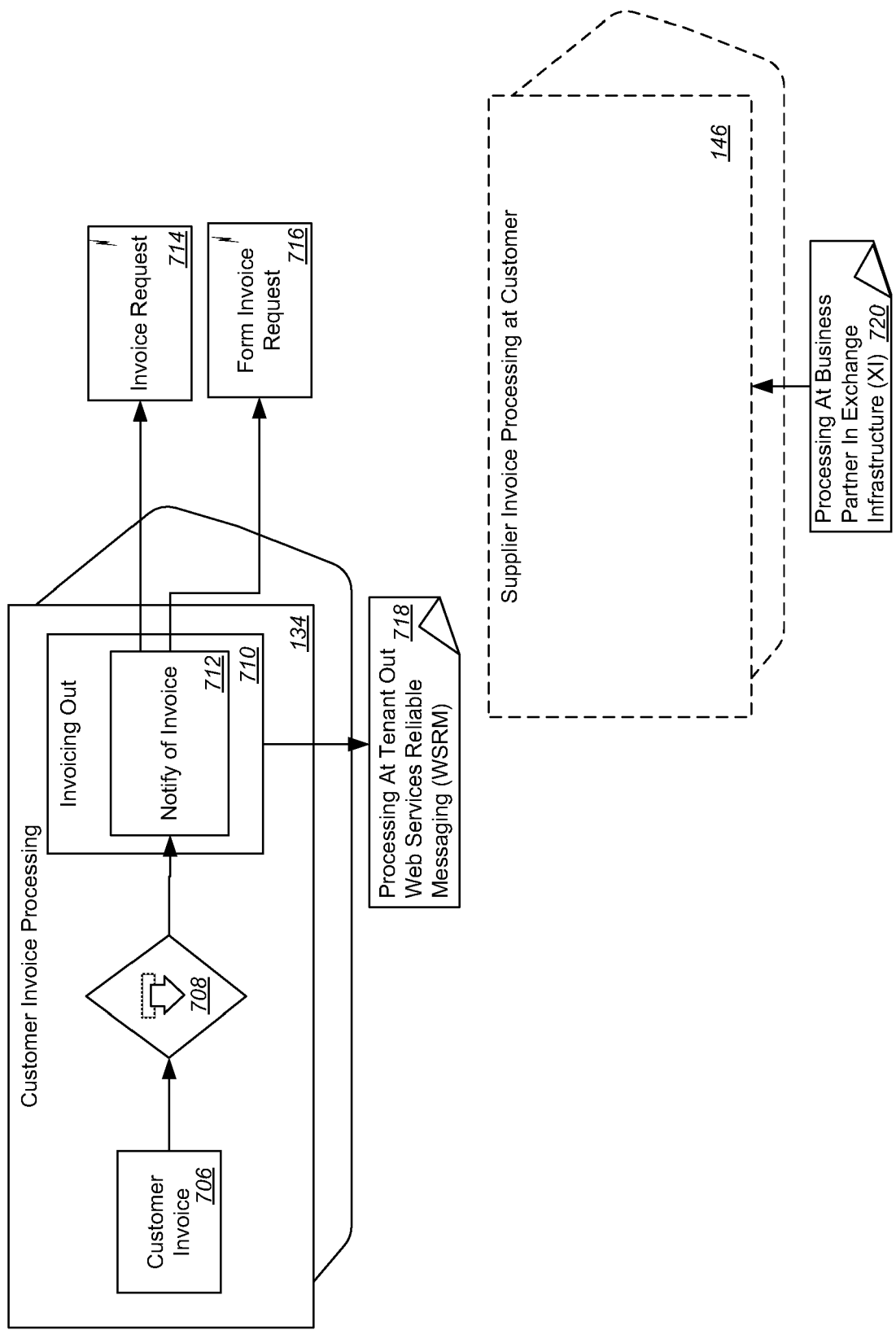
FIG. 7 is a block diagram showing interactions between a Customer Invoice Processing process component and a Supplier Invoice Processing at Customer process component.

FIG. 7 is a block diagram showing interactions between the Customer Invoice Processing process component 134 and the Supplier Invoice Processing at Customer process component 146 in the architectural design of FIG. 1. The interaction starts in the Customer Invoice Processing process component 134 with a creation or cancellation of a customer invoice. The Customer Invoice Processing process component 134 informs the Supplier Invoice Processing at Customer process component 146 about the creation or cancellation of a customer invoice from the Customer Invoice Processing process component 134. The information can be sent using XML (extensible markup language) or form message output, for example.

As shown in FIG. 7, the Customer Invoice Processing process component 134 includes a Customer Invoice business object 706. The Customer Invoice business object 706 represents a binding statement of amounts receivable resulting from deliveries to a customer, services performed for a customer, adjustments to these receivables, or credit memos to a customer.

The Customer Invoice business object 706 uses a Notify Customer of Customer Invoice outbound process agent 708 to invoke a Notify of Invoice operation 712. The Notify of Invoice operation 712 is included in an Invoicing Out interface 710. The Customer Invoice Processing process component sends information to the Supplier Invoice Processing at Customer processing component 146 using the Processing At Tenant Out Web Services Reliable Messaging (WSRM) communication channel template 718. The communication channel template 718 can define protocols and parameters used for communication with an external party.

The Notify of Invoice operation 712 sends full billing documentation (e.g., a customer invoice) to a customer for customer usage. The Notify of Invoice operation 712 generates an Invoice Request message 714. The message 714 is sent from the Customer Invoicing Processing process component 134 to the Supplier Invoice Processing at Customer process component 146 requesting that the update be made. The Notify of Invoice operation 712 can also generate a Form Invoice Request message 716. The message 716 is sent from the Customer Invoicing Processing process component 134 to the Supplier Invoice Processing at Customer process component 146. The Supplier Invoice Processing at Customer process component 146 receives information from the Customer Invoice Processing process component 134 using a Processing At Business Partner In XI communication channel template 720. The Processing At Business Partner In Exchange Infrastructure (XI) communication channel template 720 can define protocols and parameters used for communication with an external party. While XI represents Exchange Infrastructure, any similar or suitable third-party or proprietary tool may be used to perform the functions provided by or described in relation to XI.

Process Component Interaction Model "Logistics Execution Control" and "Outbound Delivery Processing"

Figure 8:
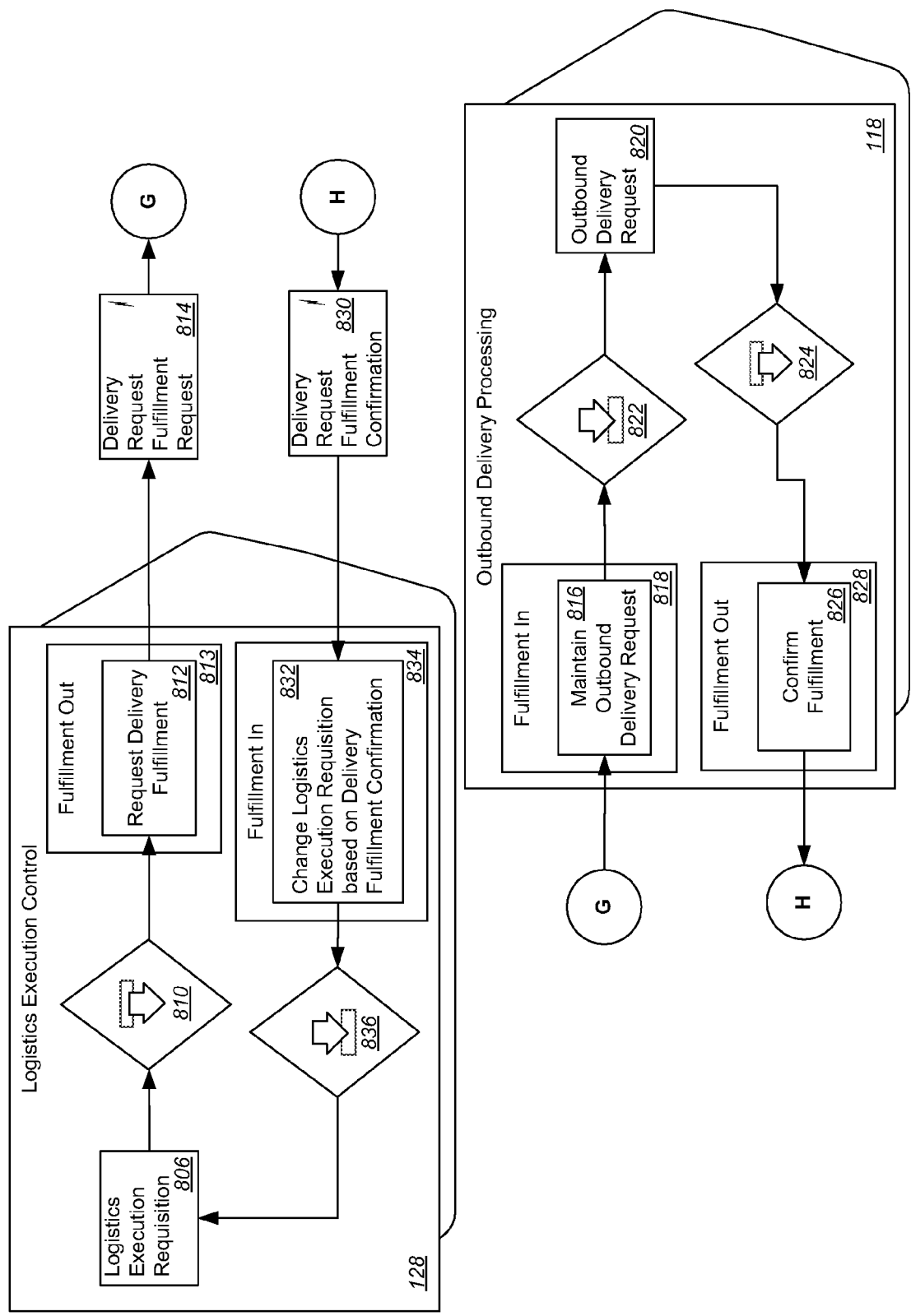
FIG. 8 is a block diagram showing interactions between a Logistics Execution Control process component and an Outbound Delivery Processing process component.

FIG. 8 is a block diagram showing interactions between the Logistics Execution Control process component 128 and the Outbound Delivery Processing process component 118 in the architectural design of FIG. 1. The Logistics Execution Control process component 128 requests the creation or update of outbound delivery request(s) from the Outbound Delivery Processing process component 118. The Outbound Delivery Processing process component 118 confirms delivery fulfillment to the Logistics Execution Control process component 128. The Logistics Execution Control process component 128 controls and monitors, on a macro logistics level, the supply chain execution activities necessary for the fulfillment of an order. It sends information to Logistics Execution to trigger the necessary supply chain execution activities, and receives information about the supply chain execution progress.

As shown in FIG. 8, the Logistics Execution Control process component 128 includes a Logistics Execution Requisition business object 806. The Logistics Execution Requisition business object 806 sends instructions to Logistics Execution, which supports the controlling, triggering and monitoring of a logistic process on a macro logistics level to fulfill an order. The business object 806 uses a Request Fulfillment for Logistics Execution Requisition to Outbound Delivery Processing outbound process agent 810 to invoke a Request Delivery Fulfillment operation 812. The operation 812 generates a Delivery Request Fulfillment Request message 814. The operation 812 is included in a Fulfillment Out interface 813.

The Delivery Request Fulfillment Request message 814 is received by a Maintain Outbound Delivery Request operation 816 in the Outbound Delivery Processing process component 118. The operation 816 is included in a Fulfillment In interface 818. The operation 816 uses a Maintain Outbound Delivery Request inbound process agent 822 to update an Outbound Delivery Request business object 820. The Outbound Delivery Request business object 820 represents a request to a vendor to compose goods for shipping. The Maintain Outbound Delivery Request inbound process agent 822 is used to validate an inbound delivery and an advanced shipping notification, and to prepare inbound logistics for receiving the goods.

A Confirm Fulfillment of Outbound Delivery Requisition to Logistics Execution Control outbound process agent 824 invokes a Confirm Fulfillment operation 826 to confirm data upon receipt of an inbound delivery request. The Confirm Fulfillment operation 826 sends a delivery fulfillment confirmation to the Logistics Execution Control process component 128. The confirmation includes data that indicates if the outbound delivery request is partially completed, fully completed, or reset to not complete. It can also indicate if the outbound delivery request confirmation part has changed. The operation 826 is included in a Fulfillment Out interface 828.

The Confirm Fulfillment operation 826 generates a Delivery Request Fulfillment Confirmation message 830. The message 830 is received by a Change Logistics Execution Requisition based on Delivery Fulfillment Confirmation operation 832. The operation 832 is included in a Fulfillment In interface 834. The operation 832 uses a Change Logistics Execution Requisition based on Delivery Fulfillment Confirmation inbound process agent 836 to update the Logistics Execution Requisition business object 806.

Interactions Between Process Components "Outbound Delivery Processing" and "Customer Invoice Processing"

Figure 9:
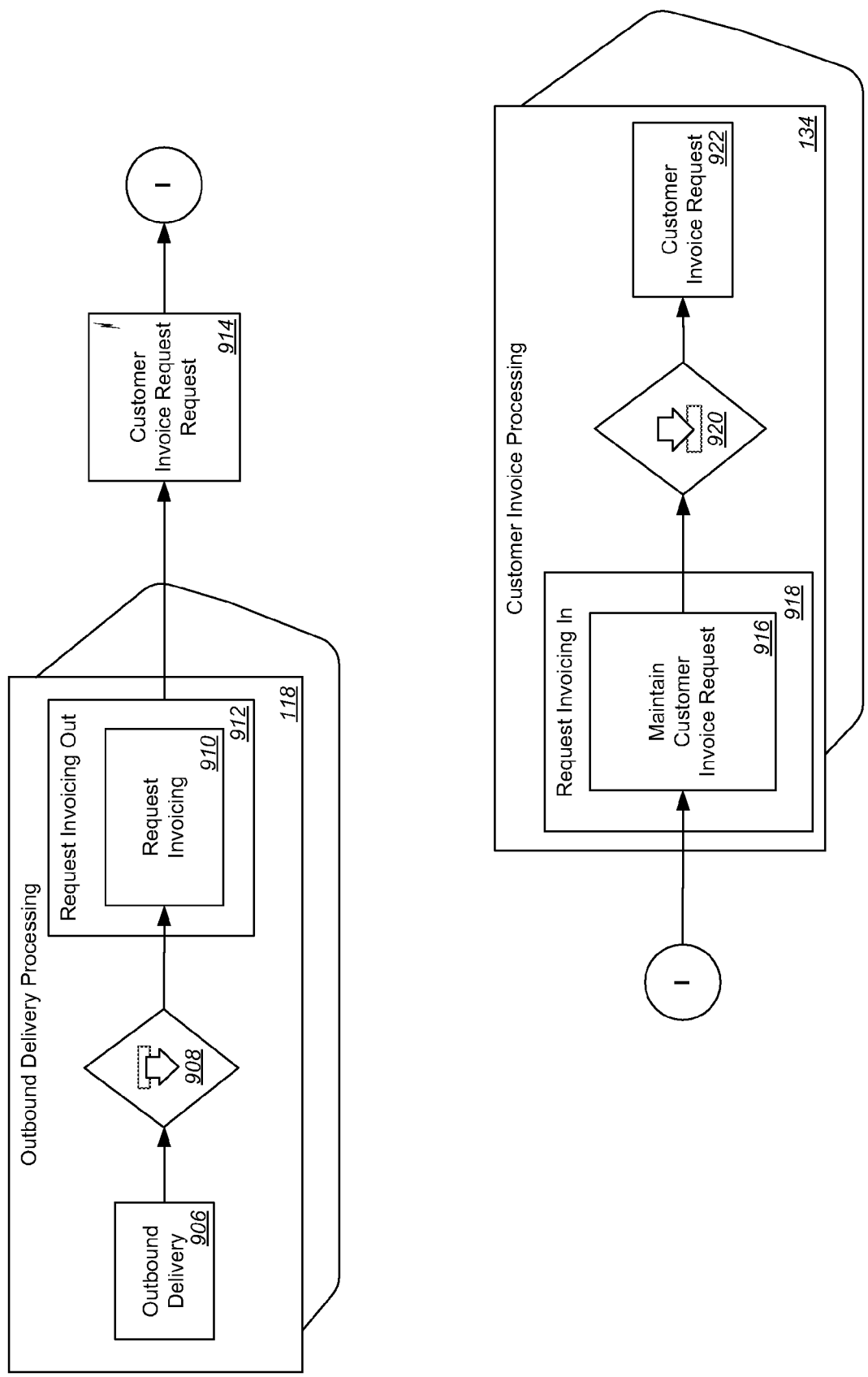
FIG. 9 is a block diagram showing interactions between an Outbound Delivery Processing process component and a Customer Invoice Processing process component.

FIG. 9 is a block diagram showing interactions between the Outbound Delivery Processing process component 118 and the Customer Invoice Processing process component 134 in the architectural design of FIG. 1. The interaction starts when an outbound delivery is created, changed, or cancelled. The Outbound Delivery Processing process component 118 requests the creation, update, or cancellation of invoice(s) from the Customer Invoice Processing process component 134.

As shown in FIG. 9, the Outbound Delivery Processing process component 118 includes an Outbound Delivery business object 906. The Outbound Delivery business object 906 represents a composition of the goods that are provided for shipping by a vendor. The business object uses a Request Invoicing from Outbound Delivery to Customer Invoice Processing outbound process agent 908 to invoke a Request Invoicing operation 910. The operation 910 sends a billing due notification to the Customer Invoice Processing process component 134. The operation 910 is included in a Request Invoicing Out interface 912. The operation 910 generates a Customer Invoice Request message 914 and sends a customer invoice request to the Customer Invoice Processing process component 134.

The message 914 is received by a Maintain Customer Invoice operation 916. The operation 916 is included in a Request Invoicing In interface 918. The operation 916 uses a Maintain Customer Invoice Request inbound process agent 920 to update a Customer Invoice Request business object 922. The Customer Invoice Request business object 922 represents a request to create one or several customer invoices, or to take account of the data for the underlying business document when creating a customer invoice.

Interactions Between Process Components "Sales Order Processing" and "Customer Invoice Processing"

Figure 10:
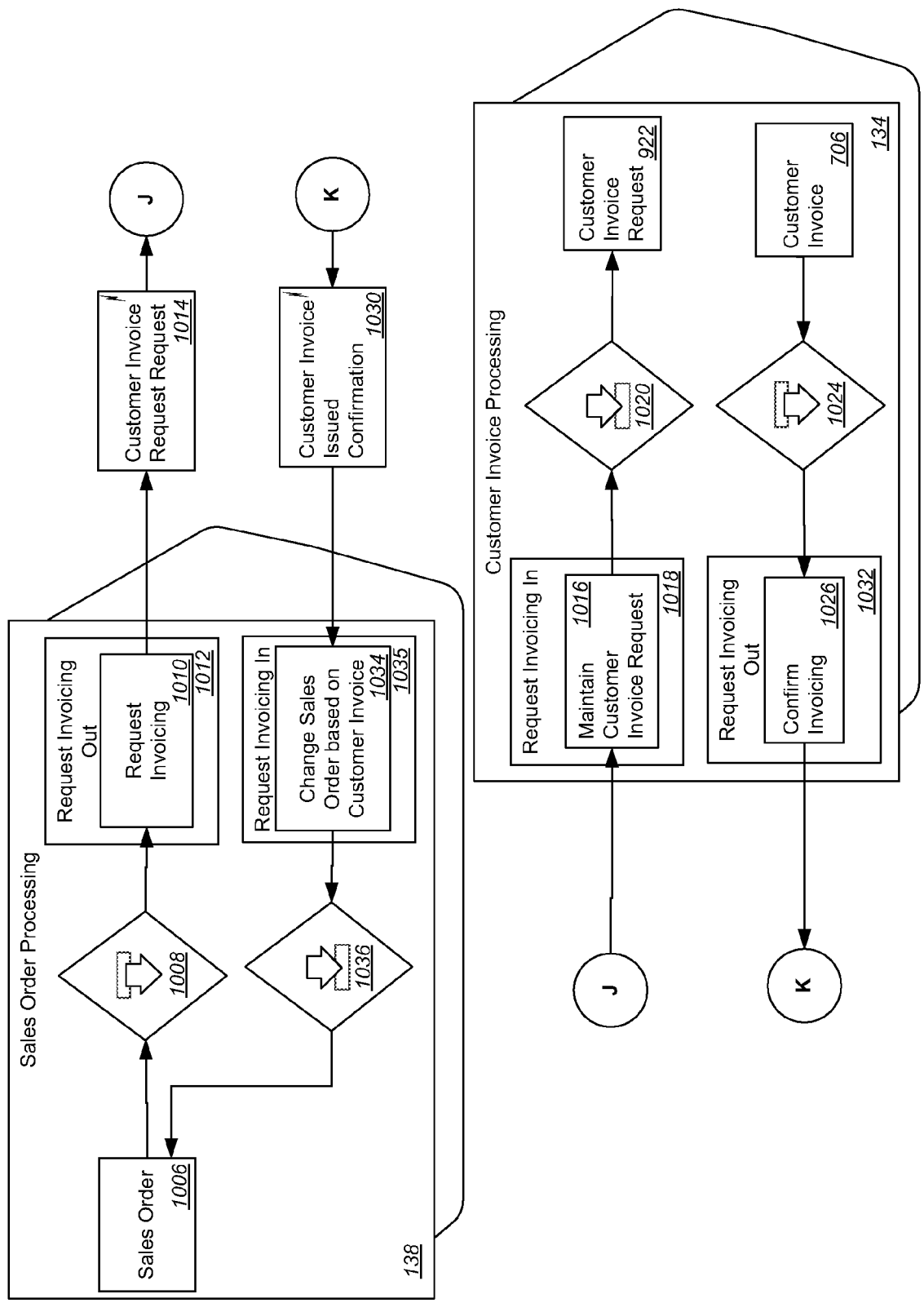
FIG. 10 is a block diagram showing interactions between a Sales Order Processing process component and a Customer Invoice Processing process component.

FIG. 10 is a block diagram showing interactions between the Sales Order Processing process component 138 and the Customer Invoice Processing process component 134 in the architectural design of FIG. 1. The interaction starts when a sales order is created, changed, or cancelled. The Sales Order Processing process component 138 requests the creation, update or cancellation of invoice(s) from the Customer Invoice Processing process component 134 which confirms the performed action to the requestor.

As shown in FIG. 10, the Sales Order Processing process component 138 includes a Sales Order business object 1006. The Sales Order business object 1006 represents an agreement between a seller and a customer concerning the sale and delivery of goods, as well as any services that are associated with these processes, on a specific date, for a specific quantity, and for a specific price.

The business object 1006 uses a Request Invoicing from Sales Order to Customer Invoice Processing outbound process agent 1008 to invoke a Request Invoicing operation

1010. The operation 1010 is included in a Request Invoicing Out interface 1012. The operation 1010 sends a Customer Invoice Request Request message 1014 to the Customer Invoice Processing process component 134.

The Customer Invoice Request Request message 1014 is received by a Maintain Customer Invoice Request operation 1016. The operation 1016 creates, updates, deletes or requests cancellation of customer invoice requests. The operation 1016 is included in a Request Invoicing In interface 1018. The operation 1016 uses a Maintain Customer Invoice Request inbound process agent 1020 to update a Customer Invoice Request business object 922. The Customer Invoice Request business object 922 represents a request to create one or several customer invoices, or to take account of the data for the underlying business document when creating a customer invoice.

The Customer Invoice business object 706 uses a Confirm Customer Invoice to Sales Order Processing outbound process agent 1024 to invoke a Confirm Invoicing operation 1026. The Confirm Invoicing operation 1026 is included in a Request Invoicing Out interface 1032. The outbound process agent 1024 uses the Confirm Invoicing operation 1026 to send a Customer Invoice Issued Confirmation message 1030 to the Sales Order Processing process component 138.

The message 1030 is received by a Change Sales Order based on Customer Invoice operation 1034. The operation is included in a Request Invoicing In interface 1035. The operation 1034 uses a Change Sales Order based on Customer Invoice inbound process agent 1036 to update sales orders with information from customer invoices in the Sales Order business object 1006. This information may include an update of the status and invoiced quantity of a sales order.

Interactions Between Process Components "Payment Processing" and "Payment Processing at Business Partner"

Figure 11:
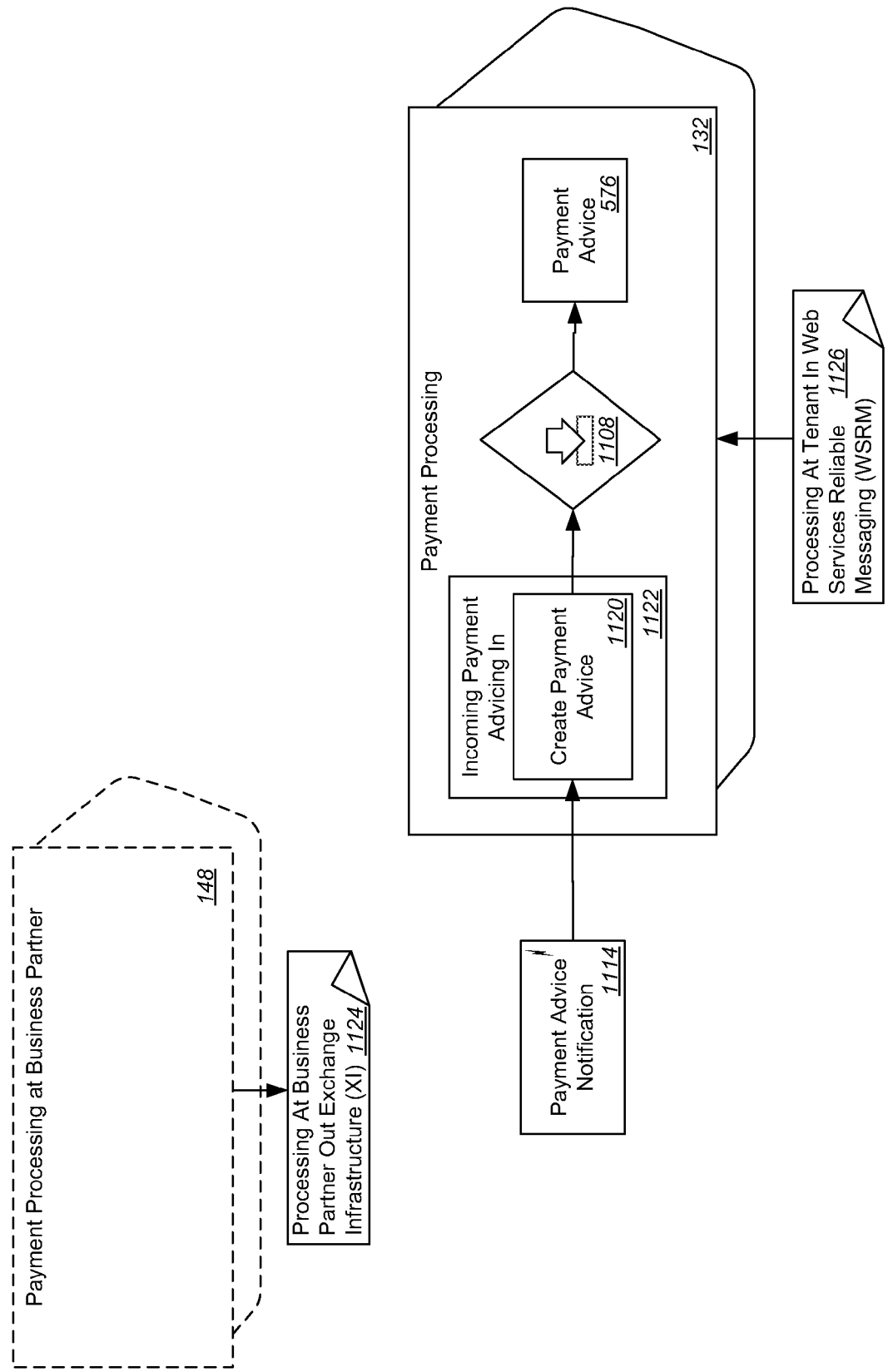
FIG. 11 is a block diagram showing interactions between a Payment Processing at Business Partner process component and a Payment Processing process component.

FIG. 11 is a block diagram showing interactions between the Payment Processing at Business Partner process component 148 and the Payment Processing process component 132 in the architectural design of FIG. 1. The interaction starts with the creation of a payment advice at a business partner. The Payment Processing at Business Partner process component 148 notifies the Payment Processing process component 132 about payments in transfer.

As shown in FIG. 11, the Payment Processing process component 132 includes the Payment Advice business object 576. The Payment Advice business object 576 represents an announcement of a payment transaction by a business partner to the company, specifying payment reasons. A Payment Advice Notification message 1114 is received from the Payment Processing at Business Partner process component 148 by a Create Payment Advice operation 1120. The operation 1120 is included in an Incoming Payment Advicing In interface 1122. The Payment Processing process component 132 receives information from a Processing At Tenant In Web Services Reliable Messaging (WSRM) communication channel template 1126. The communication channel template 1126 can define protocols and parameters used for communication with an external party.

The Create Payment Advice operation 1120 invokes a Notify of Payment from Payment Order to Business Partner inbound process agent 1108. The agent 1108 updates the Payment Advice business object 576 with information about payments in transfer. The Payment Processing at Business Partner process component 148 sends information to the Payment Processing process component 132 using a Processing At Business Partner Out XI communication channel template 1124. The communication channel template 1124 can define protocols and parameters used for communication with an external party.

Interactions Between Process Components "Customer Invoice Processing" and "Accounting"

Figure 12:
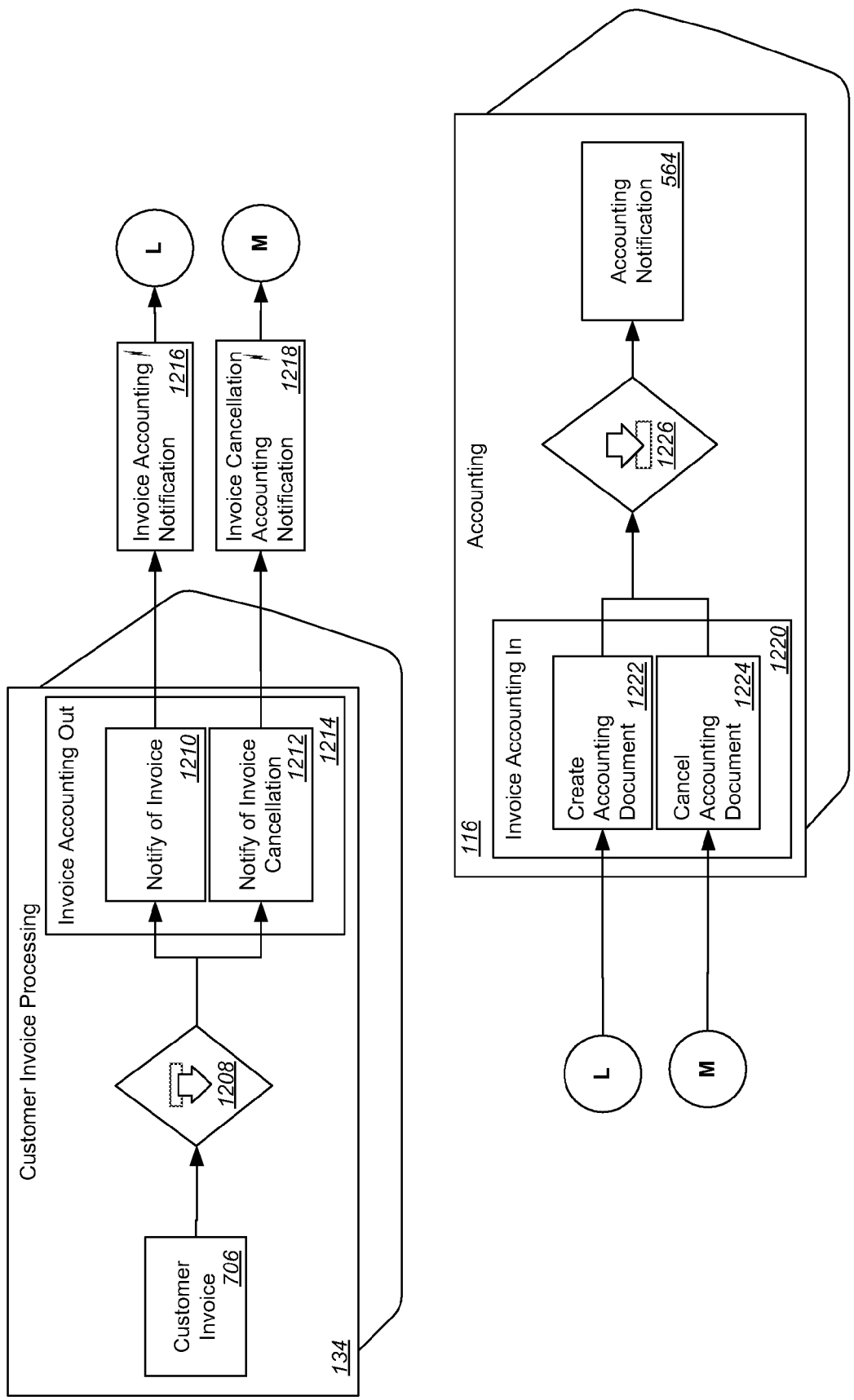
FIG. 12 is a block diagram showing interactions between a Customer Invoice Processing process component and an Accounting process component.

FIG. 12 is a block diagram showing interactions between the Customer Invoice Processing process component 134 and the Accounting process component 116 in the architectural design of FIG. 1. Interactions can start when a customer invoice is created or cancelled. The Customer Invoice Processing process component 134 requests the creation or cancellation of accounting documents from the Accounting process component 116.

As shown in FIG. 12, the Customer Invoice Processing process component 134 includes a Customer Invoice business object 706. The Customer Invoice business object 706 represents a binding statement of amounts receivable resulting, for example, from deliveries to a customer, services performed for a customer, adjustments to these receivables, or credit memos to the customer. The Customer Invoice business object 706 uses a Notify of Customer Invoice to Accounting outbound process agent 1208 to notify accounting of the existence of the customer invoice.

The business object 706 uses the Notify of Customer Invoice to Accounting outbound processing agent 1208 to invoke a Notify of Invoice operation 1210 or a Notify of Invoice Cancellation operation 1212. The operations 1210, 1212 are included in an Invoice Accounting Out interface 1214. If the Notify of Invoice operation 1210 is invoked, an Invoice Accounting Notification message 1216 is generated and sent to the Accounting process component 116. If the Notify of Invoice Cancellation operation 1212 is invoked, an Invoice Cancellation Accounting message 1218 is generated and sent to the Accounting process component 116.

A Create Accounting Document operation 1222 receives the Invoice Accounting Notification message 1216. A Cancel Accounting Document operation 1224 receives the Invoice Cancellation Accounting message 1218. An Invoice Accounting In interface 1220 includes the Create Accounting Document operation 1222 and the Cancel Accounting Document operation 1224. The operation 1222 creates an accounting document for a customer invoice or supplier invoice. The operation 1224 cancels an accounting document for a customer invoice or supplier invoice.

The operations 1222 and 1224 use a Maintain Accounting Document Based on Invoice inbound process agent 1226 to update the Accounting Notification business object 564. The Accounting Notification business object 564 represents a notification sent to Financial Accounting by an operational component regarding a business transaction. It represents this operational business transaction in a standardized form for all business transaction documents and contains the data needed to valuate the business transaction.

Interactions Between Process Components "Payment Processing" and "Payment Order Processing at House Bank"

Figure 13:
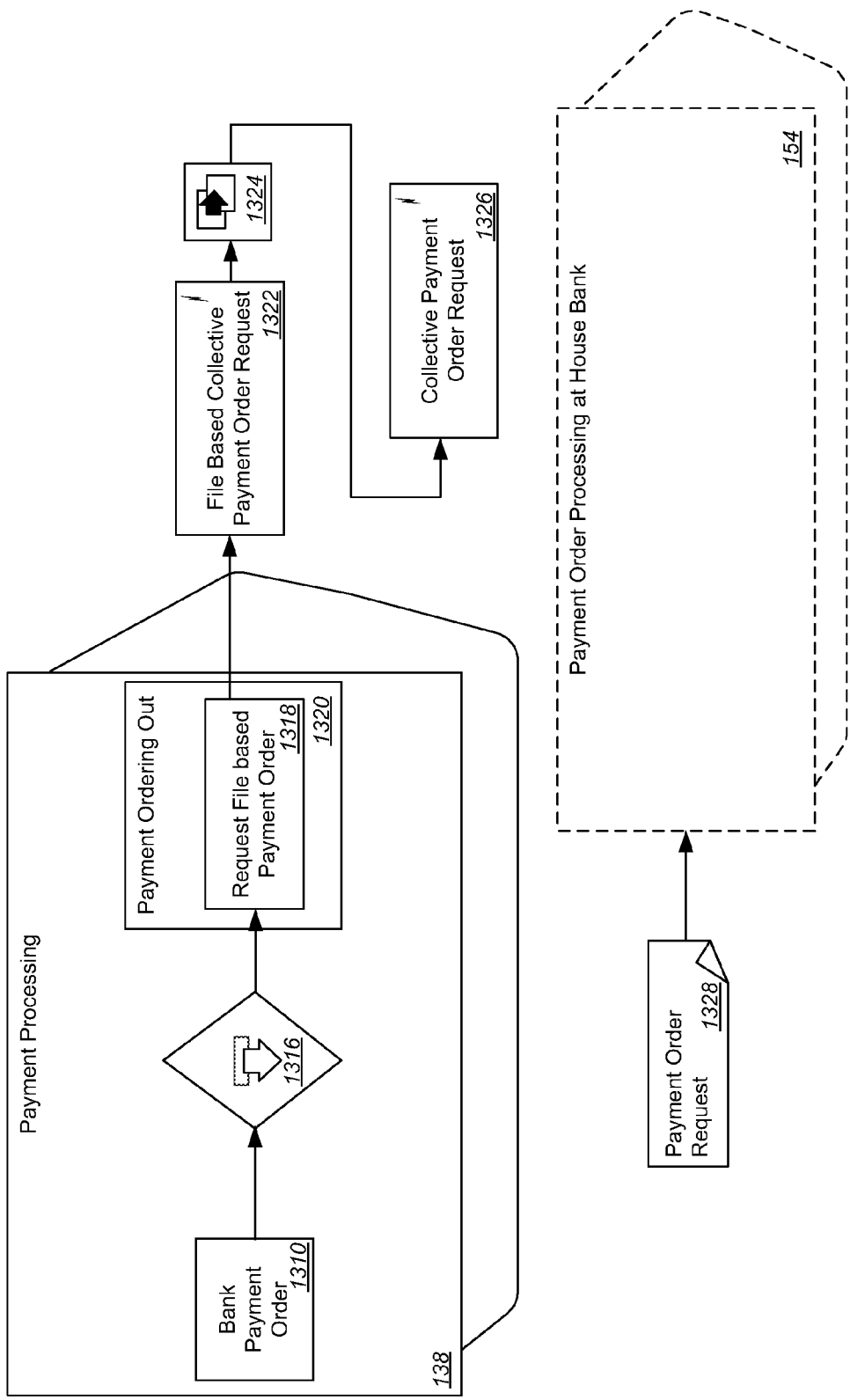
FIG. 13 is a block diagram showing interactions between a Payment Processing process component and a Payment Order processing at House Bank process component.

FIG. 13 is a block diagram showing interactions between the Payment Processing process component 138 and the Payment Order Processing at House Bank process component 154 in the architectural design of FIG. 1.

As shown in FIG. 13, the Payment Processing process component 138 includes a Bank Payment Order business object 1310. The Bank Payment Order business object 1310 represents an order to a house bank to make a transfer or direct debit from a specified house bank account to fulfill a payment order. The house bank can be a bank located in France.

The Bank Payment Order business object 1310 uses a Request File Based Payment Order from Bank Payment Order to House Bank outbound process agent 1316 to invoke a Request File based Payment Order operation 1318. The Request File based Payment Order operation 1318 instructs a house bank, using a file, to make a bank transfer or a direct debit. The operation 1318 is included in a Payment Ordering Out interface 1320. The Request File based Payment Order operation 1318 generates a File based Collective Payment Order Request message 1322. The File based Collective Payment Order Request message 1322 uses Mapping Entity 1324 to transform the file-based message type to a Collective Payment Order Request message 1326 that can be received by the Payment Order Processing at House Bank process component 154. The Collective Payment Order Request message 1326 is in a format that the house bank (a bank located in France) can understand. A collective payment order can be an instruction based on a file transfer to a credit institution to carry out one or more payment transactions (e.g. bank transfers or direct debits). The Payment Order Processing at House Bank process component 154 receives information from the Payment Processing process component using a Payment Order Request communication channel template 1328. The communication channel template 1328 can provide information from a third party about a payment order request.

Interactions Between Process Components "Sales Order Processing" and "Accounting"

Figure 14:
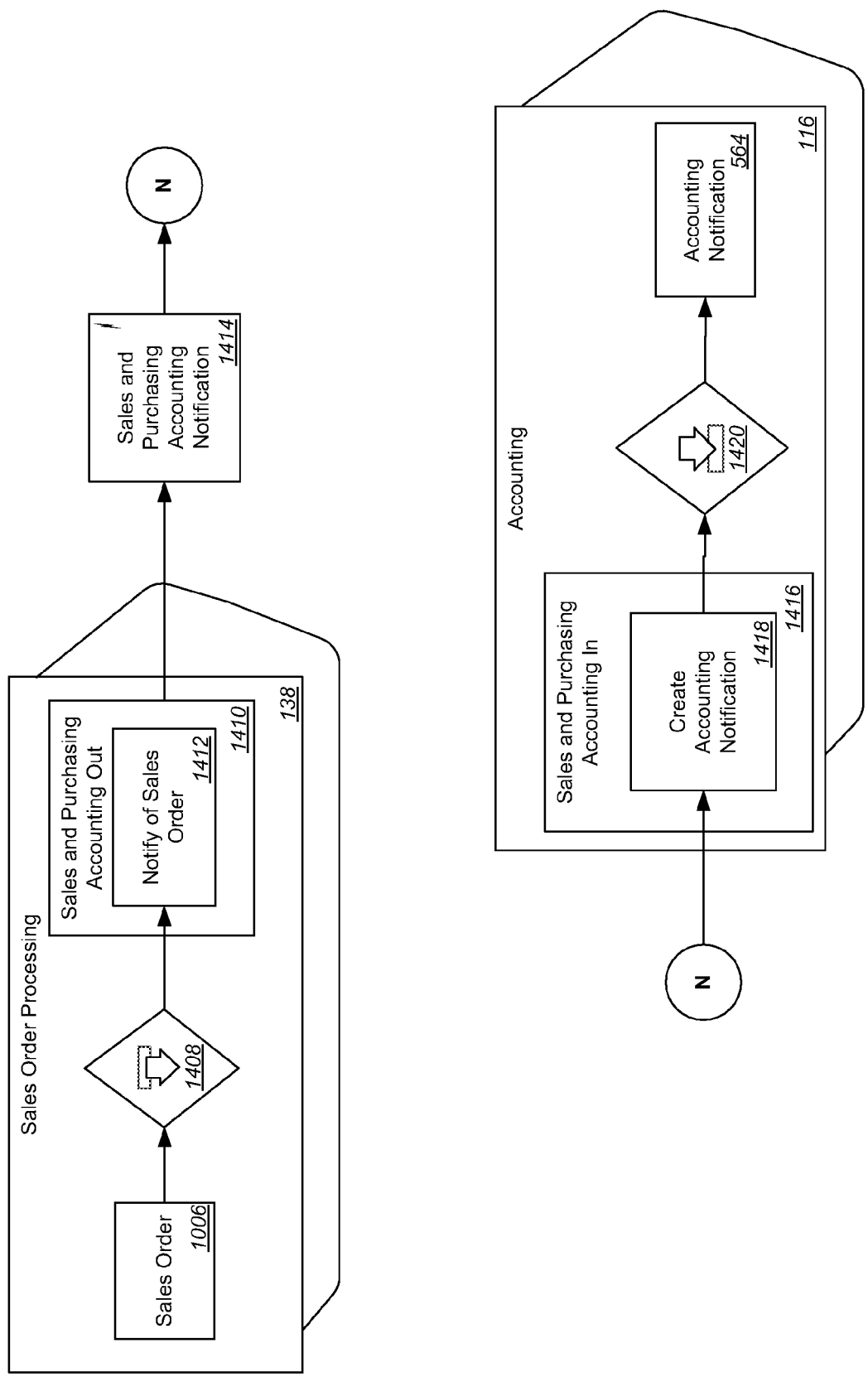
FIG. 14 is a block diagram showing interactions between a Sales Order Processing process component and an Accounting process component.

FIG. 14 is a block diagram showing interactions between the Sales Order Processing process component 138 and the Accounting process component 116 in the architectural design of FIG. 1. The interaction starts when a sales order is created or updated. The Sales Order Processing process component 138 requests from the Accounting process component 116 the creation or update, based on sales, of a subledger account.

As shown in FIG. 14, the Sales Order Processing process component 138 includes the Sales Order business object 1006. The Sales Order business object 1006 represents an agreement between a seller and a customer concerning the sale and delivery of goods, as well as any services that are associated with these processes, on a specific date, for a specific quantity, and for a specific price. The Sales Order business object 1006 uses a Notify of Sales Order to Accounting outbound process agent 1408 to invoke a Notify of Sales Order operation 1412. The operation 1412 notifies the Accounting process component 116 about the creation, change or cancellation of a sales order. The operation 1412 is included in a Sales and Purchasing Accounting Out interface 1410. The operation 1412 generates a Sales and Purchasing Accounting Notification message 1414 that is sent to the Accounting process component 116.

A Create Accounting Notification operation 1418 receives the Sales and Purchasing Accounting Notification message 1414. The operation 1418 is included in a Sales and Purchasing Accounting In interface 1416. The operation 1416 uses a Maintain Subledger Account based on Sales and Purchasing inbound process agent 1420 to update the Accounting Notification business object 564 about the creation, the change or the deletion of any kind of order business objects. The Accounting Notification business object 564 represents a notification sent to Financial Accounting by an operational component regarding a business transaction.

Interactions Between Process Components "Payment Processing" and "Due Item Processing"

Figure 15:
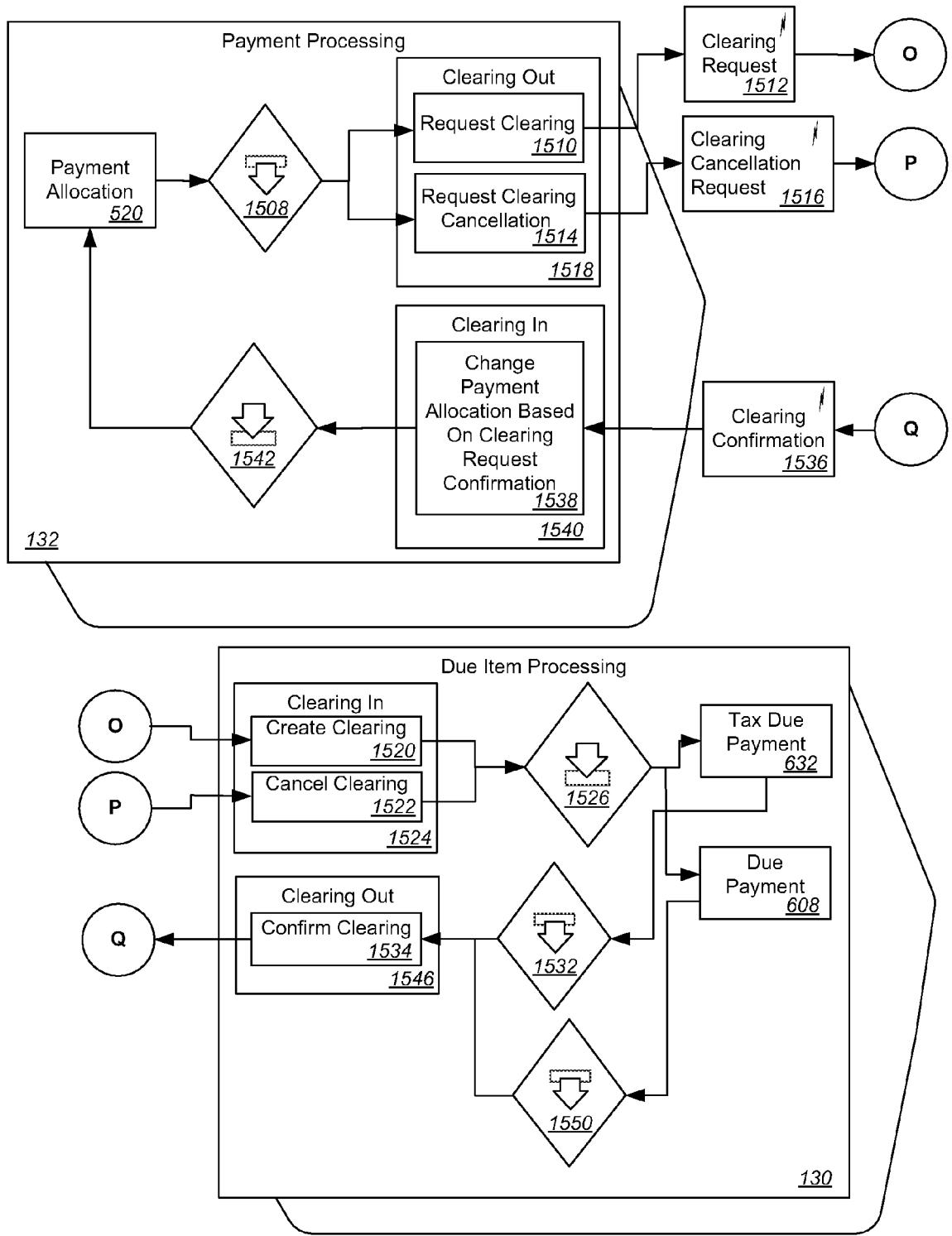
FIG. 15 is a block diagram showing interactions between a Payment Processing process component and a Due Item Processing process component.

FIG. 15 is a block diagram showing interactions between a Payment Processing process component 132 and a Due Item Processing process component 130 in the architectural design of FIG. 1. The interaction starts when a payment allocation is created or cancelled. The Due Item Processing process component 130 is responsible for the clearing of a payment. The Payment Processing process component 132 requests the clearing or the cancellation of a clearing from the Due Item Processing process component 130. The Due Item Processing process component 130 informs the requester about the clearing result.

As shown in FIG. 15, the Payment Processing process component 132 includes the Payment Allocation business object 520. The Payment Allocation business object 520 represents an assignment of a payment item to the payment reasons from which the payment item originated. The business object 520 uses a Request Clearing Maintenance from Payment Allocation to Due Item Processing outbound process agent 1508 to invoke a Request Clearing operation 1510. The operation 1510 generates a Clearing Request message 1512 to request the clearing of payments (payment allocation status set to "released") within the Due Item Processing process component 130.

The business object 520 can also use the outbound process agent 1508 to invoke a Request Clearing Cancellation operation 1514. The operation 1514 generates a Clearing Cancellation Request message 1516 to request the canceling of payments (payment allocation status set to "cancelled"). Both operations 1510 and 1514 are included in a Clearing Out interface 1518 in the Payment Processing process component 132.

A Create Clearing operation 1520 receives the Clearing Request message 1512. A Cancel Clearing operation 1522 receives the Clearing Cancellation Request message 1516. A Clearing In interface 1524 includes the Create Clearing operation 1520 and the Cancel Clearing operation 1522. The Create Clearing operation 1520 creates a clearing for foreign initiated payments. The Cancel Clearing operation 1522 cancels a previously sent clearing request by reference. The Create Clearing operation 1520 and the Cancel Clearing operation 1522 use a Maintain Clearing inbound process agent 1526 to update the Tax Due Payment business object 632 or the Due Payment business object 608, or both. The Tax Due Payment business object 632 represents a payment request or payment confirmation with regard to tax payables and receivables. The Due Payment business object 608 represents a payment request or payment confirmation with regard to trade receivables and payables from goods and services.

The Tax Due Payment business object 632 can use a Confirm Clearing from Tax Due Payment to Payment Processing outbound process agent 1532 to invoke a Confirm Clearing operation 1534. The operation 1534 generates a Clearing Confirmation message 1536. The message 1536 is sent to the Payment Processing process component 132 for a clearing request. The outbound process agent 1532 confirms or rejects the clearing of a foreign-initiated payment for trade receivables payables. The Confirm Clearing operation 1534 is included in a Clearing Out interface 1546.

The Due Payment business object 608 can use a Confirm Clearing from Due Payment to Payment Processing outbound process agent 1550 to invoke the Confirm Clearing operation 1534. The operation 1534 generates a Clearing Confirmation message 1536. The message 1536 is sent to the Payment Processing process component 132 for a clearing request. The outbound process agent 1550 confirms or rejects the clearing of a foreign-initiated payment for trade receivables payables.

The message 1536 is received by a Change Payment Allocation based On Clearing Request Confirmation operation 1538 that confirms the execution or rejection of a sent Clearing Request. The operation 1538 is included in a Clearing In interface 1540. The operation 1538 uses a Change Payment Allocation Based On Clearing Request Confirmation inbound process agent 1542 to update the Payment Allocation business object 520.

Interactions Between Process Components "Logistics Execution Control" and "Site Logistics Processing"

Figure 16:
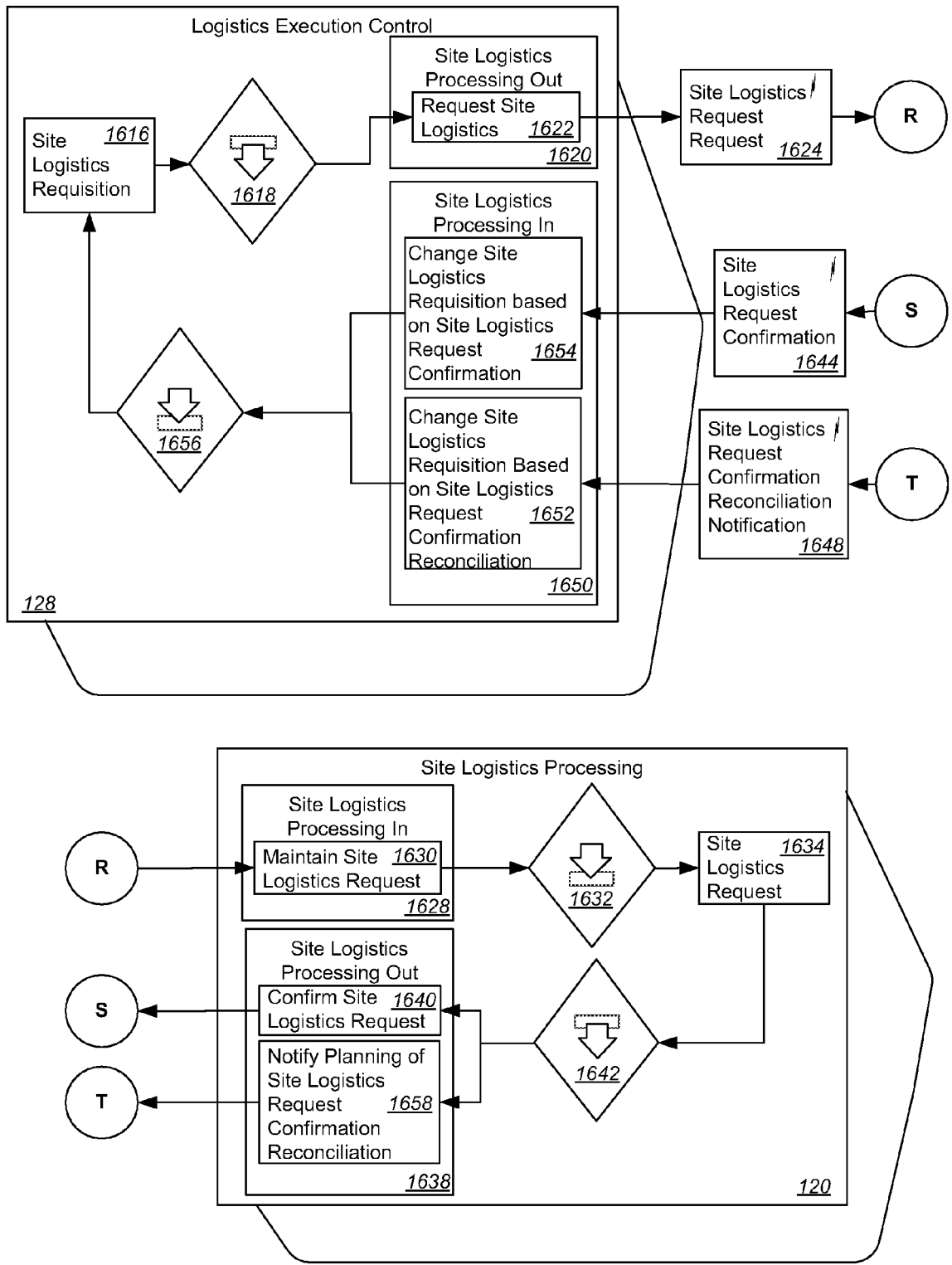
FIG. 16 is a block diagram showing interactions between a Logistics Execution Control process component and a Site Logistics Processing process component.

FIG. 16 is a block diagram showing interactions between the Logistics Execution Control process component 128 and the Site Logistics Processing process component 120 in the architectural design of FIG. 1. Interactions can start when a site logistics requisition is created, changed, or cancelled. Supply chain control requests the creation, update, or cancellation of a site logistics request from the Site Logistics Processing process component 120. The Site Logistics Processing process component 120 confirms the performed action to the requester and notifies the requester of the progress of the request.

As shown in FIG. 16, the Logistics Execution Control process component 128 includes a Site Logistics Requisition business object 1616. The Site Logistics Requisition business object 1616 represents a request to logistics execution to execute a site logistics process for a certain quantity of material, by a certain time.

The business object 1616 uses a Request Site Logistics Processing from Site Log Request to Site Logistics Processing outbound process agent 1618 to invoke a Request Site Logistics operation 1622. The operation 1622 is included in a Site Logistics Processing Out interface 1620. The Request Site Logistics operation 1622 generates a Site Logistics Request Request message 1624. The message 1624 is sent to the Site Logistics Processing process component 120 in order to maintain the site logistics request.

The message 1624 is received by a Maintain Site Logistics Request operation 1630. The operation 1630 is included in a Site Logistics Processing In interface 1628. The Maintain Site Logistics Request operation 1630 uses a Maintain Site Logistics Request inbound process agent 1632 to update a Site Logistics Request business object 1634. The business object 1634 represents an internal request for site logistics to prepare and perform, within a certain time period, an outbound, inbound, or internal site logistics process.

The business object 1634 uses a Confirm Site Logistics Request to Logistic Execution Control outbound process agent 1642 to invoke a Notify Planning of Site Logistics Request Confirmation Reconciliation operation 1658 which notifies the planning system of a reconciliation of a site logistics request confirmation. The operation 1658 generates a Site Logistics Request Confirmation Reconciliation Notification message 1648. The message 1648 is received by a Change Site Logistics Requisition Based on Site Logistics Request Confirmation Reconciliation operation 1652. The operation 1652 uses a Maintain Site Logistics Requisition Based on Site Logistics inbound process agent 1656 to update the Site Logistics Requisition business object 1616.

Alternatively, the Confirm Site Logistics Request to Logistic Execution Control outbound process agent 1642 can invoke a Confirm Site Logistics Request operation 1640, which confirms receipt of the request and acknowledges quantities and delivery dates. The operation 1640 generates a Site Logistics Request Confirmation message 1644, which is sent to the Logistics Execution Control process component 128. The message 1642 is received by a Change Site Logistics Requisition Based on Site Logistics Request Confirmation operation 1654. The operation 1654 uses a Maintain Site Logistics Requisition Based on Site Logistics inbound process agent 1656 to update the Site Logistics Requisition business object 1616. A Site Logistics Processing Out interface 1638 includes the Confirm Site Logistics Request operation 1640 and the Notify Planning of Site Logistics Request Confirmation Reconciliation operation 1658.

The Logistics Execution Control process component 128 includes a Site Logistics Processing In interface 1650. The Site Logistics Processing In interface 1650 includes the Change Site Logistics Requisition based on Site Logistics Request Confirmation operation 1654 and the Change Site Logistics Requisition Based on Site Logistics Request Confirmation Reconciliation operation 1652.

Interactions Between Process Components "Sales Order Processing" and "Customer Requirement Processing"

Figure 17A:
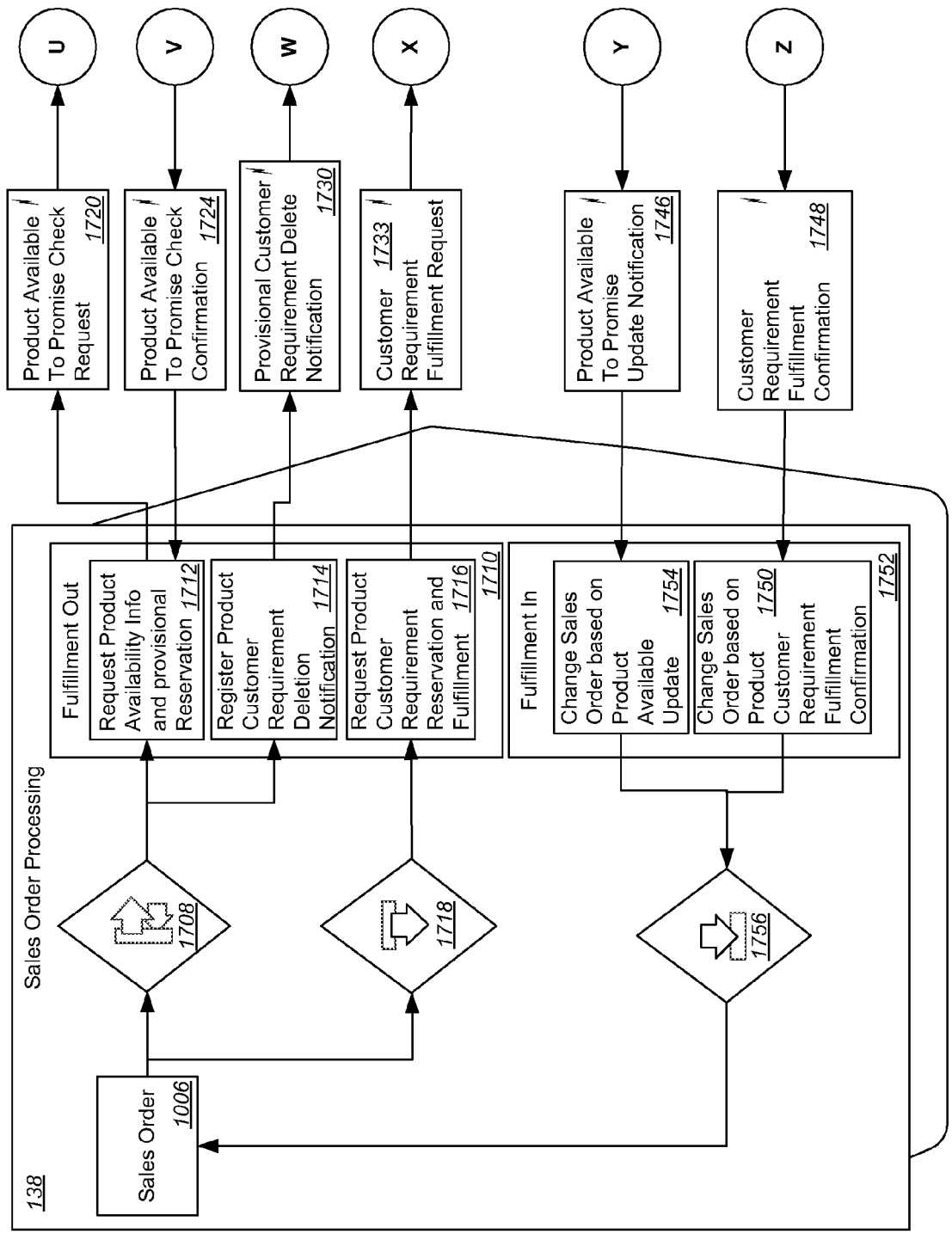
FIGS. 17A and 17B are block diagrams collectively showing interactions between a Sales Order Processing process component and a Customer Requirement Processing process component.
Figure 17B:
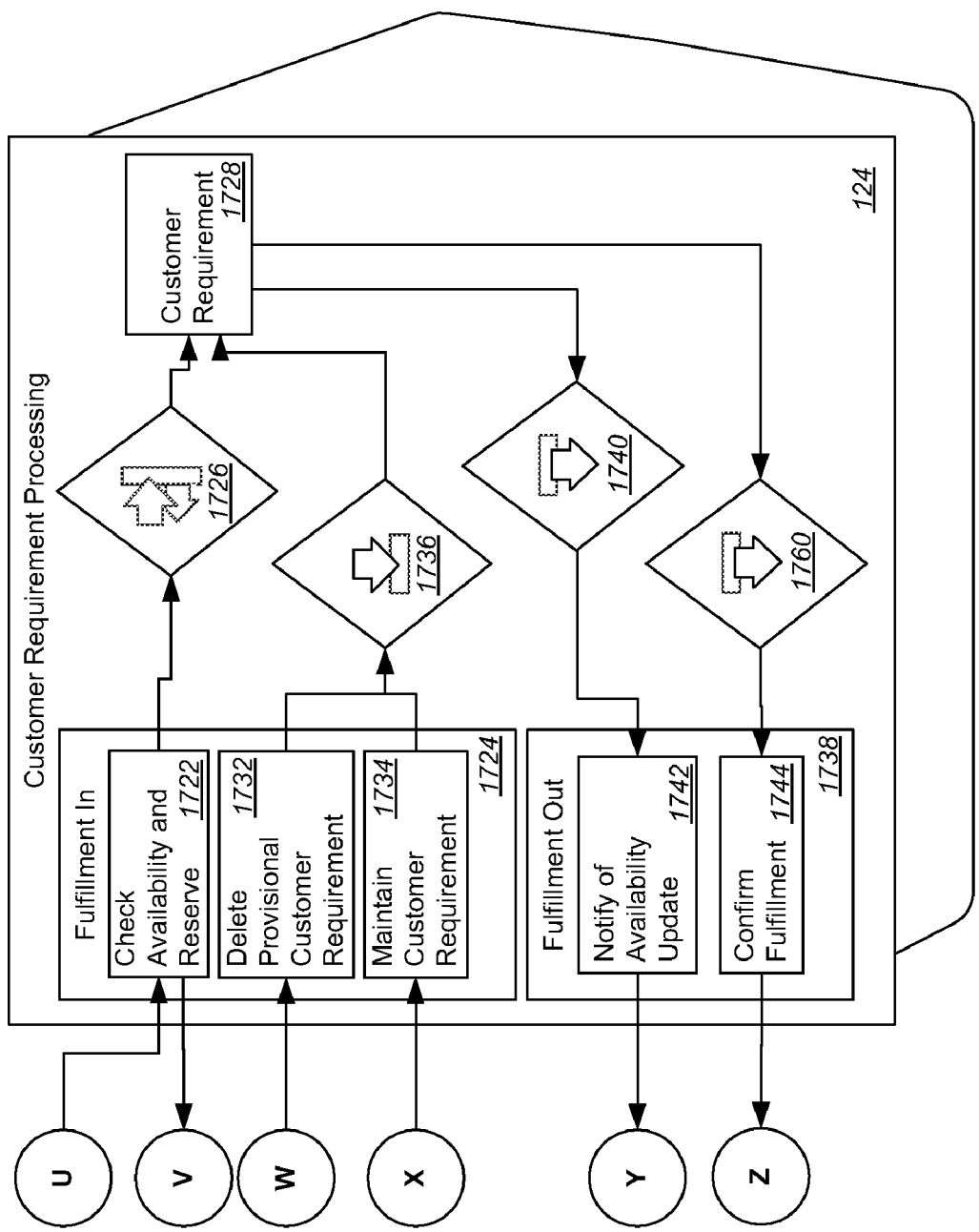

FIGS. 17A and 17B are block diagrams collectively showing interactions between the Sales Order Processing process component 138 and the Customer Requirement Processing process component 124 in the architectural design of FIG. 1. An interaction starts when the Sales Order Processing process component 138 requests an availability check for the ordered product from the Customer Requirement Processing process component 124 when a sales order is created or updated and requests the fulfillment of the sales order when the order is saved. The Customer Requirement Processing process component 124 then notifies Sales Order Processing process component 138 when the availability situation changes and confirms the fulfillment of the order.

As shown in FIGS. 17A and 17B, the Sales Order Processing process component 138 includes a Sales Order business object 1006. The Sales Order business object 1006 represents an agreement between a seller and a customer concerning the sale and delivery of goods, as well as any services that are associated with these processes, on a specific date, for a specific quantity, and for a specific price. The Sales Order business object 1006 uses a Synchronous Request Product Availability Information from Sales Order to Customer Requirements outbound process agent 1708 to invoke a Synchronous Request Product Availability Info and Provisional Reservation operation 1712. The operation 1712 requests product availability information including the creation of a provisional reservation for a customer requirement (e.g., a sales order) from the Customer Requirement Processing process component 124.

Alternatively, the Synchronous Request Product Availability Information from Sales Order to Customer Requirements outbound process agent 1708 can invoke a Register Customer Requirement Deletion Notification operation 1714. The operation 1714 registers a provisional requirement reservation for deletion and triggers deletion in case of failure or cancellation of transaction processing.

The Sales Order business object 1006 may also use a Request Requirement Reservation and Fulfillment from Sales Order to Customer Requirement outbound process agent 1718 to invoke a Request Product Requirement Reservation and Fulfillment operation 1716. The operation 1716 requests reservation and fulfillment information for a customer requirement (e.g., a sales order). A Fulfillment Out interface 1710 includes the Request Product Availability Information and Provisional Reservation operation 1712, the Register Product Customer Requirement Deletion Notification operation 1714, and the Request Customer Requirement Reservation and Fulfillment operation 1716.

If the Request Product Availability Information and Provisional Reservation operation 1712 is invoked, a Product Available to Promise Check Request message 1720 is generated. The message 1720 is sent to the Customer Requirement Processing process component 124 where it is received by a Synchronous Check Availability and Reserve operation 1722. The message 1720 is a binding request to check the availability of specified amounts of specified materials at specified dates and to reply with a binding statement concerning which amounts of which materials are available at which dates. The operation 1722 checks the availability of certain amounts of certain materials and confirms this availability to the caller. The operation 1722 uses a Check Availability and Reserve inbound process agent 1726 to update a Customer Requirement business object 1728. The Customer Requirement business object 1728 represents a requirement that is derived from a sales order, quotation, or service order and to which details on the anticipated availability date of materials required to fulfill the requirement may be added. It can include the quantities of materials required at specific dates as well as information about which materials will be available or delivered in which quantities at which dates.

A Product Available To Promise Check Confirmation message 1724 is sent back to the Sales Order Processing process component 138 from the Synchronous Check Availability and Reserve operation 1722 to confirm the receipt of the request. The message 1724 is the confirmation of the availability of certain amounts of certain products at certain dates.

If the Register Product Customer Requirement Deletion Notification operation 1714 is invoked, a Provisional Customer Requirement Deletion Notification message 1730 is generated. The message 1730 is sent to the Customer Requirement Processing process component 124 where it is received by a Delete Provisional Customer Requirement operation 1732. The operation 1732 deletes provisional customer requirements that have been created by the Check Availability and Reserve operation 1722. The operation 1732 uses a Maintain Customer Requirement process agent 1736 to update the Customer Requirement business object 1728. The operation 1732 receives a customer requirement fulfillment request and updates the corresponding customer requirement instance in the Customer Requirement business object 1728.

If the Request Product Customer Requirement Reservation and Fulfillment operation 1716 is invoked, a Customer Requirement Fulfillment Request message 1733 is generated. The message 1733 is sent to the Customer Requirement Processing process component 124 where it is received by a Maintain Customer Requirement operation 1734 that creates or changes a customer requirement. The message 1733 is a request to fulfill a sales order or the material flow-relevant parts of a service order or to prepare the fulfillment, or the change of cancellation of such a request. The operation 1734 creates or changes a customer requirement. The operation 1734 uses the Maintain Customer Requirement inbound process agent 1736 to update the Customer Requirement business object 1728 about the request, deletion or fulfillment of the sales order. The Check Availability and Reserve operation 1722, the Delete Provisional Customer Requirement operation 1732, and the Maintain Customer Requirement operation 1734 are included in a Fulfillment In interface 1724 in the Customer Requirement Processing process component 124.

The Customer Requirement business object 1728 uses a Notify of Available Update from Customer Requirement outbound process agent 1740 to invoke a Notify of Availability Update operation 1742. The operation 1742 generates a Product Available To Promise Update Notification message 1746. The message 1746 is sent to the Sales Order Processing process component 138. The operation 1742 notifies the creator of a customer requirement about an updated availability situation for the products requested within the customer requirement.

Alternatively, the Sales Order business object 1728 may use Confirm Fulfillment of Customer Requirement outbound process agent 1760 to invoke a Confirm Fulfillment operation 1744. The operation 1744 confirms the partial or complete fulfillment of a customer requirement to the creator of the requirement. The operation 1744 generates a Customer Requirement Fulfillment Confirmation message 1748. The message 1748 is sent to the Sales Order Processing process component 138. A Fulfillment Out interface 1738 in the Customer Requirement Processing process component 124 includes the Notify of Availability Update operation 1742 and the Confirm Fulfillment operation 1744.

A Change Sales Order based on Product Available Update operation 1754 receives the Product Available To Promise Update Notification message 1746. The operation 1754 changes the sales order with availability and reservation information based on changes in fulfillment planning. The operation 1754 uses a Change Sales Order based on Customer Requirement inbound process agent 1756 to update the Sales Order business object 1006.

Alternatively, a Change Sales Order based on Product Customer Requirement Fulfillment Confirmation operation 1750 receives the Customer Requirement Fulfillment Confirmation message 1748. The operation 1750 updates a sales order with information from fulfillment confirmation. This may include, for example, an update of status and delivered quantity. The operation 1750 uses a Change Sales Order based on Customer Requirement inbound process agent 1756 to update the Sales Order business object 1006.

The Change Sales Order based on Product Available Update operation 1754 and the Product Customer Requirement Fulfillment Confirmation operation 1750 are included in a Fulfillment In interface 1752 in the Sales Order Processing process component 138.

Interactions Between Process Components "Outbound Delivery Processing" and "Inbound Delivery Processing at Customer"

Figure 18:
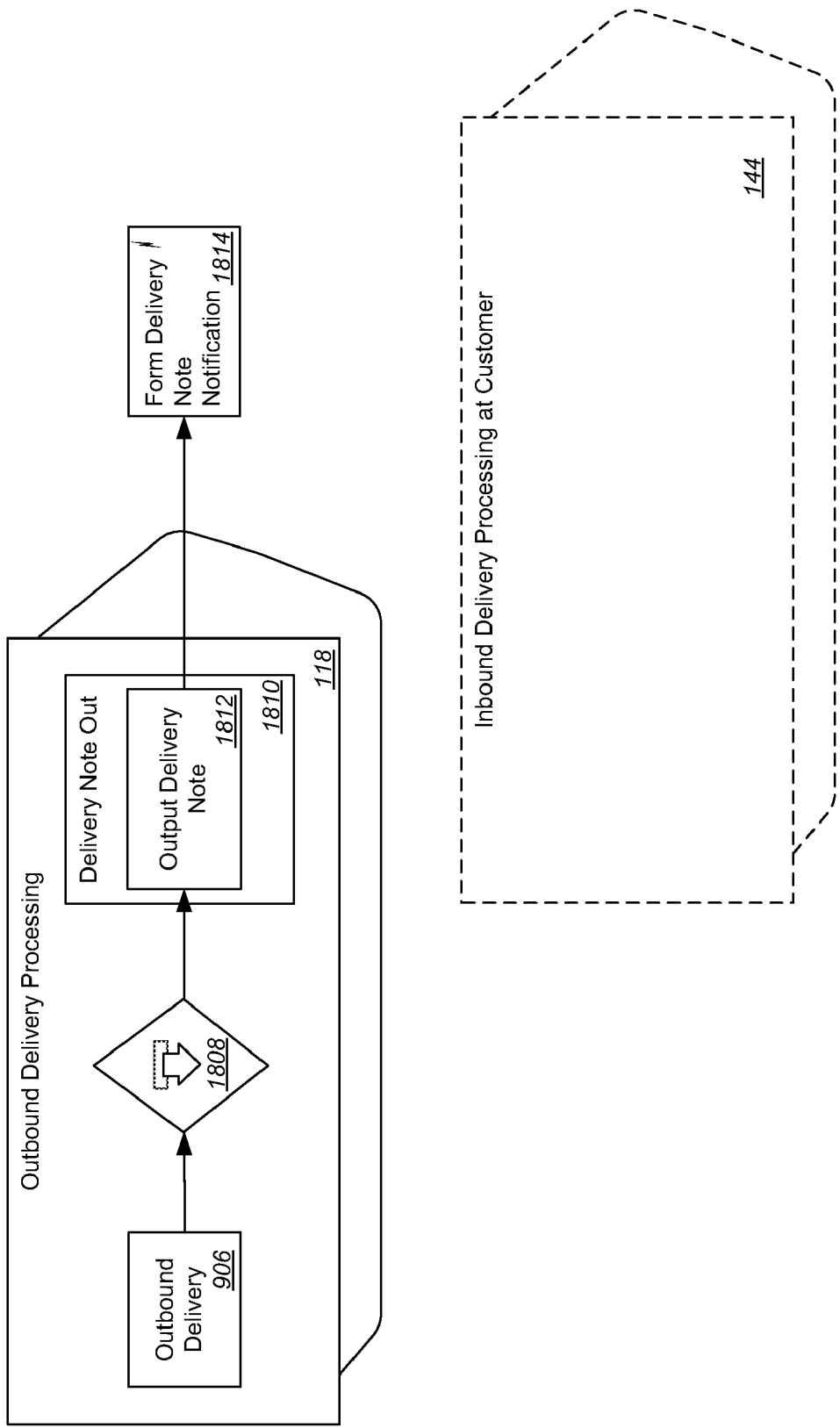
FIG. 18 is a block diagram showing interactions between an Outbound Delivery Processing process component and an Inbound Delivery Processing at Customer process component.

FIG. 18 is a block diagram showing interactions between the Outbound Delivery Processing process component 118 and the Inbound Delivery Processing at Customer process component 144 in the architectural design of FIG. 1. The interaction starts when an outbound delivery is completed or cancelled. The Outbound Delivery Processing process component 118 notifies the customer about the expected deliveries.

As shown in FIG. 18, the Outbound Delivery Processing process component 118 includes the Outbound Delivery business object 906. The Outbound Delivery business object 906 represents a composition of the goods that are provided for shipping by a vendor. The business object 906 uses a Notify of Outbound Delivery outbound process agent 1808 to invoke an Output Delivery Note operation 1812. The operation 1812 is included in a Delivery Note Out interface 1810. The operation 1812 sends a dispatched delivery notification to the Inbound Delivery Processing at Customer process component 144. The operation 1812 generates a Form Delivery Note Notification message 1814 that is sent to the Inbound Delivery Processing at Customer process component 144.

Interactions Between Process Components "Site Logistics Processing" and "Accounting"

Figure 19:
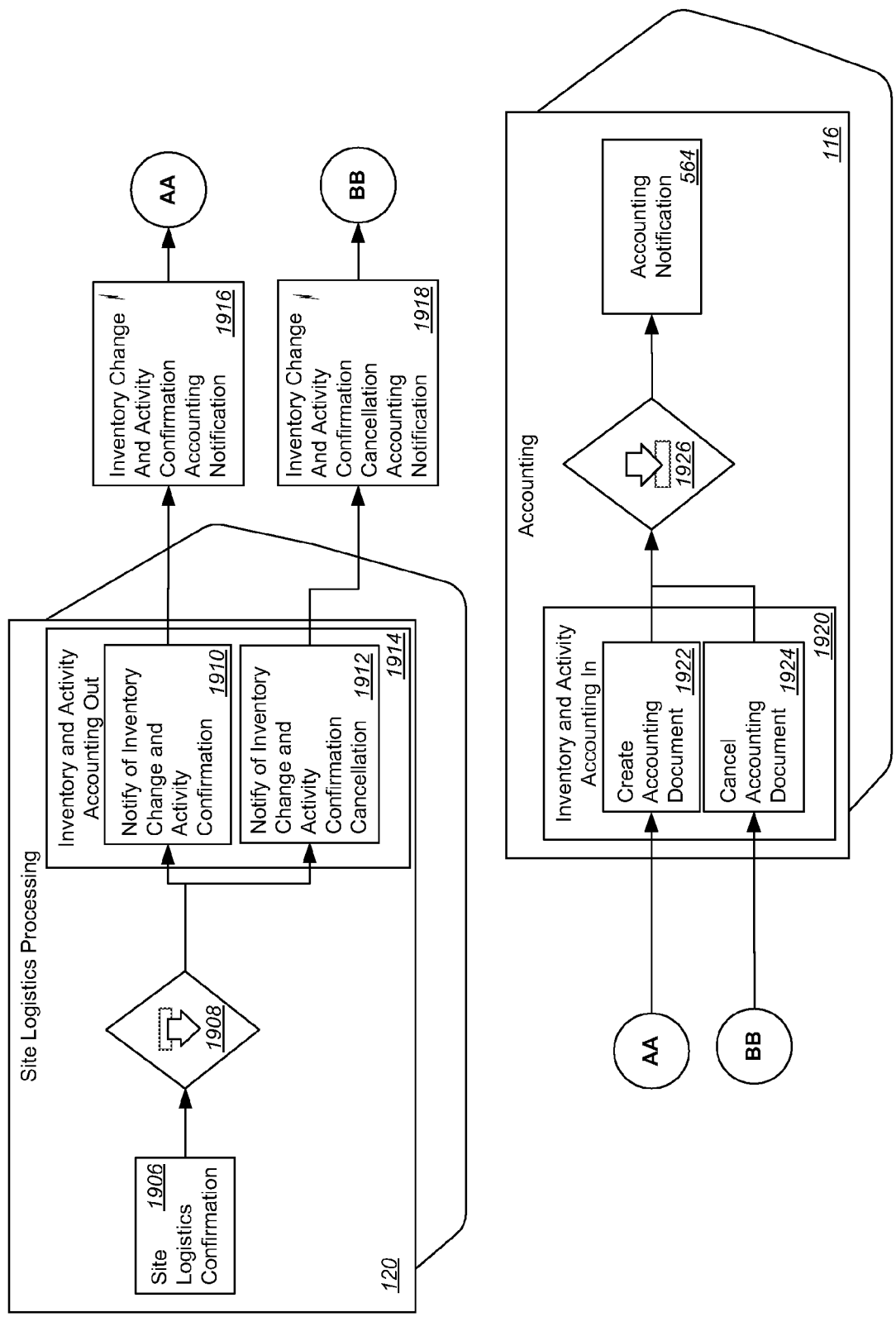
FIG. 19 is a block diagram showing interactions between a Site Logistics Processing process component and an Accounting process component.

FIG. 19 is a block diagram showing interactions between the Site Logistics Processing process component 120 and the Accounting process component 116 in the architectural design of FIG. 1. An interaction starts when a site logistics confirmation is created. The Site Logistics Processing process component 120 notifies the Accounting process component 116 of confirmed or cancelled inventory changes. The inventory changes may be used to update the Accounting process component 116.

As shown in FIG. 19, the Site Logistics Processing process component 120 includes a Site Logistics Confirmation business object 1906. The Site Logistics Confirmation business object 1906 can represent a record of confirmed logistic process changes which result from the execution of a site logistics process at a specific time (e.g., inventory changes, plan adjustments, resource utilizations, or progress status changes).

The Site Logistics Confirmation business object 1906 uses a Notify of Inventory Change from Site Logistics Confirmation to Accounting outbound process agent 1908 to invoke a Notify of Inventory Change and Activity Confirmation operation 1910. Alternatively, a Notify of Inventory Change and Activity Confirmation Cancellation operation 1912 may be invoked. Both operations 1910 and 1912 are included in an Inventory and Activity Accounting Out interface 1914.

The Notify of Inventory Change and Activity Confirmation operation 1910 generates an Inventory Change and Activity Confirmation Accounting Notification message 1916. The message 1916 is sent to the Accounting process component 116. Alternatively, the Notify of Inventory Change and Activity Confirmation Cancellation operation 1912 generates an Inventory Change and Activity Confirmation Cancellation Accounting Notification message 1918. The message 1918 is sent to the Accounting process component 116.

A Create Accounting Document operation 1922 receives the Inventory Change and Activity Confirmation Accounting Notification message 1916. The operation 1922 creates an accounting document. A Cancel Accounting Document operation 1924 receives the Inventory Change and Activity Confirmation Cancellation Accounting Notification message 1918. The operation 1924 cancels requests received. The operations 1922 and 1924 use a Maintain Accounting Document based on Inventory and Activity inbound process agent 1926 to update the Accounting Notification business object 564. The business object 564 represents a notification sent to Financial Accounting by an operational component regarding a business transaction. Both operations 1922 and 1924 are included in an Inventory and Accounting In interface 1920.

Interactions Between Process Components "Customer Quote Processing" and "Customer Requirement Processing"

Figure 20:
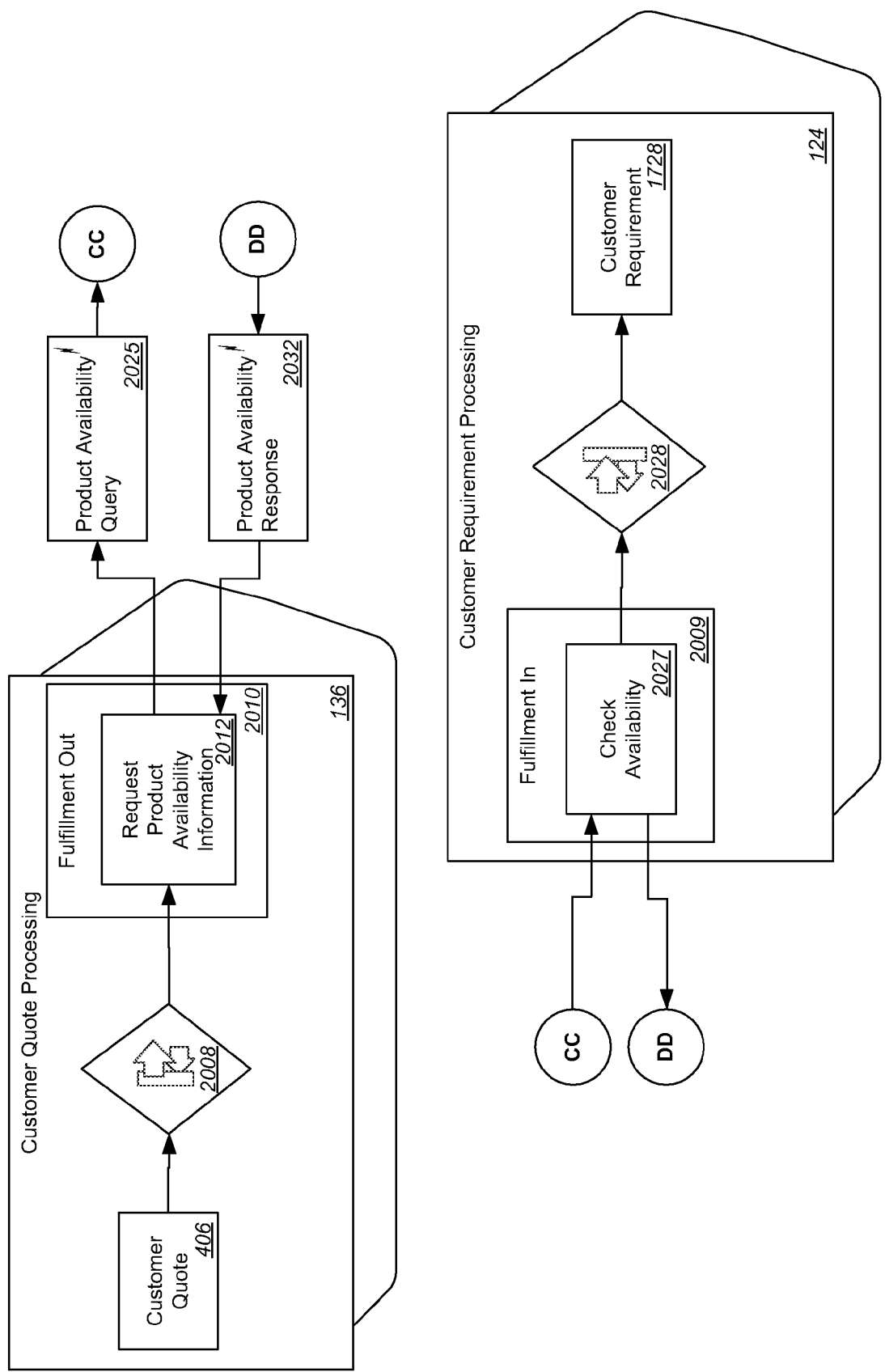
FIG. 20 is a block diagram showing interactions between a Customer Quote Processing process component and a Customer Requirement Processing process component.

FIG. 20 is a block diagram showing interactions between the Customer Quote Processing process component 136 and the Customer Requirement Processing process component 124 in the architectural design of FIG. 1. An interaction starts when the Customer Quote Processing process component 136 requests an availability check for the desired product from Customer Requirement Processing process component 124 when a customer quote is created or updated. The Customer Quote Processing process component 136 also requests preparation of the fulfillment when it is saved. The Customer Requirement Processing process component 124 then notifies Customer Quote Processing process component 136 when the availability situation changes.

As shown in FIG. 20, the Customer Quote Processing process component 136 includes a Customer Quote business object 406. The Customer Quote business object 406 represents an offer by a seller to a customer for the delivery of goods or services according to fixed terms. The offer is legally binding for the seller for a specific period of time. The Customer Quote business object 406 uses a Synchronous Request Product Availability from Customer Quote to Customer Requirements outbound process agent 2008 to invoke a Request Product Availability Information operation 2012. The operation 2012 is included in a Fulfillment Out interface 2010. The operation 2012 can request product availability information for customer quote items. The Request Product Availability Information operation 2012 generates a Product Availability Query message 2025. The message 2025 is sent to the Customer Requirement Processing process component 124.

A synchronous Check Availability operation 2027 receives the Product Availability Query message 2025. The operation 2027 is included in a Fulfillment In interface 2009. The operation 2027 uses a Check Availability inbound process agent 2028 to update the Customer Requirement business object 1728. The message 2025 is a non-binding query for the availability of specified amounts of specified products at specified dates. The operation 2027 checks the availability of certain amounts of materials at certain dates and sends this information back to the Customer Quote Processing process component 136. The Customer Requirement business object 1728 represents a requirement that is derived from a sales order, quotation, or service order and to which details on the anticipated availability date of materials required to fulfill the requirement may be added. It can include the quantities of materials required at specific dates as well as information about which materials will be available or delivered in which quantities at which dates.

The Check Availability operation 2027 may generate a Product Availability Response message 2032. The message 2032 is received by the Request Product Availability Information operation 2012 in the Customer Quote Processing process component 136. The message 2032 is a non-binding response about which amounts of products are available at which dates.

Interactions Between Process Components "Due Item Processing" and "Payment Processing"

Figure 21A:
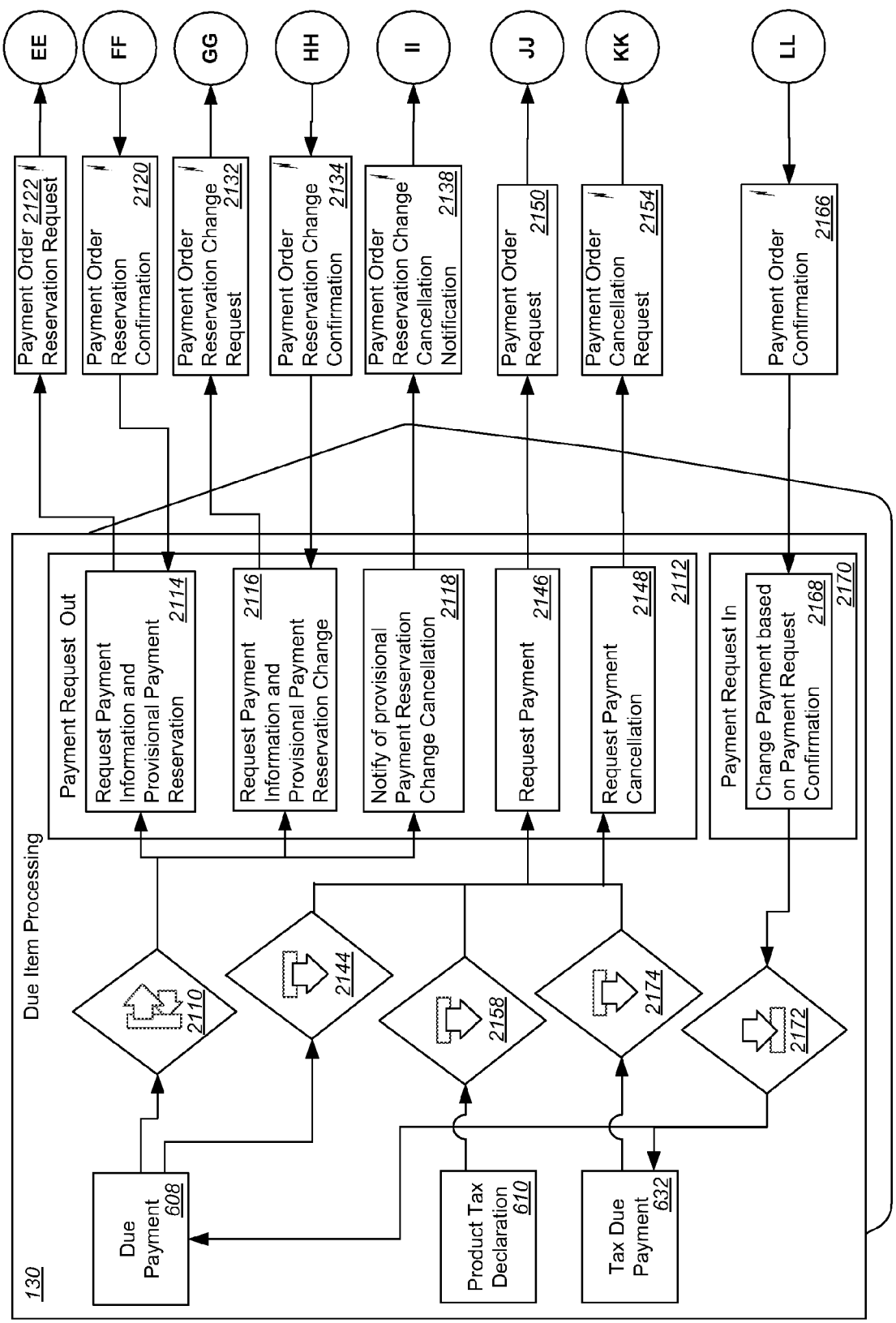
FIGS. 21A and 21B are block diagrams collectively showing interactions between a Due Item Processing process component and a Payment Processing process component.
Figure 21B:
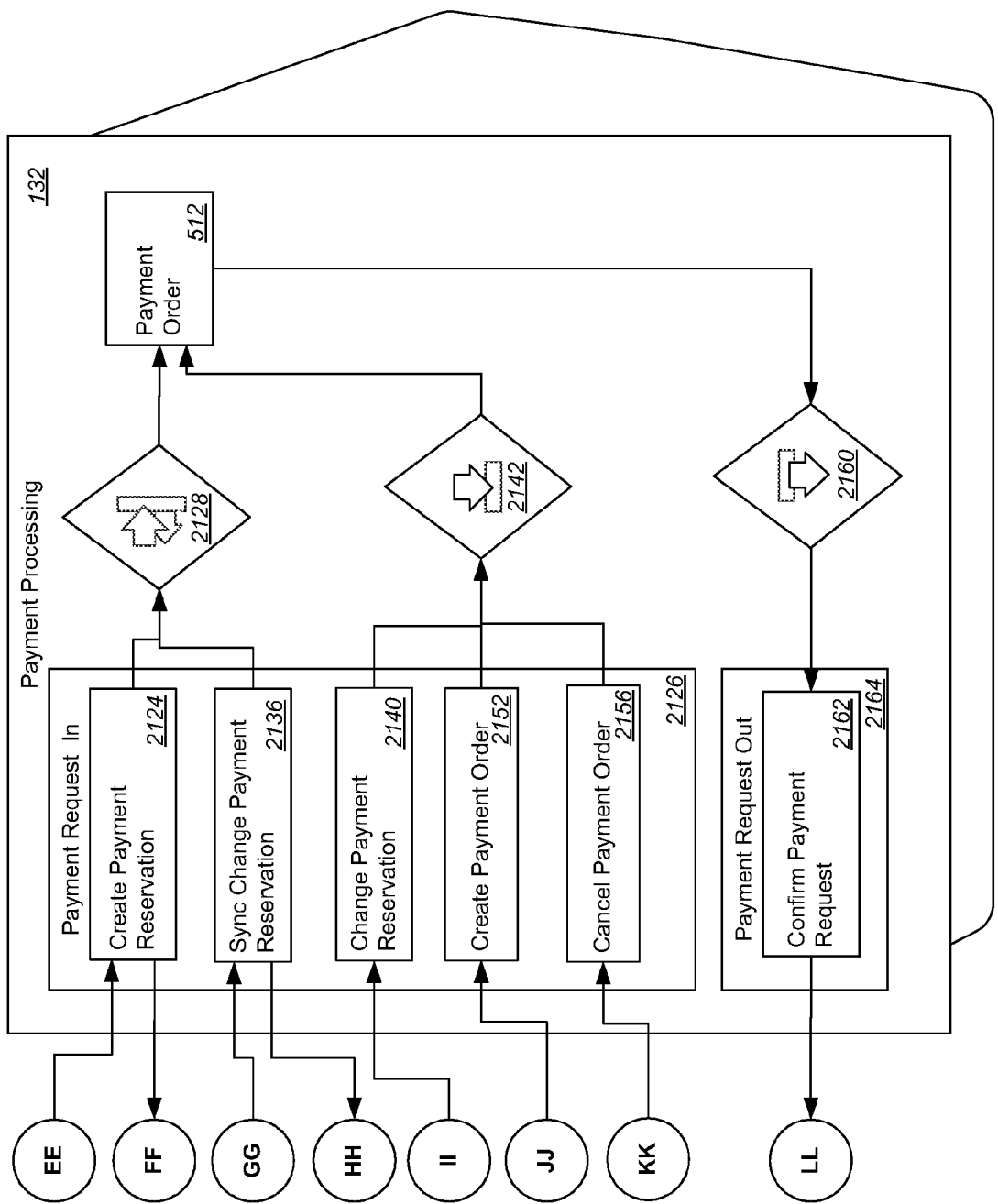

FIGS. 21A and 21B are block diagrams showing interactions between the Due Item Processing process component 130 and the Payment Processing process component 132 in the architectural design of FIG. 1. Interactions can start when a payment for trade or tax receivables or payables is initiated or cancelled. The Due Item Processing process component 130 can request a creation or a cancellation of a payment order from the Payment Processing process component 132, and the Payment Processing process component 132 can then confirm the payment execution to the requester.

The Due Item Processing process component 130 includes the Due Payment business object 608, the Product Tax Declaration business object 610, and the Tax Due Payment business object 632. The Due Payment business object 608 represents a payment request or a payment confirmation related to trade receivables and payables from goods and services. The Product Tax Declaration business object 610 represents a declaration of the product tax payables/receivables of a company to the responsible tax authority according to the tax declaration arrangement and legal requirements that trigger the payment to the tax authority. The Tax Due Payment business object 632 represents a payment request or payment confirmation with regard to tax payables and receivables.

The Due Payment business object 608 uses the Synchronous Request Payment Reservation from Due Payment to Payment Processing outbound process agent 2110 to invoke one or more operations. The outbound process agent 2110 can invoke a Request Payment Information and Provisional Payment Reservation operation 2114, a Request Payment Information and Provisional Payment Reservation Change operation 2116, and a Notify of Provisional Payment Reservation Change Cancellation operation 2118. The operations 2114, 2116, and 2118 are included in a Payment Request Out interface 2112. The Request Payment Information and Provisional Payment Reservation operation 2114 can request payment information with a provisional reservation of money in Payment Processing. The Request Payment Information and Provisional Payment Reservation Change operation 2116 can request payment information with a change of provisional reservation of money in Payment Processing. The Notify of Provisional Payment Reservation Change Cancellation operation 2118 can register a change of a provisional payment to the last transactional or saved state.

The operation 2114 generates a Payment Order Reservation Request message 2122. The operation 2114 can also receive a Payment Order Reservation Confirmation message 2120. The message 2120 is generated by a Create Payment Reservation operation 2124. The message 2122 is received by the Create Payment Reservation operation 2124. The operation 2124 is included in a Payment Request In interface 2126 in the Payment Processing process component 132. The Create Payment Reservation operation 2124 can check and determine payment data and create a reservation of payment. After the reservation is created, the operation 2124 can confirm the reservation creation to the caller.

The Payment Processing process component 132 includes the Payment Order business object 512. The operation 2124 uses a Synchronous Maintain Payment Reservation inbound process agent 2128 to update the Payment Order business object 512. The inbound process agent 2128 can create, change and cancel the Payment Order business object 512 for a reservation request. The Payment Order business object 512 represents an order (e.g., a collective instruction that contains several separate instructions) within a company to make a payment to a business partner in a period of time.

The Request Payment Information and Provisional Payment Reservation Change operation 2116 generates a Payment Order Reservation Change Request message 2132. The operation 2116 can also receive a Payment Order Reservation Change Confirmation message 2134. The message 2134 is generated by a Synchronous Change Payment Reservation operation 2136. The message 2134 is received by the Synchronous Change Payment Reservation operation 2136. The operation 2136 is included in the Payment Request In interface 2126 of the Payment Processing process component 132. The Synchronous Change Payment Reservation operation 2136 can synchronously change a reservation of payment and confirm the change to the caller. After the reservation is changed, the operation 2136 can confirm the reservation change to the caller. The operation 2136 uses the Synchronous Maintain Payment Reservation inbound process agent 2128 to update the Payment Order business object 512.

The Notify of Provisional Payment Reservation Change Cancellation operation 2118 generates a Payment Order Reservation Change Cancellation Notification message 2138. The message 2138 is received by a Change Payment Reservation operation 2140. The operation 2140 is included in the Payment Request In interface 2126. The Change Payment Reservation operation 2140 can change a reservation of payment and confirm the change to the caller. The operation 2140 uses a Maintain Payment Order inbound process agent 2142 to create or update the Payment Order business object 512.

The Due Payment business object 608 also uses a Request Payment from Due Payment to Payment Processing outbound process agent 2144 to invoke a Request Payment operation 2146 or a Request Payment Cancellation operation 2148. The operations 2146 and 2148 are included in the Payment Request Out interface 2112. The Request Payment operation 2146 can send a request for payment to the Payment Processing process component 132. The request may confirm a provisional payment made before. The Request Payment Cancellation operation 2148 can cancel at least one provisional, requested or ordered payment.

The Request Payment operation 2146 generates a Payment Order Request message 2150. The message 2150 is received by a Create Payment Order operation 2152. The operation 2152 is included in the Payment Request In interface 2126. The Create Payment Order operation 2152 can create a request for payment. The operation 2152 uses the Maintain Payment Order inbound process agent 2142 to update the Payment Order business object 512.

The Request Payment Cancellation operation 2148 generates a Payment Order Cancellation Request message 2154. The message 2154 is received by a Cancel Payment Order operation 2156. The operation 2156 is included in the Payment Request In interface 2126. The Cancel Payment Order operation 2156 can cancel a request for payment. The operation 2156 uses the Maintain Payment Order inbound process agent 2142 to update the Payment Order business object 512.

The Product Tax Declaration business object 610 uses a Request Payment from Product Tax Declaration to Payment Processing outbound process agent 2158 to invoke the Request Payment operation 2146 or the Request Payment Cancellation operation 2148. The outbound process agent 2158 invokes the Request Payment operation 2146 to initiate a payment request. The outbound process agent 2158 invokes the Request Payment Cancellation operation 2148 to cancel a payment request.

The Payment Order business object 512 uses a Confirm Payment Request from Payment Order to Due Item Processing outbound process agent 2160 to invoke a Confirm Payment Request operation 2162. The outbound process agent 2160 confirms a processing status of a payment to the sender of a payment request by invoking a Confirm Payment Request operation 2162, which is included in a Payment Request out interface 2164. The Confirm Payment Request operation 2162 generates a Payment Order Confirmation message 2166. The message 2166 is received by a Change Payment based on Payment Request Confirmation operation 2168. The Change Payment based on Payment Request Confirmation operation 2168 is included in a Payment Request In interface 2170. The operation 2168 confirms the execution of a payment request or a payment request cancellation. The operation uses a Change Payment based on Payment Request Confirmation inbound process agent 2172 to update a processing status of the Due Payment business object 608 or the Tax Due Payment business object 632 based on the confirmation of a payment request, or a payment request cancellation.

The Tax Due Payment business object 632 uses a Request Payment from Tax Due Payment to Payment Processing outbound process agent 2174 to invoke the Request Payment operation 2146 or the Request Payment Cancellation operation 2148. The outbound process agent 2174 invokes the Request Payment operation 2146 to initiate a payment request. The outbound process agent 2174 invokes the Request Payment Cancellation operation 2148 to cancel a payment request.

Interactions Between Process Components "Purchase Order Processing at Customer" and "Sales Order Processing"

Figure 22:
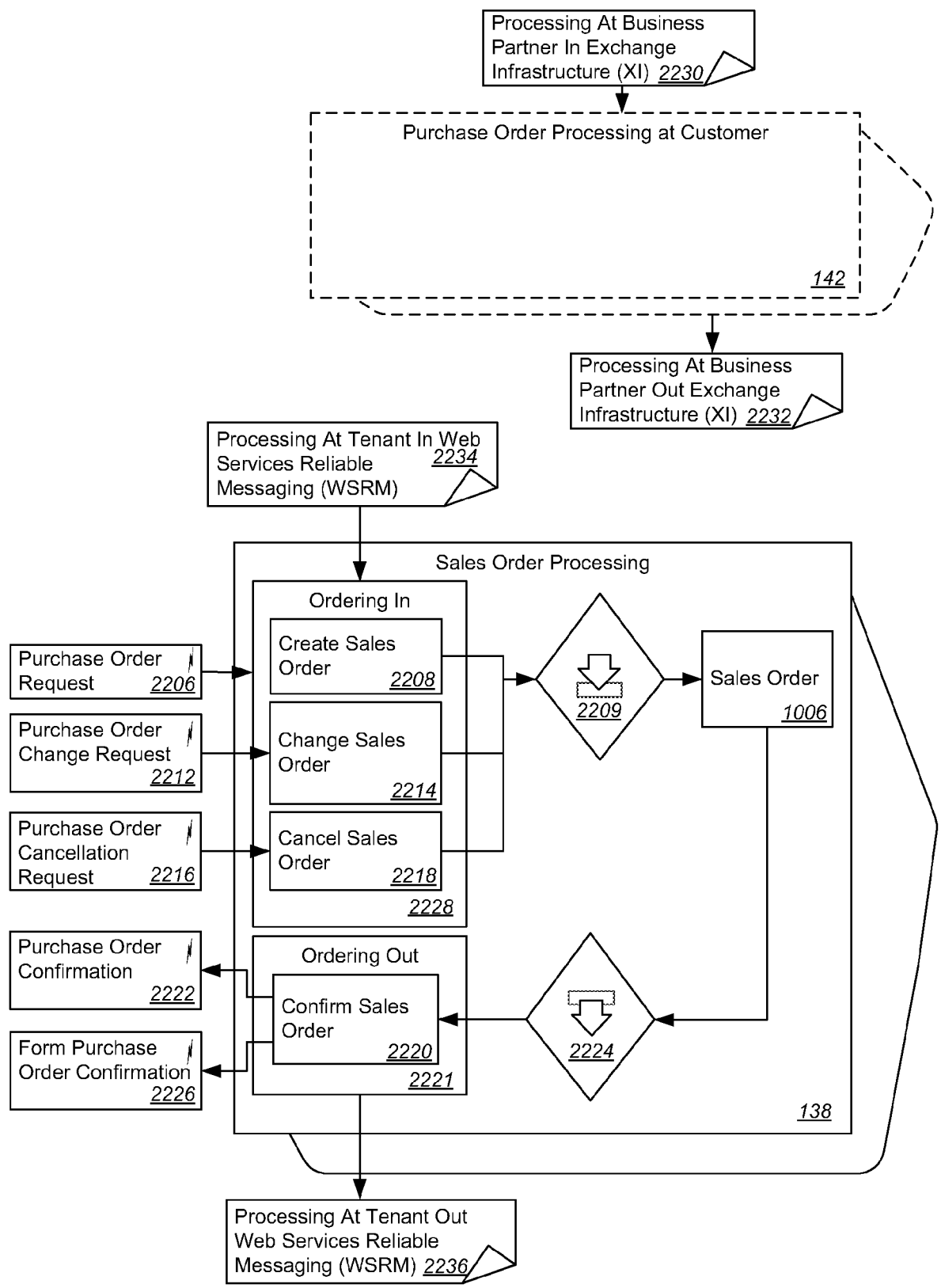
FIG. 22 is a block diagram showing interactions between a Purchase Order Processing at Customer process component and a Sales Order Processing process component.

FIG. 22 is a block diagram showing interactions between the Purchase Order Processing at Customer process component 142 and the Sales Order Processing process component 138 in the architectural design of FIG. 1. The interaction starts when a purchase order on the customer's side is created, changed, or cancelled. The Purchase Order Processing at Customer process component 142 can request the creation, update or cancellation of sales orders. The Sales Order Processing process component 138 can confirm the performed action to the requestor. The confirmation can be sent as XML (extensible markup language) or form message output, for example.

As shown in FIG. 22, the Sales Order Processing process component 138 includes the Sales Order business object 1006. The Sales Order business object 1006 represents an agreement between a seller and a customer concerning the sale and delivery of goods, as well as any services that are associated with these processes, on a specific date, for a specific quantity, and for a specific price.

The Sales Order Processing process component 138 receives messages from the payment Purchase Order Processing at Customer process component 142. A Purchase Order Request message 2206 is received by a Create Sales Order operation 2208. The operation 2208 creates a sales order based on a new purchase order from the customer. The operation 2208 uses a Maintain Sales Order inbound process agent 2209 to update the Sales Order business object 1006.

A Purchase Order Change Request message 2212 is received by a Change Sales Order operation 2214. The operation 2214 changes a sales order based on changes in a purchase order from a customer. The operation 2214 uses a Maintain Sales Order inbound process agent 2209 to update the Sales Order business object 1006.

A Purchase Order Cancellation Request message 2216 is received by a Cancel Sales Order operation 2218. The operation 2218 cancels a sales order based on the cancellation of a purchase order from the customer. The operation 2218 uses a Maintain Sales Order inbound process agent 2209 to update the Sales Order business object 1006.

The Create Sales Order operation 2208, the Change Sales Order operation 2214, and the Cancel Sales Order operation 2218 are included in an Ordering In interface 2228. The Sales Order Processing process component 138 receives information from a Processing At Tenant In Web Services Reliable Messaging (WSRM) communication channel template 2234. The Ordering Out interface 2228 sends information from the Sales Order Processing process component 138 using the Processing At Tenant Out Web Services Reliable Messaging (WSRM) communication channel template 2236. The communication channel template 2236 can define protocols and parameters used for communication with an external party.

The Sales Order business object 1006 invokes a Confirm Sales Order operation 2220 using a Confirm Sales Order to Customer outbound process agent 2224. The operation 2220 is included in an Ordering Out interface 2221. The operation 2220 confirms the sales order to the customer. The Ordering Out interface 2221 sends information to the Purchase Order Processing at Customer process component 142 from a Processing At Tenant Out Web Services Reliable Messaging (WSRM) communication channel template 2236. The communication channel template 2236 can define protocols and parameters used for communication with an external party.

The Confirm Sales Order operation 2220 generates a Purchase Order Confirmation message 2222, which sends a sales order confirmation to the customer. The Confirm Sales Order operation 2220 generates a Form Purchase Order Confirmation message 2226. The messages 2222 and 2226 are received by the Purchase Order Processing at Customer process component 142. The Purchase Order Processing at Customer process component 142 receives information from the Sales Order Processing process component 138 using a Processing At Business Partner In XI communication channel template 2230. The Processing At Business Partner In Exchange Infrastructure (XI) communication channel template 2230 can define protocols and parameters used for communication with an external party. The Purchase Order Processing at Customer process component 142 sends information to the Sales Order Processing process component 138 using a Processing At Business Partner Out XI communication channel template 2232. The Processing At Business Partner Out Exchange Infrastructure (XI) communication channel template 2232 can define protocols and parameters used for communication with an external party.

Interactions Between Process Components "Customer Invoice Processing" and "Due Item Processing"

Figure 23:
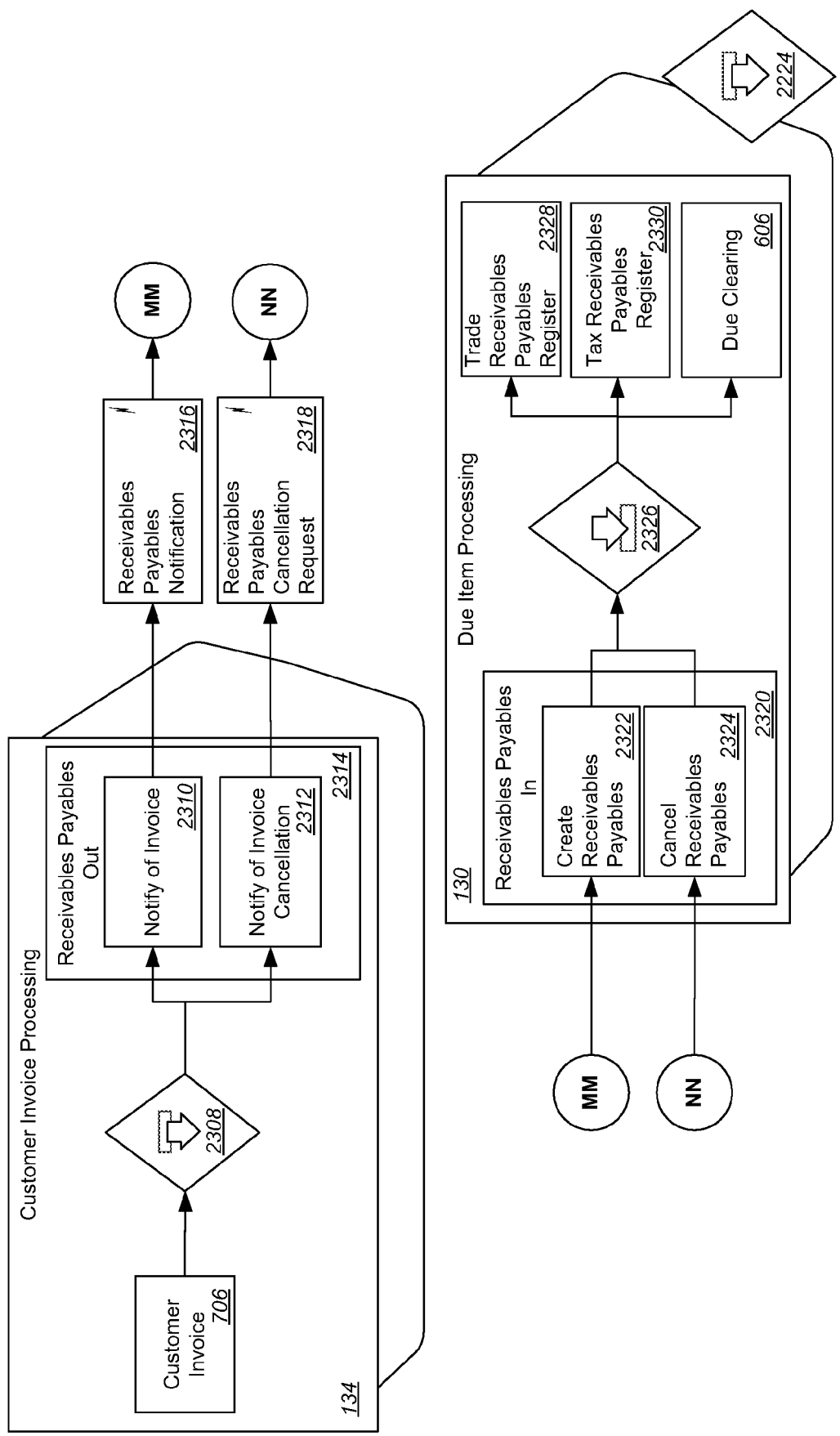
FIG. 23 is a block diagram showing interactions between a Customer Invoice Processing process component and a Due Item Processing process component.

FIG. 23 is a block diagram showing interactions between the Customer Invoice Processing process component 134 and the Due Item Processing process component 130 in the architectural design of FIG. 1. An interaction starts when a customer invoice is created or cancelled. The Customer Invoice Processing process component 134 notifies the Due Item Processing process component 130 about the creation or cancellation of a customer invoice.

As shown in FIG. 23, the Customer Invoice Processing process component 134 includes the Customer Invoice business object 706. The business object 706 represents a binding statement of amounts receivable resulting from deliveries to a customer, services performed for a customer, adjustments to these receivables, or credit memos to a customer. The business object 706 uses a Notify of Customer Invoice to Due Item Processing outbound process agent 2308 to invoke a Notify of Invoice operation 2310. The operation 2310 informs the Due Item process component 130 about an invoice in order to derive payment due data. Alternatively, a Notify of Invoice Cancellation operation 2312 is invoked to notify the Due Item Processing process component 130 about a cancellation of an invoice in order to also cancel the corresponding payment due data. The operations 2310 and 2312 are included in a Receivables Payables Out interface 2314. The Notify of Invoice operation 2310 generates a Receivables Payables Notification message 2316. The message 2316 is sent to the Due Item Processing process component 130. The Notify of Invoice Cancellation operation 2312 generates a Receivables Payables Cancellation Request message 2318. The message 2318 is sent to the Due Item Processing process component 130.

The Receivables Payables Notification message 2316 is received by a Create Receivables Payables operation 2322. The operation 2322 creates a trade and/or tax receivable or payable. The Receivables Payables Cancellation Request message 2318 is received by a Cancel Receivables Payables operation 2324. The operation 2324 cancels a trade and/or tax receivable or payable. The operations 2322 and 2324 are included in a Receivables Payables In interface 2320.

The operations 2322 and 2324 use a Maintain Trade and Tax Receivables Payables inbound process agent 2326 to update one or more of three business objects: a Trade Receivables Payables Register business object 2328, a Tax Receivables Payables Register business object 2330, and the Due Clearing business object 606. The Trade Receivables Payables Register business object 2328 represents a register for all trade receivables and payables from goods and services of a company from/to its business partners. The Tax Receivables Payables Register business object 2330 represents a register of tax receivables and payables of a company that are due for delivered goods and rendered services between buyers and sellers, are due for the consumption of goods, are due for the transfer of goods, or are withheld from payments to sellers. The Due Clearing business object 606 represents a group of receivables and payables for clearing.

Interactions Between Process Components "Sales Order Processing" and "Financial Accounting Master Data Management"

Figure 24:
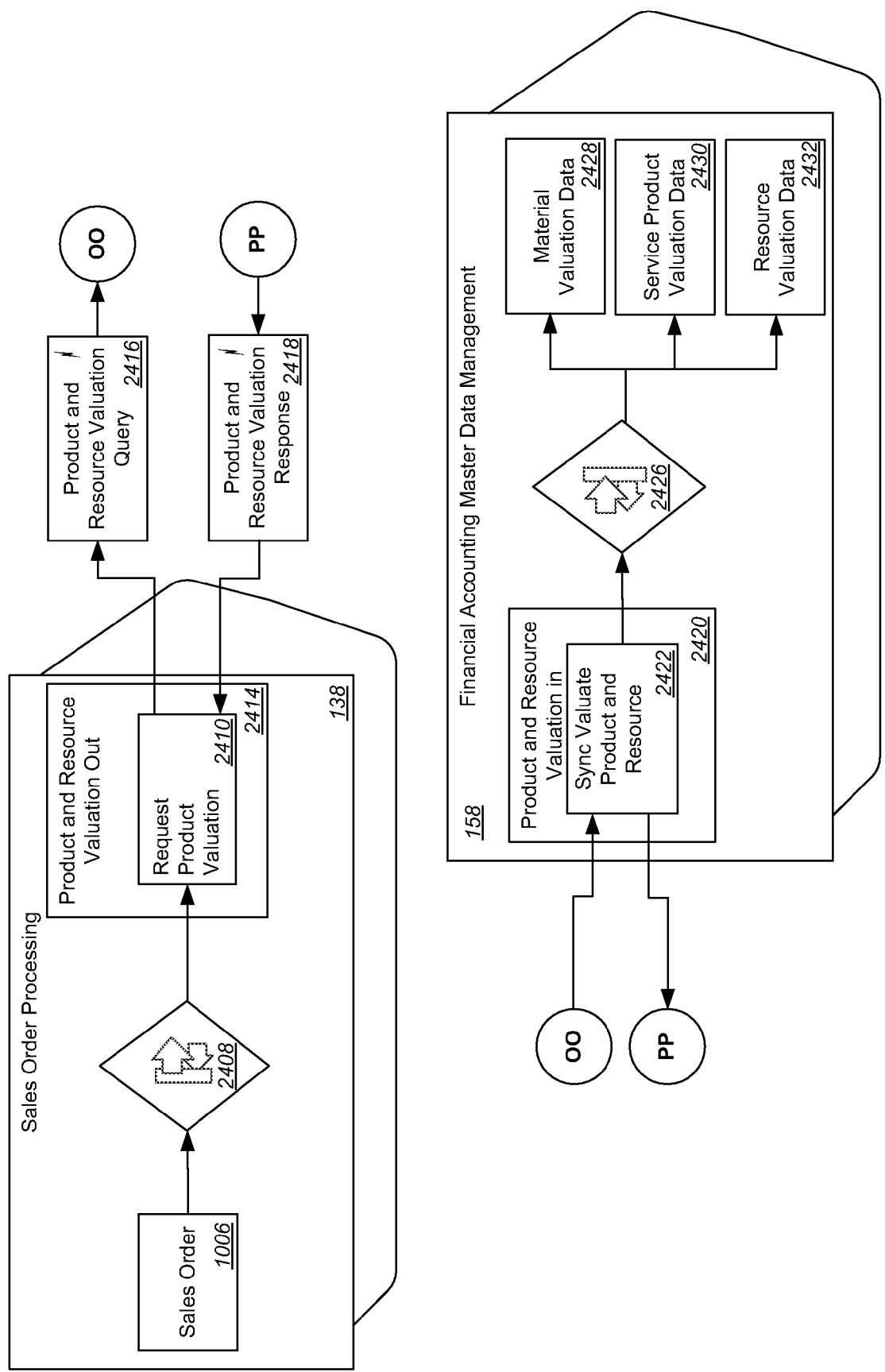
FIG. 24 is a block diagram showing interactions between a Sales Order Processing process component and a Financial Accounting Master Data Management process component.

FIG. 24 is a block diagram showing interactions between the Sales Order Processing process component 138 and the Financial Accounting Master Data Management process component 158 in the architectural design of FIG. 1. An interaction starts when a sales order is created or changed. The Sales Order Processing process component 138 requests a product valuation price from the Financial Accounting Master Data Management process component 158. The Financial Accounting Master Data Management process component 158 provides the requested information.

As shown in FIG. 24, the Sales Order Processing process component 138 includes the Sales Order business object 1006. The Sales Order business object 1006 represents an agreement between a seller and a customer concerning the sale and delivery of goods, as well as any services that are associated with these processes, on a specific date, for a specific quantity, and for a specific price. The Sales Order business object 1006 uses a Synchronous Request Product Valuation from Sales Order to Financial Accounting Master Data outbound process agent 2408 to invoke a Request Product Valuation operation 2410. The operation 2410 is included in a Product and Resource Valuation Out interface 2414. The operation 2410 requests a product valuation.

The Request Product Valuation operation 2410 generates a Product and Resource Valuation Query message 2416. The message 2416 is sent to the Financial Accounting Master Data Management process component 158. The message 2416 is received by a Synchronous Valuate Product and Resource operation 2422, which is included in a Product and Resource Valuation In interface 2420. The operation 2422 is a synchronous access to price information for products.

The Synchronous Valuate Product and Resource operation 2422 uses a Synchronous Valuate and Product Resource inbound process agent 2426 to update one of three business objects in the Financial Accounting Master Data Management process component 158: a Material Valuation Data business object 2428, a Service Product Valuation Data business object 2430, and a Resource Valuation Data business object 2432. The Material Valuation Data business object 2428 represents an object that includes attributes and internal prices for the valuation of business transactions related to a material or a material group, for material inventory valuation and for cost estimation. The Service Product Valuation Data business object 2430 represents an object that includes attributes and internal prices for the valuation of business transactions related to a service product or a service product group and for cost estimation. The Resource Valuation Data business object 2432 represents an object that includes attributes and internal cost rates for the valuation of business transactions related to a resource and for cost estimation.

The Synchronous Valuate Product and Resource operation 2422 may generate a Product and Resource Valuation Response message 2418. The message is sent to the Request Product Valuation operation 2410 in the Sales Order Processing process component 138.

Interactions Between Process Components "Inventory Processing" and "Supply and Demand Matching"

Figure 25:
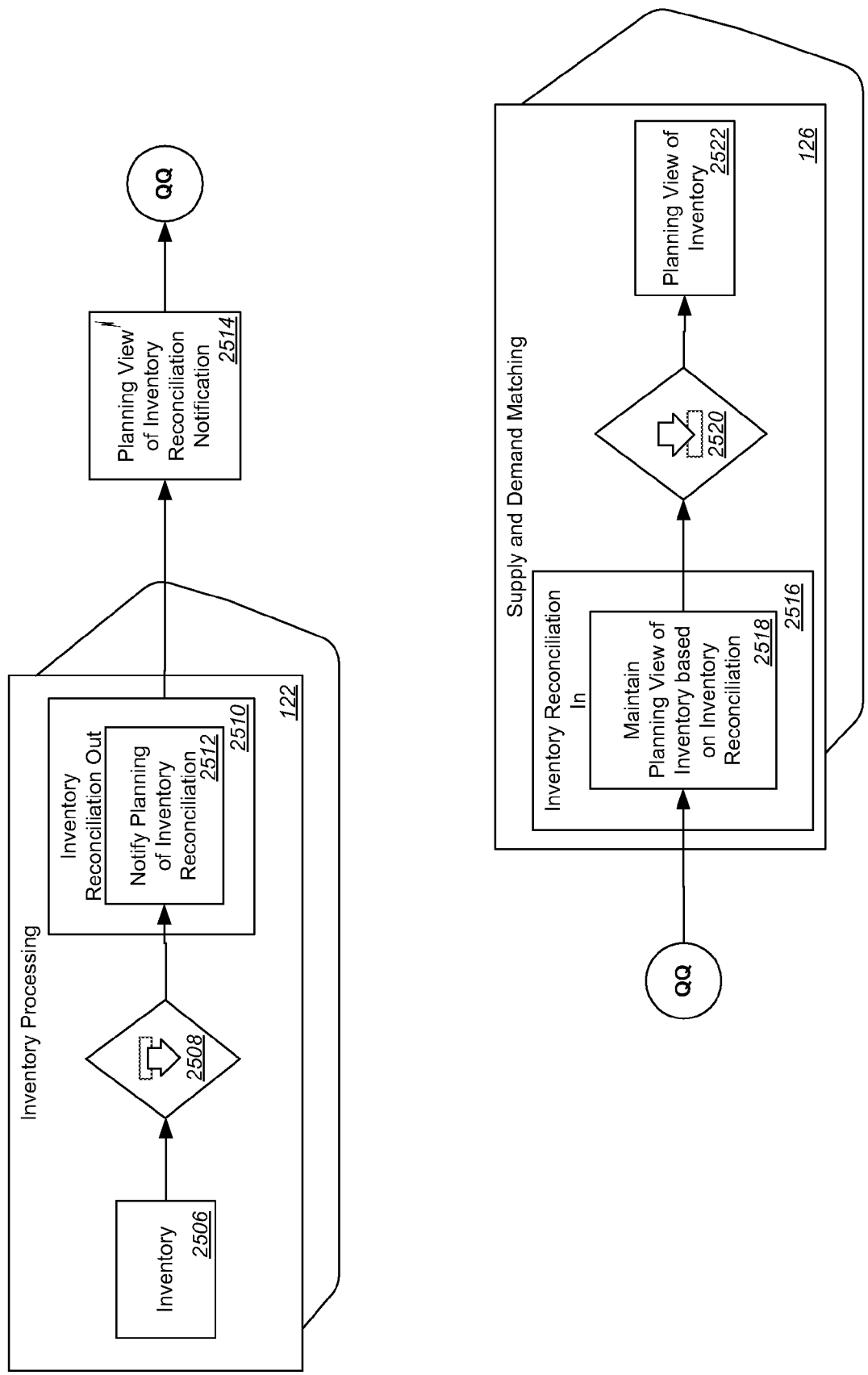
FIG. 25 is a block diagram showing interactions between an Inventory Processing process component and a Supply and Demand Matching process component.

FIG. 25 is a block diagram showing interactions between the Inventory Processing process component 122 and the Supply and Demand Matching process component 126 in the architectural design of FIG. 1. The interactions can be used to synchronize the available quantities of the planning view on inventory in the Supply and Demand Matching process component 126 with the available quantities of the original inventory in the Inventory Processing process component 122.

The Inventory Processing process component 122 includes an Inventory business object 2506. The Inventory business object 2506 represents a quantity of all the materials in a location including the material reservations at this location. The business object 2506 uses a Notify of Reconciliation from Inventory to Supply and Demand Matching outbound process agent 2508 to invoke a Notify Planning of Inventory Reconciliation operation 2512. The operation 2512 is included in an Inventory Reconciliation Out interface 2510. The operation 2512 sends an inventory reconciliation to the Supply and Demand Matching process component 126. The operation 2512 generates a Planning View of Inventory Notification message 2514.

The message 2514 is received by a Maintain Planning View of Inventory based on Inventory Reconciliation operation 2518. The operation 2518 is included in an Inventory Reconciliation In interface 2516. The operation 2518 uses a Maintain Planning View of Inventory based on Inventory Reconciliation inbound process agent 2520 to update the Planning View of Inventory business object 2522. The Planning View of Inventory business object 2522 represents a view of material stock, aggregated at the level of the Supply Planning Area.

Interactions Between Process Components "Customer Quote Processing" and "Financial Accounting Master Data Management"

Figure 26:
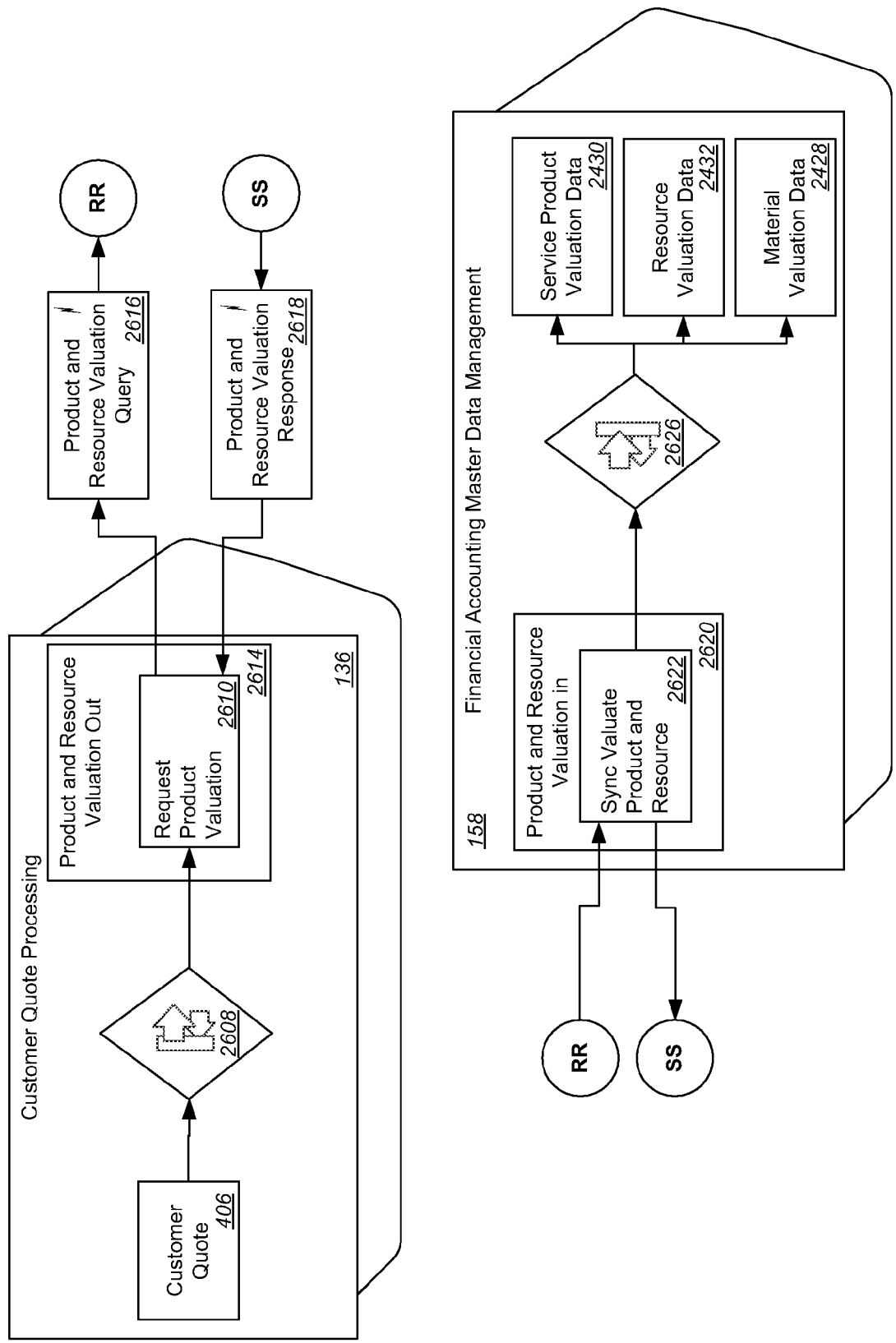
FIG. 26 is a block diagram showing interactions between a Customer Quote Processing process component and a Financial Accounting Master Data Management process component.

FIG. 26 is a block diagram showing interactions between the Customer Quote Processing process component 136 and the Financial Accounting Master Data Management process component 158 in the architectural design of FIG. 1. An interaction starts when a customer quote is created or changed. The Customer Quote Processing process component 136 requests the product valuation price from the Financial Accounting Master Data Management process component 158. The Financial Accounting Master Data Management process component 158 provides the requested information to the requestor.

As shown in FIG. 26, the Customer Quote Processing process component 136 includes a Customer Quote business object 406. The Customer Quote business object 406 represents an offer by a seller to a customer for the delivery of goods or services according to fixed terms. The offer can be legally binding for the seller for a specific period of time. The Customer Quote business object 406 uses a Synchronous Request Product Valuation from Customer Quote to Financial Accounting Master Data outbound process agent 2608 to invoke a Request Product Valuation operation 2610. The operation 2610 is included in a Product and Resource Valuation Out interface 2614. The operation 2610 requests a product valuation.

The Request Product Valuation operation 2610 generates a Product and Resource Valuation Query message 2616. The message 2616 is sent to the Financial Accounting Master Data Management process component 158. The message 2616 is received by a Synchronous Valuate Product and Resource operation 2622. The operation 2622 is included in a Product and Resource Valuation In interface 2620. The operation 2622 is a synchronous access to price information for products.

The Synchronous Valuate Product and Resource operation 2622 uses a Synchronous Valuate and Product Resource inbound process agent 2626 to update one of a possible three business objects in the Financial Accounting Master Data Management process component 158: a Material Valuation Data business object 2428, a Service Product Valuation Data business object 2430, and a Resource Valuation Data business object 2432. The Material Valuation Data business object 2428 represents an object that includes attributes and internal prices for the valuation of business transactions related to a material or a material group, for material inventory valuation and for cost estimation. The Service Product Valuation Data business object 2430 represents an object that includes attributes and internal prices for the valuation of business transactions related to a service product or a service product group and for cost estimation. The Resource Valuation Data business object 2432 represents an object that includes attributes and internal cost rates for the valuation of business transactions related to a resource and for cost estimation.

The Synchronous Valuate Product and Resource operation 2622 can generate a Product and Resource Valuation Response message 2618. The message is sent to the Request Product Valuation operation 2610 in the Customer Quote Processing process component 136.

Interactions Between Process Components "Site Logistics Processing" and "Site Logistics Processing"

Figure 27:
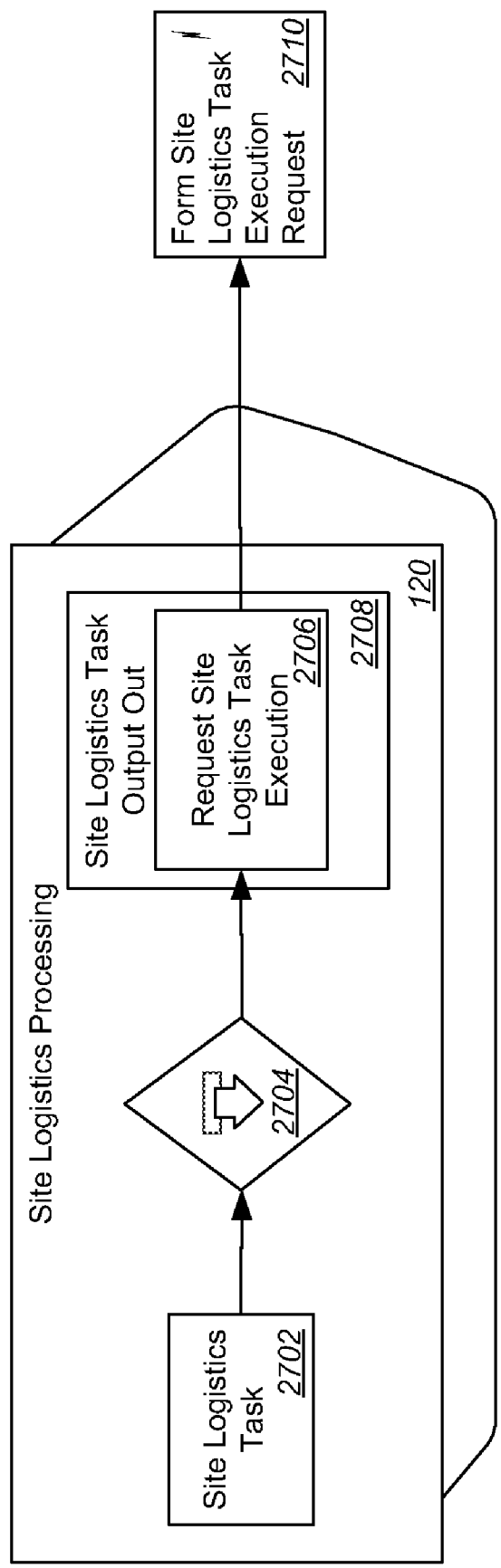
FIG. 27 is a block diagram showing interactions within a Site Logistics Processing process component.

FIG. 27 is a block diagram showing interactions within the Site Logistics Processing process component 120 in the architectural design of FIG. 1.

As shown in FIG. 27, the Site Logistics Processing process component 120 includes a Site Logistics Task business object 2702. The Bill of Exchange Payable business object 2702 represents a task for executing a logistics operation or activity within a site. For example, the Site Logistics Task business object 2702 represents a piece of work to be performed by a person or an automated system.

The Site Logistics Task business object 2702 uses a Request Site Logistics Task Execution for Output outbound process agent 2704 to request printing of a site logistics task list. The Request Site Logistics Task Execution for Output outbound process agent 2704 invokes a Request Site Logistics Task Execution operation 2706 in a Site Logistics Task Output Out interface 2708. For example, the operation 2706 requests the printing of site logistics task instructions. The Request Site Logistics Task Execution operation 2706 sends a Form Site Logistics Task Execution Request message 2710.

Interactions Between Process Components "Payment Authorization" and "Settlement Processing at Clearing House"

Figure 28:
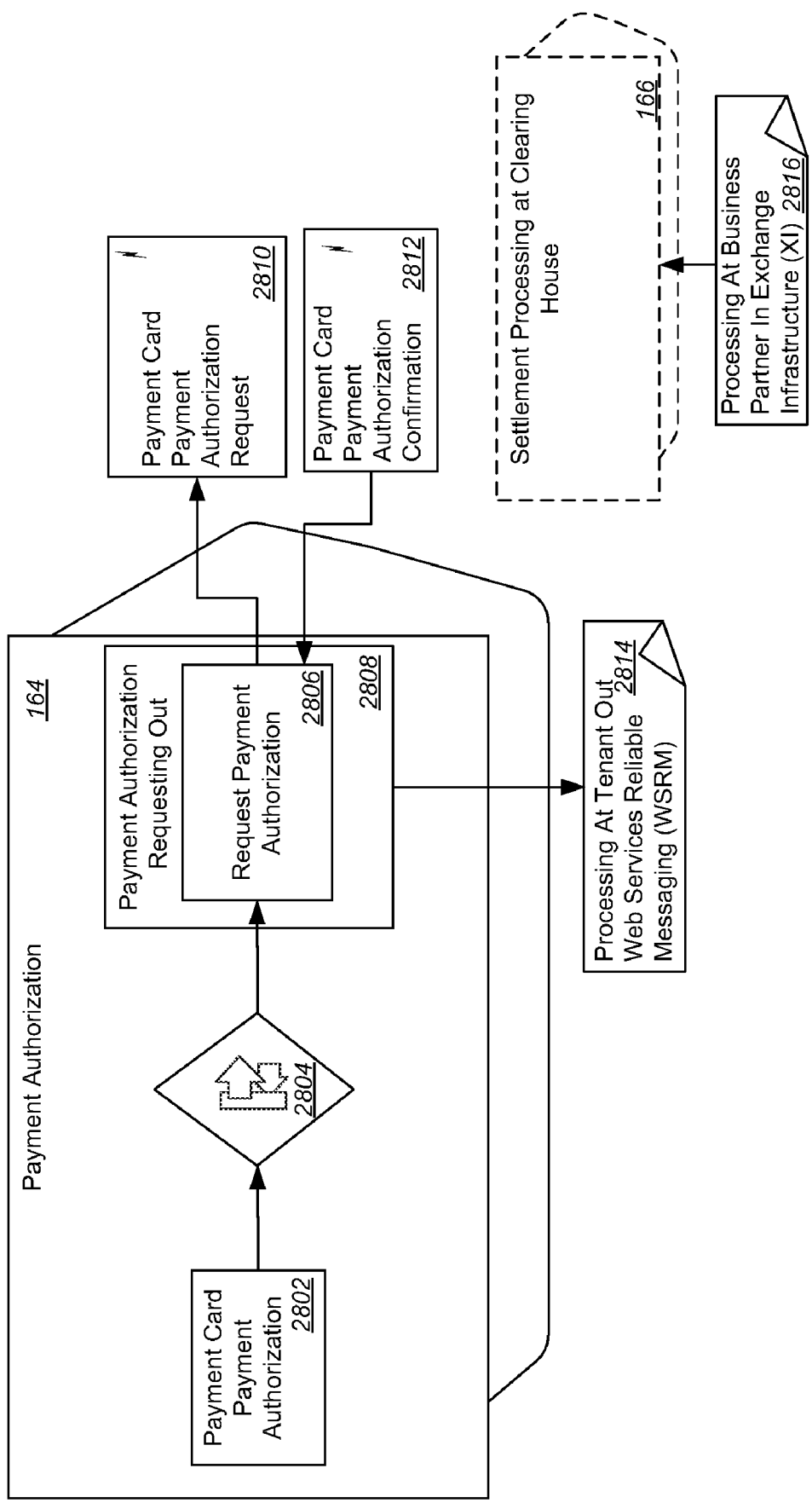
FIG. 28 is a block diagram showing interactions between a Payment Authorization process component and a Settlement Processing at Clearing House process component.

FIG. 28 is a block diagram showing interactions between the Payment Authorization process component 164 and the Settlement Processing at Clearing House process component 166 in the architectural design of FIG. 1.

As shown in FIG. 28, the Payment Authorization process component 164 includes a Payment Card Payment Authorization business object 2802. The Payment Card Payment Authorization business object 2802 represents an authorization for a payment made using a payment card. It includes payment information (e.g., a description of goods/services purchased, an authorization request, and the result of the authorization request based on a response from a clearing house).

The Payment Card Payment Authorization business object 2802 uses a Request Payment Card Payment Authorization outbound process agent 2804 to invoke a Request Payment Authorization operation 2806. The operation 2806 is included in a Payment Authorization Requesting Out interface 2808. The Payment Authorization process component 164 sends information using a Processing At Tenant Out Web Services Reliable Messaging (WSRM) communication channel template 2814. The Payment Authorization Requesting Out interface 2808 sends information to the Settlement Processing at Clearing House process component 166 using the Processing At Tenant Out Web Services Reliable Messaging (WSRM) communication channel template 2814. The communication channel template 2814 can define protocols and parameters used for communication with an external party.

The Request Product Availability Information operation 2806 can request a clearing house for authorization of a payment made by a payment card. The Request Product Availability Information operation 2806 generates a Payment Card Payment Authorization Request message 2810. The message 2810 can be sent to the Settlement Processing at Clearing House process component 166. The Settlement Processing at Clearing House process component 166 can send a Payment Card Payment Authorization Confirmation message 2812 which is received by the Request Payment Authorization operation 2806. The Settlement Processing at Clearing House process component 166 receives information from the Payment Authorization process component 164 using a Processing At Business Partner In XI communication channel template 2816. The Processing At Business Partner In Exchange Infrastructure (XI) communication channel template 2816 can define protocols and parameters used for communication with an external party.

Interactions Between Process Components "Due Item Processing" and "Settlement Processing at Clearing House"

Figure 29:
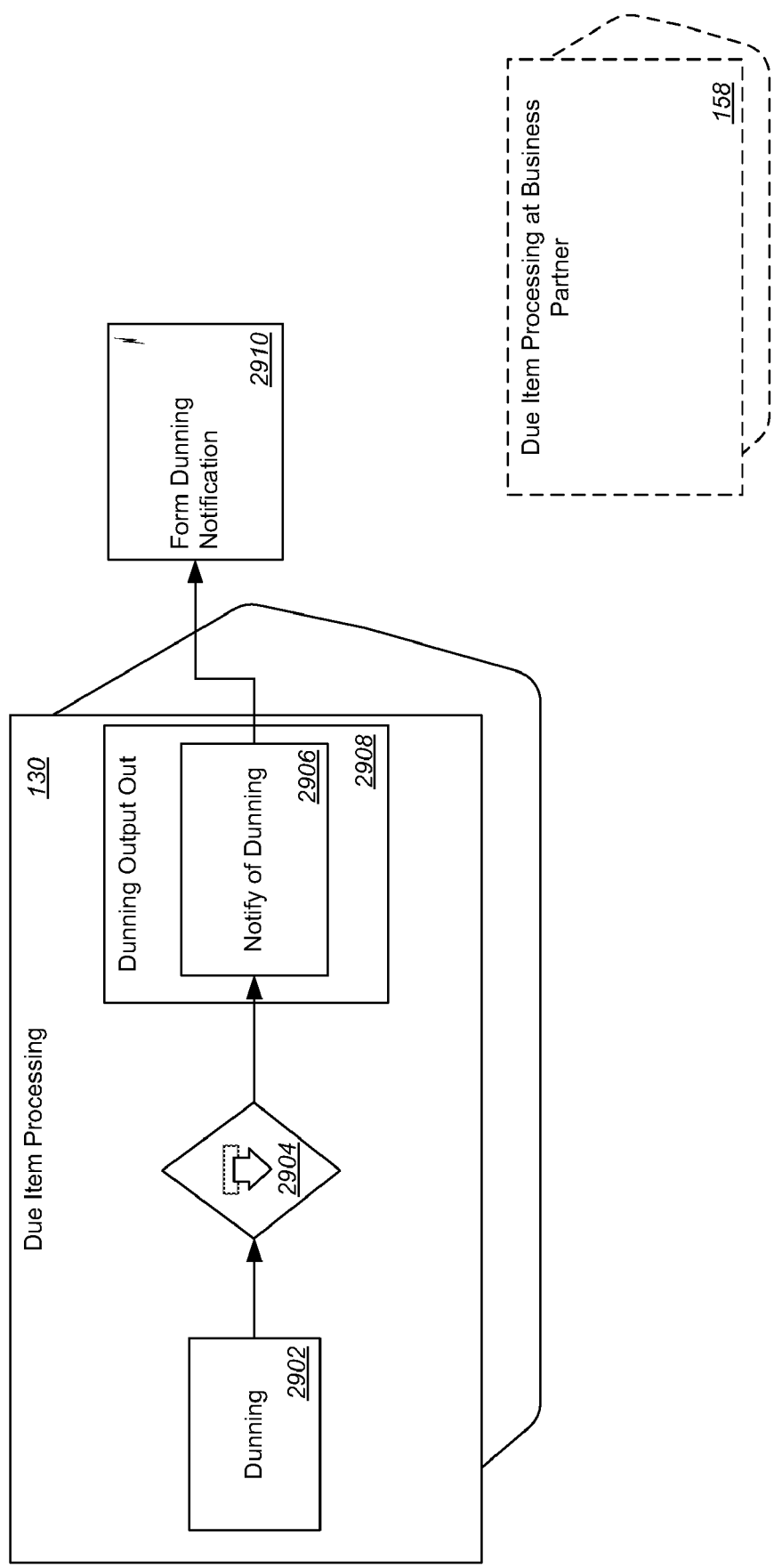
FIG. 29 is a block diagram showing interactions between a Due Item Processing process component and a Due Item Processing at Business Partner process component.

FIG. 29 is a block diagram showing interactions between the Due Item Processing process component 130 and the Settlement Processing at Clearing House process component 158 in the architectural design of FIG. 1. An interaction starts when a dunning is released. The Due Item Processing process component 130 notifies the business partner about outstanding receivables and expected payments.

As shown in FIG. 29, the Due Item Processing process component 130 includes a Dunning business object 2902. The Dunning business object 2902 represents a reminder or demand from a company (creditor) to a business partner (debtor) to make a payment by a certain point in time.

The Dunning business object 2902 uses a Notify of Dunning to Business Partner outbound process agent 2904 to invoke a Notify of Dunning operation 2906. The operation 2906 is included in a Dunning Output Out interface 2908. The operation 2906 can notify the business partner about outstanding payments. For example, notification can involve sending a dunning letter or a payment reminder to the business partner, changing the status of the dunning changes to "Released." The operation 2906 generates a Form Dunning Notification message 2910. The message 2910 can be sent to the Settlement Processing at Clearing House process component 158.

Interactions Between Process Components "Customer Invoice Processing" and "Balance of Foreign Payment Management"

Figure 30:
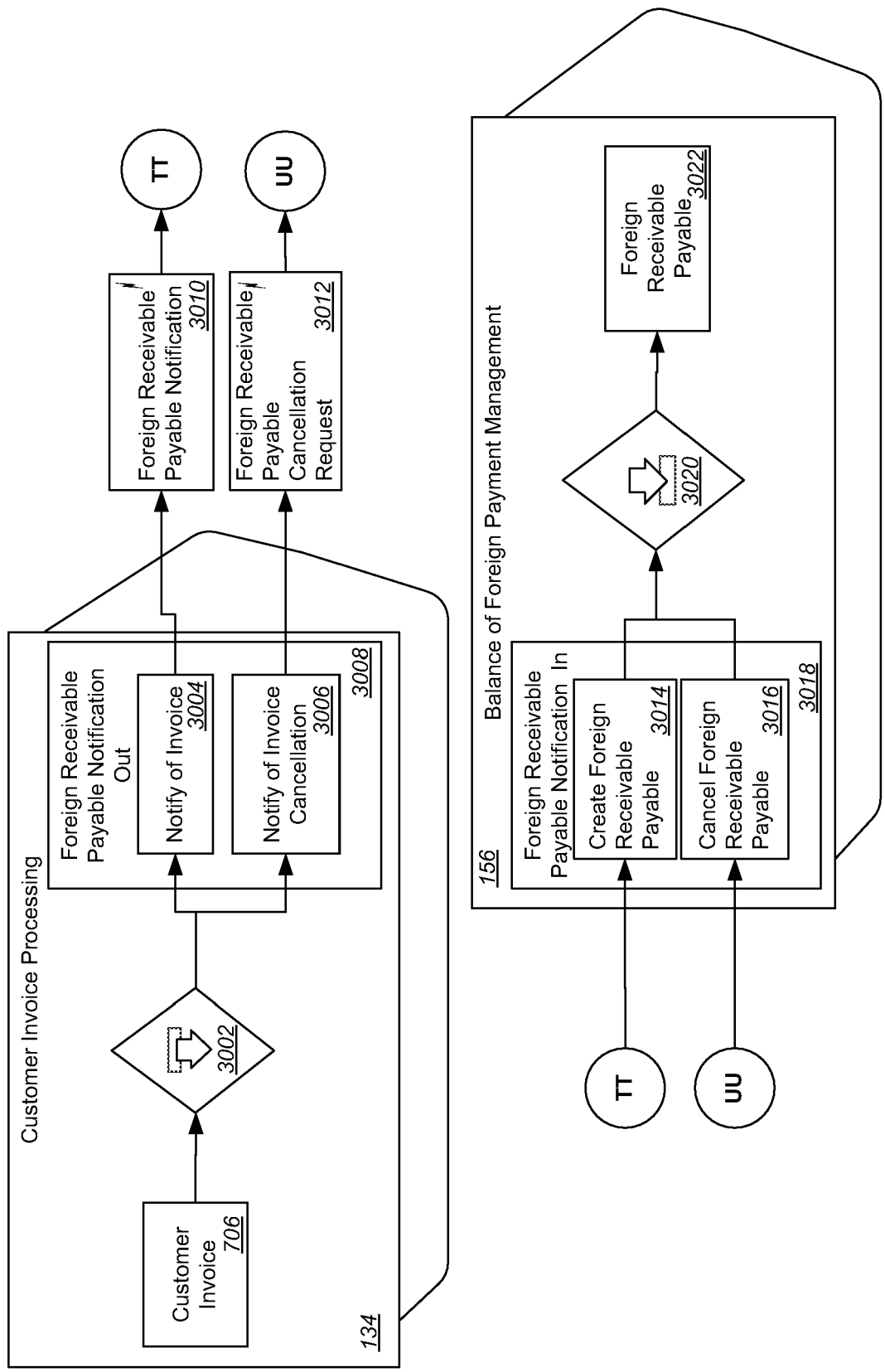
FIG. 30 is a block diagram showing interactions between a Customer Invoice Processing process component and a Balance of Foreign Payment Management process component.

FIG. 30 is a block diagram showing interactions between the Customer Invoice Processing process component 134 and the Balance of Foreign Payment Management process component 156 in the architectural design of FIG. 1. Interactions can start when a customer invoice is created or cancelled related to a non-resident buyer. The Customer Invoice Processing process component 134 notifies the Balance of Foreign Payment Management process component 156 about the creation or cancellation of a receivable related to a non-resident buyer.

As shown in FIG. 30, the Customer Invoice Processing process component 134 includes the Customer Invoice business object 706. The Customer Invoice business object 706 represents a binding statement of amounts receivable resulting, for example, from deliveries to a customer, services performed for a customer, adjustments to these receivables, or credit memos to the customer.

The business object 706 uses a Notify of Customer Invoice to Balance of Foreign Payments Management outbound processing agent 3002 to invoke a Notify of Invoice operation 3004 or a Notify of Invoice Cancellation operation 3006. For example, the operation 3004 can be used to inform about an invoice in order to track a receivable from, or a payable to, a non-resident business partner. The operation 3006 can be used to inform about cancellation of an invoice in order to cancel information about a receivable from, or a payable to, a non-resident business partner. The operations 3004, 3006 are included in a Foreign Receivable Payable Notification Out interface 3008. If the Notify of Invoice operation 3004 is invoked, a Foreign Receivable Payable Notification message 3010 is generated and sent to the Balance of Foreign Payment Management process component 156. If the Notify of Invoice Cancellation operation 3006 is invoked, a Foreign Receivable Payable Cancellation Notification message 3012 is generated and sent to the Balance of Foreign Payment Management process component 156.

A Create Foreign Receivable Payable operation 3014 receives the Invoice Accounting Notification message 3010. A Cancel Foreign Receivable Payable operation 3016 receives the Invoice Cancellation Accounting message 3012. A Foreign Receivable Payable Notification In interface 3018 includes the Create Foreign Receivable Payable operation 3014 and the Cancel Foreign Receivable Payable operation 3016. The operation 3014 can create a foreign receivable or payable. The operation 3016 can cancel a foreign receivable or payable.

The operations 3014, 3016 use a Maintain Foreign Receivable Payable inbound process agent 3020 to update a Foreign Receivable Payable business object 3022. For example, the update can be to create, change or cancel a foreign receivable or payable. The Foreign Receivable Payable business object 3022 represents a receivable from, or a payable to, a non-resident business partner.

Interactions Between Process Components "Pricing Engine" and "External Tax Calculation"

Figure 31:
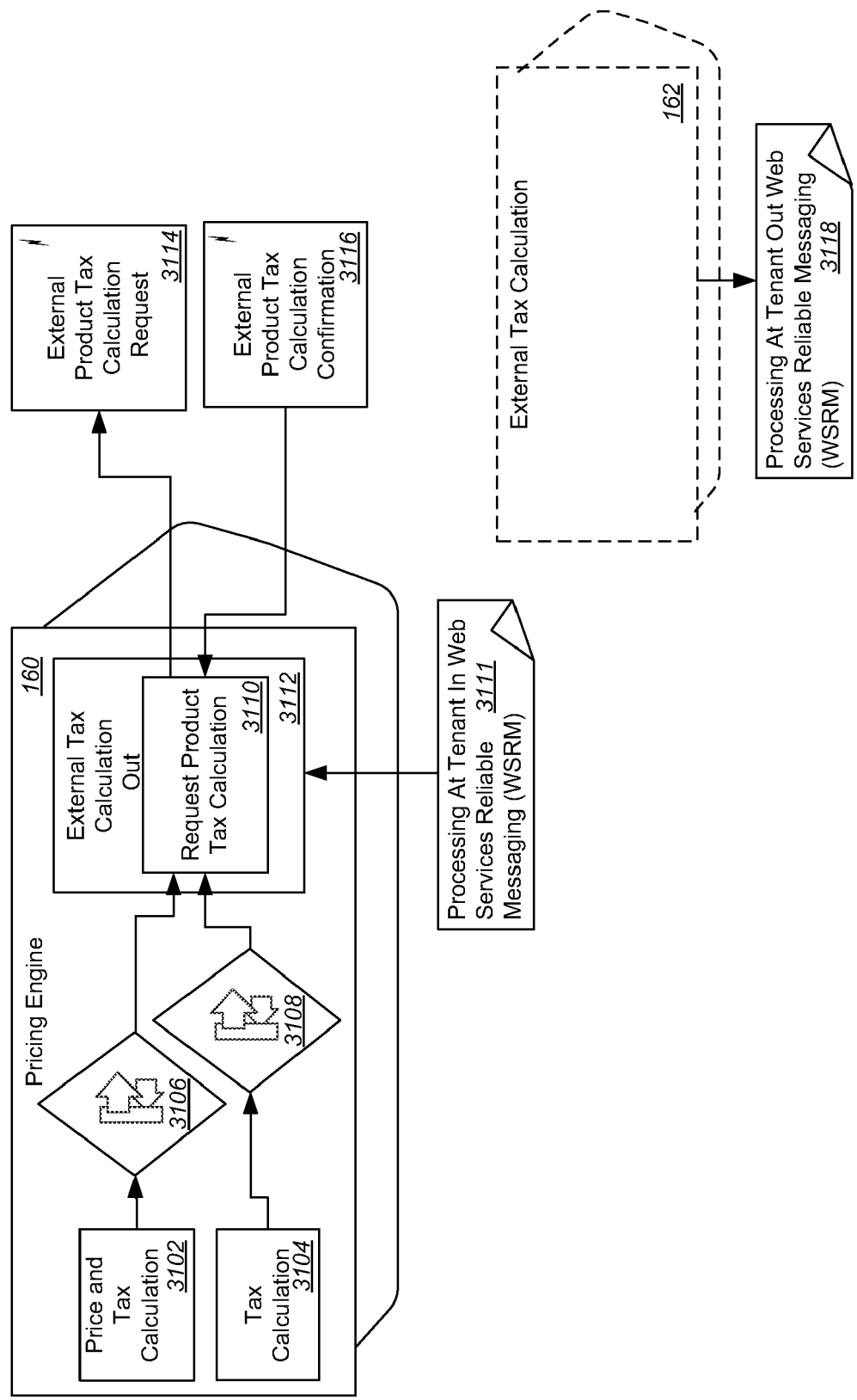
FIG. 31 is a block diagram showing interactions between a Pricing Engine process component and an External Tax Calculation process component.

FIG. 31 is a block diagram showing interactions between the Pricing Engine process component 160 and the External Tax Calculation process component 162 in the architectural design of FIG. 1. The interaction starts with the request of a tax calculation from the External Tax Calculation process component 162.

As shown in FIG. 31, the Pricing Engine process component 160 includes a Price and Tax Calculation business object 3102. The Price and Tax Calculation business object 3102 represents a summary of the determined price and tax components for a business case. The Price and Tax Calculation business object 3102 uses a Synchronous Request Product Tax Calculation from Price and Tax Calculation to External Tax Calculation synchronous outbound process agent 3106 to invoke a Request Product Tax Calculation operation 3110. The Request Product Tax Calculation operation 3110 is included in an External Tax Calculation Out interface 3112. The External Tax Calculation Out interface 3112 receives information from the External Tax Calculation process component 162 using a Processing At Tenant In Web Services Reliable Messaging (WSRM) communication channel template 3111. The communication channel template 3111 can provide information from an external party about a purchase order confirmation.

The Pricing Engine process component 160 also includes a Tax Calculation business object 3104. The Tax Calculation business object 3104 represents a summarization of the determined and calculated tax elements of a business case. The Tax Calculation business object 3104 uses a Synchronous Request Product Tax Calculation from Tax Calculation to External Tax Calculation synchronous outbound process agent 3108 to invoke the Request Product Tax Calculation operation 3110.

The Request Product Tax Calculation operation 3110 can request product tax calculations from an external tax calculation system. The Request Product Tax Calculation operation 3110 generates an External Product Tax Calculation Request message 3114. The External Product Tax Calculation Request message 3114 is received by the External Tax Calculation process component 162.

The Request Product Tax Calculation operation 3110 receives an External Product Tax Calculation Confirmation message 3116 from the External Tax Calculation process component 162. The External Tax Calculation process component 162 sends information to the Pricing Engine process component 160 using a Processing At Tenant Out Web Services Reliable Messaging (WSRM) communication channel template 3118. The communication channel template 3118 can define protocols and parameters used for communication with an external party.

Interactions Between Process Components "Payment Processing" and "Payment Processing at Business Partner"

Figure 32:
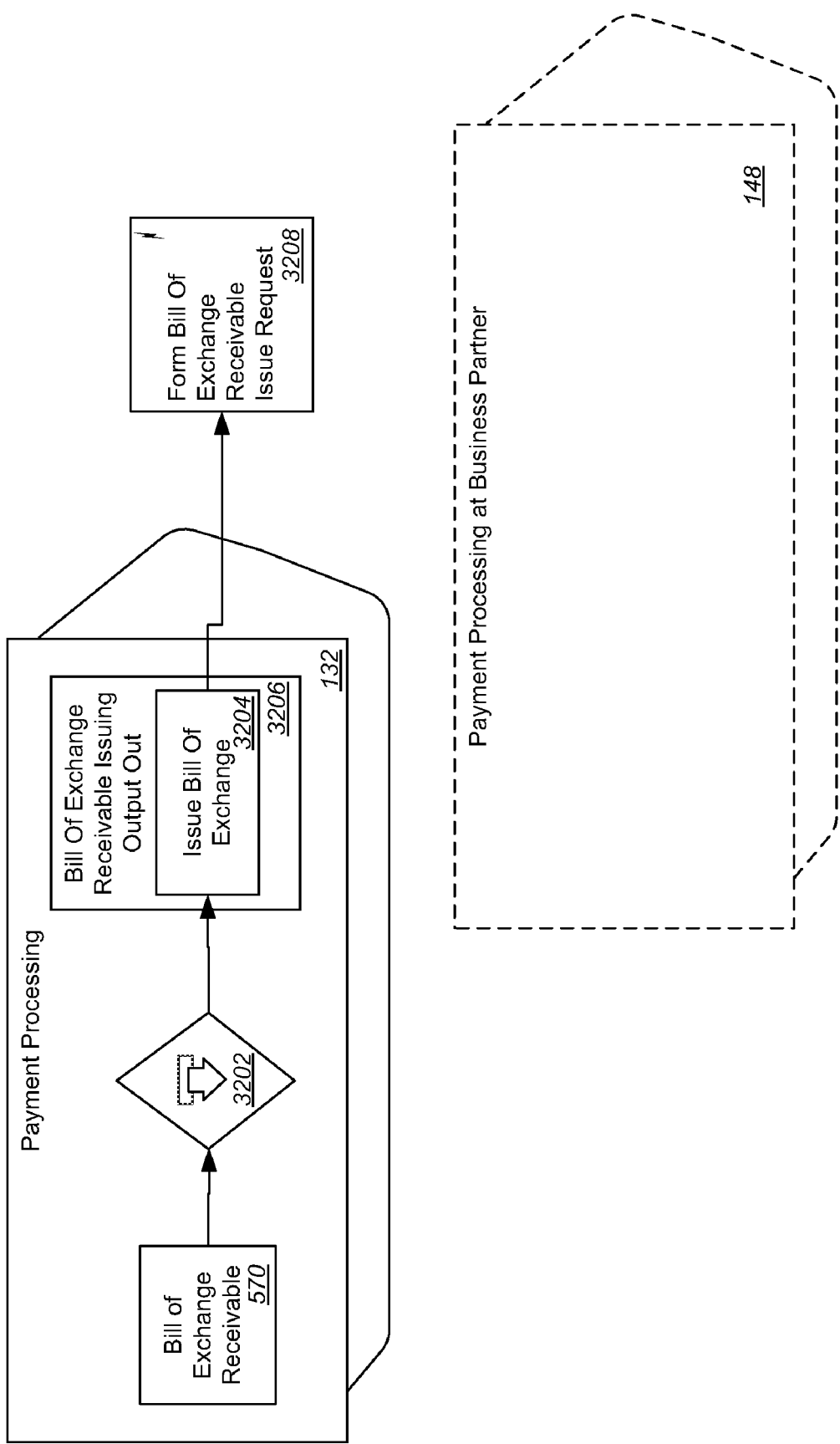
FIG. 32 is a block diagram showing interactions between a Payment Processing process component and a Payment Processing at Business Partner process component.

FIG. 32 is a block diagram showing interactions between the Payment Processing process component 132 and the Payment Processing at Business Partner process component 148 in the architectural design of FIG. 1. Interactions can start in the Payment Processing process component 132 with the creation of a payment advice.

As shown in FIG. 32, the Payment Processing process component 132 includes the Bill of Exchange Receivable business object 570. The Bill of Exchange Receivable business object 570 represents a bill of exchange issued either by the company or by a business partner for the benefit of the company. The Bill of Exchange Receivable business object 570 uses an Issue Bill Of Exchange Receivable to Business Partner outbound process agent 3202 to invoke an Issue Bill Of Exchange operation 3204. The Issue Bill Of Exchange operation 3204 is included in a Bill Of Exchange Receivable Issuing Output Out interface 3206. The operation 3204 sends a Form Bill Of Exchange Receivable Issue Request message 3208. The Form Bill Of Exchange Receivable Issue Request message 3208 can be received by the Payment Processing at Business Partner process component 148.

Interactions Between Process Components "Outbound Delivery Processing" and "Inbound Delivery Processing at Customer"

Figure 33:
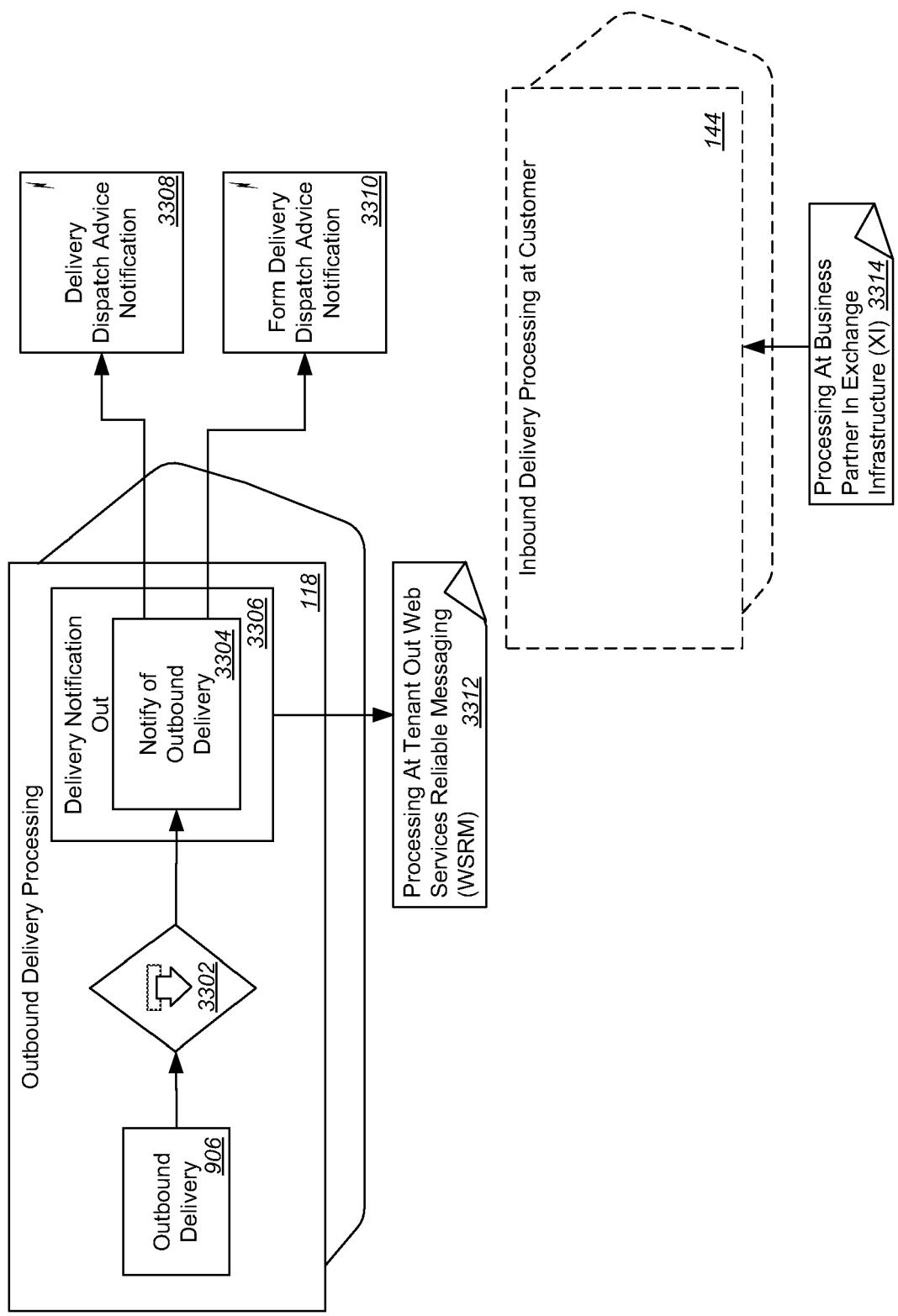
FIG. 33 is a block diagram showing further interactions between an Outbound Delivery Processing process component and an Inbound Delivery Processing at Customer process component.

FIG. 33 is a block diagram showing further interactions between the Outbound Delivery Processing process component 118 and the Inbound Delivery Processing at Customer process component 144 in the architectural design of FIG. 1. The interaction starts when an outbound delivery is completed or cancelled. The Outbound Delivery Processing process component 118 notifies the customer about the expected deliveries.

As shown in FIG. 33, the Outbound Delivery Processing process component 118 includes the Outbound Delivery business object 906. The Outbound Delivery business object 906 represents a composition of the goods that are provided for shipping by a vendor. The business object 906 uses a Notify of Outbound Delivery to Inbound Delivery Processing at Customer outbound process agent 3302 to invoke a Notify of Outbound Delivery operation 3304. The operation 3304 is included in a Delivery Notification Out interface 3306. The Outbound Delivery Processing process component 118 sends information to the Inbound Delivery Processing at Customer process component 144 using a Processing At Tenant Out Web Services Reliable Messaging (WSRM) communication channel template 3312. The Delivery Notification Out 3306 sends information from the Inbound Delivery Processing at Customer process component 144 using the Processing At Tenant Out Web Services Reliable Messaging (WSRM) communication channel template 3312. The communication channel template 3312 can define protocols and parameters used for communication with an external party.

The Notify of Outbound Delivery operation 3304 generates a Delivery Dispatch Advice Notification message 3308 and a Form Delivery Dispatch Advice Notification message 3310. The messages 3308, 3310 can be received by the Inbound Delivery Processing at Customer process component 144. The Inbound Delivery Processing at Customer process component 144 receives information from a Processing At Business Partner In XI communication channel template 3314. The Processing At Business Partner In Exchange Infrastructure (XI) communication channel template 3314 can define protocols and parameters used for communication with an external party.

Interactions Between Process Components "Due Item Processing" and "Accounting"

Figure 34:
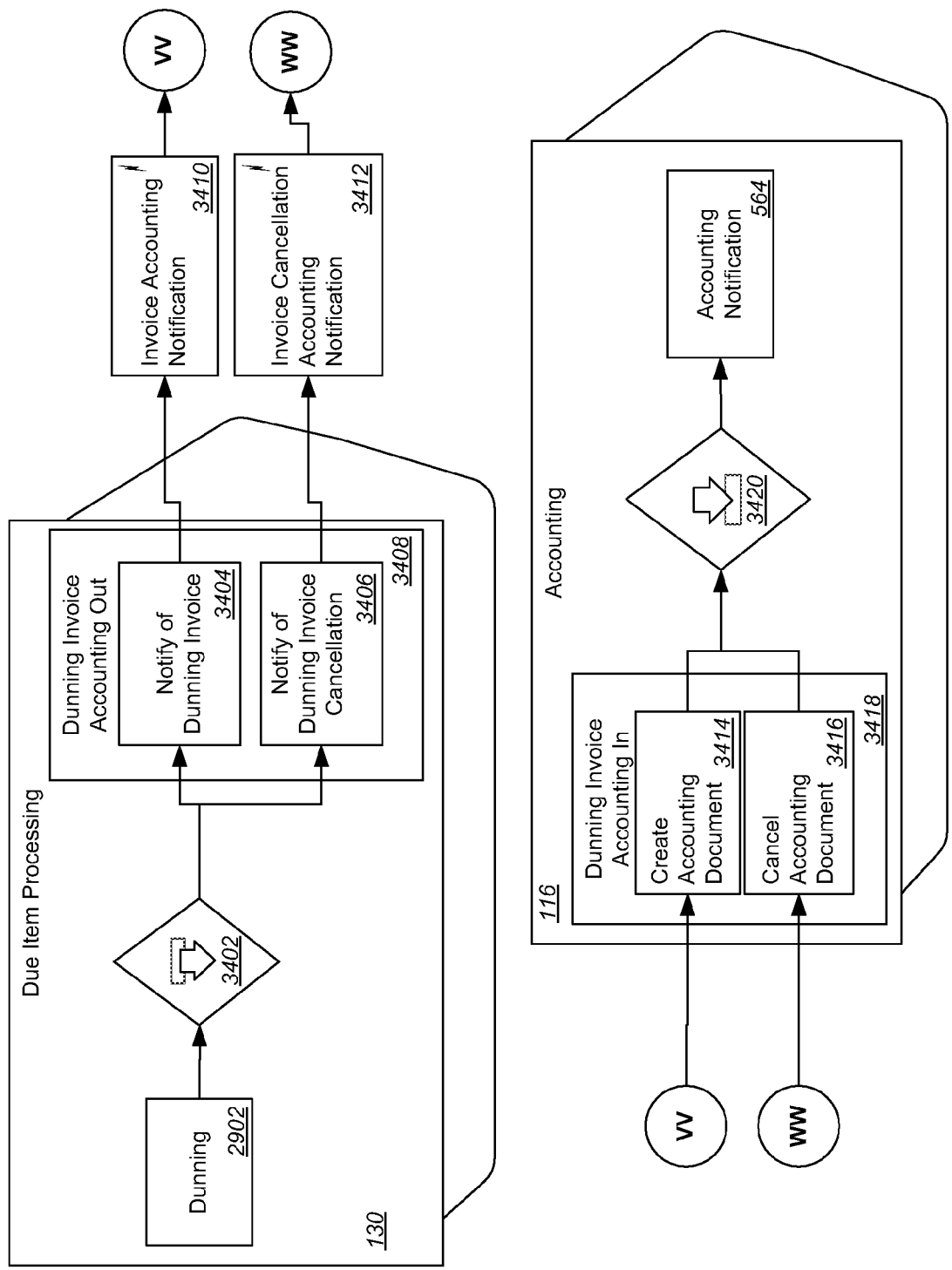
FIG. 34 is a block diagram showing further interactions between a Due Item Processing process component and an Accounting process component.

FIG. 34 is a block diagram showing further interactions between the Due Item Processing process component 130 and the Accounting process component 116 in the architectural design of FIG. 1. The interaction starts when a dunning is created or cancelled. The Due Item Processing process component 130 notifies the Accounting process component 116 about the creation or cancellation of dunnings, including dunning fees.

As shown in FIG. 34, the Due Item Processing process component 130 includes the Dunning business object 2902. The Dunning business object 2902 represents a reminder or demand from a company (creditor) to a business partner (debtor) to make a payment by a certain point in time. The Accounting process component 116 includes the Accounting Notification business object 564. The Accounting Notification business object 564 represents a notification sent to Financial Accounting by an operational component regarding a business transaction. It represents this operational business transaction in a standardized form for all business transaction documents and contains the data needed to valuate the business transaction. Updates in the Dunning business object 2902 can trigger messages to be sent to update the Accounting Notification business object 564.

An update in the Dunning business object 2902 may trigger a Notify of Dunning Invoice to Accounting outbound process agent 3402. The Notify of Dunning Invoice to Accounting outbound process agent 3402 invokes a Notify of Dunning Invoice operation 3404 or a Notify of Dunning Invoice Cancellation operation 3406. The Notify of Dunning Invoice operation 3404 and the Notify of Dunning Invoice Cancellation operation 3406 are included in a Dunning Invoice Accounting Out interface 3408. The Notify of Dunning Invoice to Accounting outbound process agent 3402 may invoke the Notify of Dunning Invoice operation 3404 to notify Accounting about dunning fees. The Notify of Dunning Invoice to Accounting outbound process agent 3402 may invoke the Notify of Dunning Invoice Cancellation operation 3406 to notify Accounting about the cancellation of dunning fees. The Notify of Dunning Invoice operation 3404 sends an Invoice Accounting Notification message 34 10 to the Accounting process component 116. The Invoice Accounting Notification message 3410 can be a notification about the creation of a new supplier invoice or a change to an existing supplier invoice. The Notify of Dunning Invoice Cancellation operation 3406 sends an Invoice Cancellation Accounting Notification message 3412 to the Accounting process component 116. The Invoice Cancellation Accounting Notification message 3412 can be a notification about the cancellation of a supplier invoice.

The messages 3410, 3412 are received by operations in the Accounting process component 116. A Create Accounting Document operation 3414 receives the Invoice Accounting Notification message 3410. A Cancel Accounting Document operation 3416 receives the Invoice Cancellation Accounting Notification message 3412. The Create Accounting Document operation 3414 creates an accounting document for a dunning invoice. For example, the accounting document can record receivables for the invoice in Financial Accounting. The Cancel Accounting Document operation 3416 receives dunning accounting cancellation requests from the Due Item Processing process component 130. The operations 3414, 3416 are included in a Dunning Invoice Accounting In interface 3418. The operations 3414, 3416 use a Maintain Accounting Document based on Dunning Invoice inbound process agent 3420 to update the Accounting Notification business object 564. For example, the updates can change the status of dunning changes to "released" or "canceled."

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:
1. A computer program product comprising instructions encoded on a non-transitory tangible machine-readable storage medium, the instructions being structured as process components interacting with each other through service interfaces, the instructions operable when executed by at least one processor to:
   define a plurality of process components, each of the process components comprising a modular and application-independent package of reusable granular software implementing a respective and distinct business process, the business process comprising functionality exposed by the process component via a corresponding service interface, the plurality of process components including:
      an accounting process component that records all relevant business transactions for valuation and profitability analysis;
      a financial accounting master data management process component that is responsible for the management of financial accounting master data that is used both for accounting and costing purposes;
      an outbound delivery processing process component that manages and processes the outbound delivery requirements for shipping goods to a product recipient;
      a site logistics processing process component that combines tasks concerning the preparation, physical execution, and confirmation of logistics processes within a site;
      an inventory processing process component that combines tasks required for the management of inventory and recording of inventory changes;
      a customer requirement processing process component that combines the tasks required for controlling customer requirements in the supply chain;
      a supply and demand matching process component that combines all the tasks necessary to ensure that sufficient material receipt elements exist to cover material demand, while taking available capacity into account;
      a logistics execution control process component that creates, controls and monitors the supply chain execution activities necessary for the fulfillment of an order on a macro logistics level;
      a due item processing process component that is used for the collection, management and monitoring of trade receivables or payables and corresponding sales or withholding tax;
      a balance of foreign payment management process component that is used for the collection, processing, and reporting of receivables and payables according to foreign trade regulations that are required by the central banks to create the balance of payments of a country;
      a payment processing process component that combines all the tasks necessary for the processing and management of all payments;
      a customer invoice processing process component that is used for invoicing a customer for the delivery of goods or the provision of services;
      a customer quote processing process component that is used to process quotes to customers offering the delivery of goods according to specific terms; and
      a sales order processing process component that handles customers' requests to a seller for the delivery of goods on a specific date, for a specific quantity, and for a specific price; and define a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based, pair-wise interaction between the respective process components of the respective operations, the pair-wise interactions between pairs of the process components including interactions between:

the payment processing process component and the accounting process component, where the pair-wise interaction between the payment processing process component and the accounting process component includes the transmission of:
  a payment accounting notification message from the payment processing process component to the accounting process component, the payment accounting notification message comprising a request to notify accounting of cash receipts and disbursements; and
  a payment cancellation accounting notification message from the payment processing process component to the accounting process component, the payment cancellation accounting notification message comprising a request to notify accounting about cancellation of cash receipts and disbursements;

the due item processing process component and the accounting process component, where the pair-wise interaction between the due item processing process component and the accounting process component includes the transmission of:
  a payment accounting notification message from the due item processing process component to the accounting process component, the payment accounting notification message comprising a notification for accounting of payments or clearings of trade and tax receivables or payables; and
  a payment cancellation accounting notification message from the due item processing process component to the accounting process component, the payment cancellation accounting notification message comprising a notification for accounting of payment or clearing cancellation for trade and tax receivables or payables;

the logistics execution control process component and the outbound delivery processing process component, where the pair-wise interaction between the logistics execution control process component and the outbound delivery processing process component includes the transmission of:
  a delivery request fulfillment request message from the logistics execution control process component to the outbound delivery processing process component, the delivery request fulfillment request message comprising a request associated with controlling, triggering, or monitoring a logistic process on a macro logistics level to fulfill an order; and
  a delivery request fulfillment confirmation message from the outbound delivery processing process component to the logistics execution control process component, the delivery request fulfillment confirmation message comprising a confirmation of data upon receipt of an inbound delivery request;

the outbound delivery processing process component and the customer invoice processing process component, where the pair-wise interaction between the outbound delivery processing process component and the customer invoice processing process component includes the transmission of:
  a customer invoice request message from the outbound delivery processing process component to the customer invoice processing process component, the customer invoice request message comprising a message sending a billing due notification to the customer invoice processing process component;

the sales order processing process component and the customer invoice processing process component, where the pair-wise interaction between the sales order processing process component and the customer invoice processing process component includes the transmission of:
  a customer invoice request message from the sales order processing process component to the customer invoice processing process component, the customer invoice request message comprising a request to create, update, or cancel an invoice from the customer invoice processing process component; and
  a customer invoice issued confirmation message from the customer invoice processing process component to the sales order processing process component, the customer invoice issued confirmation message comprising a confirmation of the creation, update, or cancellation of the corresponding invoice;

the customer invoice processing process component and the accounting process component, where the pair-wise interaction between the customer invoice processing process component and the accounting process component includes the transmission of:
  an invoice accounting notification message from the customer invoice processing process component to the accounting process component, the invoice accounting notification message comprising a notification for accounting of existence of a customer invoice;
  an invoice cancellation accounting notification message from the customer invoice processing process component to the accounting process component, the invoice cancellation accounting notification message comprising a notification for accounting of cancellation of a particular customer invoice;

the sales order processing process component and the accounting process component, where the pair-wise interaction between the sales order processing process component and the accounting process component includes the transmission of:
  a sales and purchasing accounting notification message from the sales order processing process component to the accounting process component, the sales and purchasing accounting notification message comprising a notification for the accounting process component of creation, change, or cancellation of a sales order;

the payment processing process component and the due item processing process component, where the pair-wise interaction between the payment processing process component and the due item processing process component includes the transmission of:

- a clearing request message from the payment processing process component to the due item processing process component, the clearing request message comprising a request to set a payment allocation status of a payment to cancelled;
- a clearing cancellation request message from the payment processing process component to the due item processing process component, the clearing cancellation request message comprising a request cancelling a previously sent clearing request by reference; and
- a clearing confirmation message from the due item processing process component to the payment processing process component, the clearing confirmation message comprising a confirmation or rejection of a clearing request;

the logistics execution control process component and the site logistics processing process component, where the pair-wise interaction between the logistics execution control process component and the site logistics processing process component includes the transmission of:

- a site logistics request message from the logistics execution control process component to the site logistics processing process component, the site logistics request message comprising a request to execute a site logistics process for a certain quantity of material by a certain time;
- a site logistics request confirmation message from the site logistics processing process component to the logistics execution control process component, the site logistics request confirmation message comprising a confirmation of receipt of a corresponding request to execute a site logistics process and acknowledgement of the request's quantities and delivery dates; and
- a site logistics request confirmation reconciliation notification message from the site logistics processing process component to the logistics execution control process component, the site logistics request confirmation reconciliation notification message comprising a notification to the logistics execution control process component of a reconciliation of a site logistics request confirmation;

the sales order processing process component and the customer requirement processing process component, where the pair-wise interaction between the sales order processing process component and the customer requirement process component includes the transmission of:

- a product available to promise check request message from the sales order processing process component to the customer requirement processing process component, the product available to promise check request message comprising a binding request to check the availability of specified amounts of specified materials at specified dates and to reply with a binding statement concerning which amounts of which materials are available at which dates;
- a product available to promise check confirmation message from the customer requirement processing process component to the sales order processing process component, the product available to promise check confirmation message comprising a confirmation of the availability of certain amounts of certain products at certain dates in response to the product available to promise check request message;
- a provisional customer requirement delete notification message from the sales order processing process component to the customer requirement processing process component, the provisional customer requirement delete notification message comprising a notification to delete provisional customer requirements at the customer requirement processing process component;
- a customer requirement fulfillment request message from the sales order processing process component to the customer requirement processing process component, the customer requirement fulfillment request message comprising a request to fulfill a sales order or the material flow-relevant parts of a service order;
- a product available to promise update notification message from the customer requirement processing process component to the sales order processing process component, the product available to promise update notification message comprising a notification to a creator of a customer requirement about an updated availability situation for products requested within the customer requirement;
- a customer requirement fulfillment confirmation message from the customer requirement processing process component to the sales order processing process component, the customer requirement fulfillment confirmation message comprising a confirmation partial or complete fulfillment of a customer requirement to a creator of the customer requirement;

the site logistics processing process component and the accounting process component, where the pair-wise interaction between the site logistics processing process component and the accounting process component includes the transmission of:

- an inventory change and activity confirmation accounting notification message from the site logistics processing process component to the accounting process component, the inventory change and activity confirmation accounting notification message comprising a notification of at least one confirmed logistic process change which results from the execution of a site logistics process at a specific time to cause the accounting process component to create at least one corresponding accounting document; and
- an inventory change and activity confirmation cancellation accounting notification from the site logistics processing process component to the accounting process component, the inventory change and activity confirmation cancellation accounting notification comprising notification of at least one cancelled logistic process change for the accounting process component;

the customer quote processing process component and the customer requirement processing process component, where the pair-wise interaction between the customer quote processing process component and the customer requirement processing process component includes the transmission of:

a product availability query message from the customer quote processing process component to the customer requirement processing process component, the product availability query message comprising a request for product availability information for customer quote items; and a product availability response message from the customer requirement processing process component to the customer quote processing process component, the product availability response message comprising a non-binding response as to which amounts of products are available at which dates in response to a product availability query message;

the due item processing process component and the payment processing process component, where the pair-wise interaction between due item processing process component and the payment processing process component includes the transmission of:

a payment order reservation request message from the due item processing process component to the payment processing process component, the payment order reservation request message comprising a request for payment information associated with a provisional reservation of money;

a payment order reservation confirmation message from the payment processing process component to the due item processing process component, the payment order reservation confirmation message comprising a confirmation of a payment order reservation request;

a payment order reservation change request message from the due item processing process component to the payment processing process component, the payment order reservation change request message comprising a request to change a reservation of payment;

a payment order reservation change confirmation message from the payment processing process component to the due item processing process component, the payment order reservation change confirmation message comprising a confirmation of a change to a payment order reservation in response to a payment order reservation change request;

a payment order reservation change cancellation notification message from the due item processing process component to the payment processing process component, the payment order reservation change cancellation notification message comprising a request to change a reservation of payment;

a payment order request message from the due item processing process component to the payment processing process component, the payment order request message comprising a request for creation of a request for payment;

a payment order cancellation request message from the due item processing process component to the payment processing process component, the payment order cancellation request message comprising a request for cancellation of a request for payment;

a payment order confirmation message from the payment processing process component to the due item processing process component, the payment order confirmation message comprising a confirmation of execution of a payment request or a payment cancellation request;

the customer invoice processing process component and the due item processing process component, where the pair-wise interaction between customer invoice processing process component and the due item processing process component includes the transmission of:

a receivables payables notification message from the customer invoice processing process component to the due item processing process component, the receivables payables notification message comprising a notification to the due item processing process component of an invoice in order to derive payment due data; and a receivables payables cancellation request message from the customer invoice processing process component to the due item processing process component, the receivables payables cancellation request message comprising notification of cancellation of an invoice to cancel the corresponding payment due data;

the sales order processing process component and the financial accounting master data management process component, where the pair-wise interaction between due item processing process component and the payment processing process component includes the transmission of:

a product and resource valuation query message from the sales order processing process component to the financial accounting master data management process component, the product and resource valuation query message comprising a request for a product valuation price of one or more goods or services included in an agreement between a seller and a buyer for delivery on a specific data, for a specific quantity, and for a specific price; and a product and valuation response message from the financial accounting master data management process component to the sales order processing process component, the product and valuation response message comprising a response to the request product and resource valuation query message including valuations for the one or more goods or services included in the agreement;

the inventory processing process component and the supply and demand matching process component, where the pair-wise interaction between the inventory processing process component and the supply and demand matching process component includes the transmission of:

a planning view of inventory reconciliation notification message from the inventory processing process component to the supply and demand matching process component, the planning view of inventory reconciliation notification message comprising a request for an inventory reconciliation at the supply and demand matching process component;

the customer quote processing process component and the financial accounting master data management process component, where the pair-wise interaction between the customer quote processing process component and the financial accounting master data management process component includes the transmission of:

a product and resource valuation query message from the customer quote processing process component to the financial accounting master data management process component, the product and resource valuation query message comprising a request for a product valuation of one or more goods or services included in an offer associated with a customer quote; and a product and resource valuation response message from the financial accounting master data management process component to the customer quote processing process component, the product and resource valuation response comprising a response to the product and resource valuation response message including valuations for the one or more goods or services included in the offer associated with the customer quote;

the site logistics processing process component and the site logistics processing process component;

the customer invoice processing process component and the balance of foreign payment management process component, where the pair-wise interaction between the customer invoice processing process component and the balance of foreign payment management process component includes the transmission of:

a foreign receivable payable notification message from the customer invoice processing process component to the balance of foreign payment management process component, the foreign receivable payable notification message comprising a notification of an invoice in order to track a receivable form, or a payable to, a non-resident business partner, where the balance of foreign payment management process component can create a corresponding foreign receivable or payable; and a foreign receivable payable cancellation request message from the customer invoice processing process component to the balance of foreign payment management process component, the foreign receivable payable cancellation request message comprising a notification of an invoice in order to cancel information about a receivable from, or a payable to, a non-resident business partner, and where the balance of foreign payment management process component can cancel a foreign receivable or payable; and the due item processing process component and the accounting process component, where the pair-wise interaction between customer quote processing process component and the financial accounting master data management process component includes the transmission of:

an invoice accounting notification from the due item processing process component to the accounting process component, the invoice accounting notification comprising a notification about the creation of a new supplier invoice or a change to an existing supplier invoice; and an invoice cancellation accounting notification from the due item processing process component to the accounting process component, the invoice cancellation accounting notification comprising a notification about cancellation of a supplier invoice; and store the defined process components and service interfaces in memory.

2. The product of claim 1, wherein:

the plurality of process components further includes:
a pricing engine process component that processes price and tax calculations; and a payment authorization process component that represents a reusable service that is used to process the authorization request for a payment made using a payment card at the clearing house; and the pair-wise interactions between pairs of the process components further include interactions between:
a bank statement creation at bank process component and the payment processing process component;
the customer quote processing process component and an RFQ processing at customer process component;
the customer invoice processing process component and a supplier invoice processing at customer process component;
the payment processing process component and a payment processing at business partner process component;
the payment processing process component and a payment order processing at house bank process component;
the outbound delivery processing process component and an inbound delivery processing at customer process component;
a purchase order processing at customer process component and the sales order processing process component;
the payment authorization process component and a settlement processing at clearing house process component;
the due item processing process component and the settlement processing at clearing house process component;
the pricing engine process component and an external tax calculation process component;
the payment processing process component and the payment processing at business partner process component; and
the outbound delivery processing process component and the inbound delivery processing at customer process component.

3. The product of claim 1, wherein:
each of the plurality of process components is assigned to exactly one deployment unit among multiple deployment units, and each deployment unit is deployable on a separate computer hardware platform independent of every other deployment unit; and
all interaction between a process component in one deployment unit and any other process component in any other deployment unit takes place through the respective service interfaces of the two process components.

4. The product of claim 3, wherein the deployment units comprise:
a financial accounting deployment unit that includes the accounting process component and the financial accounting master data management process component;
a production and site logistics execution deployment unit that includes the outbound delivery processing process component, the site logistics processing process component, and the inventory processing process component;
a supply chain control deployment unit that includes the customer requirement processing process component, the supply and demand matching process component, and the logistics execution control process component;
a due item management deployment unit that includes the balance of foreign payment management process component and the due item processing process component;

a payment deployment unit that includes the payment processing process component;

a customer invoicing deployment unit that includes the customer invoice processing process component; and a customer relationship management deployment unit that includes the customer quote processing process component and the sales order processing process component.

5. The product of claim 1, wherein:

each of the process components includes one or more business objects; and none of the business objects of any one of the process components interacts directly with any of the business objects included in any of the other process components.

6. The product of claim 5, wherein the business objects comprise a business process object.

7. The product of claim 5, wherein none of the business objects included in any one of the process components is included in any of the other process components.

8. The product of claim 1, further comprising a plurality of process agents, each process agent being either an inbound process agent or an outbound process agent, an inbound process agent being operable to receive a message from an inbound operation, an outbound process agent being operable to cause an outbound operation to send a message and each process agent being associated with exactly one process component.

9. The product of claim 8, wherein the inbound process agents comprise a first inbound process agent operable to start the execution of a business process step requested in a first inbound message by creating or updating one or more business object instances.

10. The product of claim 8, wherein the outbound process agents comprise a first asynchronous outbound process agent that is called after a business object that is associated with the first outbound process agent changes.

11. The product of claim 1, wherein the operations comprise synchronous and asynchronous operations.

12. A system, comprising:

a computer system comprising at least one hardware platform for executing computer instructions, the computer instructions structured as a plurality of process components interacting with each other through service interfaces, each hardware platform including at least one processor for executing the computer instructions;

memory storing a plurality of process components executable by the respective processor of the particular hardware platform, each of the process components comprising a modular and application-independent package of reusable, granular software implementing a respective and distinct business process, the business process comprising functionality exposed by the process component via at least one service interface, the plurality of process components including:

an accounting process component that records all relevant business transactions for valuation and profitability analysis;

a financial accounting master data management process component that is responsible for the management of financial accounting master data that is used both for accounting and costing purposes;

an outbound delivery processing process component that manages and processes the outbound delivery requirements for shipping goods to a product recipient;

a site logistics processing process component that combines tasks concerning the preparation, physical execution, and confirmation of logistics processes within a site;

an inventory processing process component that combines tasks required for the management of inventory and recording of inventory changes;

a customer requirement processing process component that combines the tasks required for controlling customer requirements in the supply chain;

a supply and demand matching process component that combines all the tasks necessary to ensure that sufficient material receipt elements exist to cover material demand, while taking available capacity into account;

a logistics execution control process component that creates, controls and monitors the supply chain execution activities necessary for the fulfillment of an order on a macro logistics level;

a due item processing process component that is used for the collection, management and monitoring of trade receivables or payables and corresponding sales or withholding tax;

a balance of foreign payment management process component that is used for the collection, processing, and reporting of receivables and payables according to foreign trade regulations that are required by the central banks to create the balance of payments of a country;

a payment processing process component that combines all the tasks necessary for the processing and management of all payments;

a customer invoice processing process component that is used for invoicing a customer for the delivery of goods or the provision of services;

a customer quote processing process component that is used to process quotes to customers offering the delivery of goods according to specific terms; and a sales order processing process component that handles customers' requests to a seller for the delivery of goods on a specific date, for a specific quantity, and for a specific price; and the memory further storing a plurality of service interfaces, each service interface associated with exactly one process component and comprising at least one operation, each being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based, pair-wise interaction between the respective process components of the respective operations, the pair-wise interactions between pairs of the process components including interactions between:

the payment processing process component and the accounting process component, where the pair-wise interaction between the payment processing process component and the accounting process component includes the transmission of:

a payment accounting notification message from the payment processing process component to the accounting process component, the payment accounting notification message comprising a request to notify accounting of cash receipts and disbursements; and a payment cancellation accounting notification message from the payment processing process component to the accounting process component, the payment cancellation accounting notification message comprising a request to notify accounting about cancellation of cash receipts and disbursements;

the due item processing process component and the accounting process component, where the pair-wise interaction between the due item processing process component and the accounting process component includes the transmission of:

a payment accounting notification message from the due item processing process component to the accounting process component, the payment accounting notification message comprising a notification for accounting of payments or clearings of trade and tax receivables or payables; and a payment cancellation accounting notification message from the due item processing process component to the accounting process component, the payment cancellation accounting notification message comprising a notification for accounting of payment or clearing cancellation for trade and tax receivables or payables;

the logistics execution control process component and the outbound delivery processing process component, where the pair-wise interaction between the logistics execution control process component and the outbound delivery processing process component includes the transmission of:

a delivery request fulfillment request message from the logistics execution control process component to the outbound delivery processing process component, the delivery request fulfillment request message comprising a request associated with controlling, triggering, or monitoring a logistic process on a macro logistics level to fulfill an order; and a delivery request fulfillment confirmation message from the outbound delivery processing process component to the logistics execution control process component, the delivery request fulfillment confirmation message comprising a confirmation of data upon receipt of an inbound delivery request;

the outbound delivery processing process component and the customer invoice processing process component, where the pair-wise interaction between the outbound delivery processing process component and the customer invoice processing process component includes the transmission of:

a customer invoice request message from the outbound delivery processing process component to the customer invoice processing process component, the customer invoice request message comprising a message sending a billing due notification to the customer invoice processing process component;

the sales order processing process component and the customer invoice processing process component, where the pair-wise interaction between the sales order processing process component and the customer invoice processing process component includes the transmission of:

a customer invoice request message from the sales order processing process component to the customer invoice processing process component, the customer invoice request message comprising a request to create, update, or cancel an invoice from the customer invoice processing process component; and a customer invoice issued confirmation message from the customer invoice processing process component to the sales order processing process component, the customer invoice issued confirmation message comprising a confirmation of the creation, update, or cancellation of the corresponding invoice;

the customer invoice processing process component and the accounting process component, where the pair-wise interaction between the customer invoice processing process component and the accounting process component includes the transmission of:

an invoice accounting notification message from the customer invoice processing process component to the accounting process component, the invoice accounting notification message comprising a notification for accounting of existence of a customer invoice;

an invoice cancellation accounting notification message from the customer invoice processing process component to the accounting process component, the invoice cancellation accounting notification message comprising a notification for accounting of cancellation of a particular customer invoice;

the sales order processing process component and the accounting process component, where the pair-wise interaction between the sales order processing process component and the accounting process component includes the transmission of:

a sales and purchasing accounting notification message from the sales order processing process component to the accounting process component, the sales and purchasing accounting notification message comprising a notification for the accounting process component of creation, change, or cancellation of a sales order;

the payment processing process component and the due item processing process component, where the pair-wise interaction between the payment processing process component and the due item processing process component includes the transmission of:

a clearing request message from the payment processing process component to the due item processing process component, the clearing request message comprising a request to set a payment allocation status of a payment to cancelled;

a clearing cancellation request message from the payment processing process component to the due item processing process component, the clearing cancellation request message comprising a request cancelling a previously sent clearing request by reference; and a clearing confirmation message from the due item processing process component to the payment processing process component, the clearing confirmation message comprising a confirmation or rejection of a clearing request;

the logistics execution control process component and the site logistics processing process component, where the pair-wise interaction between the logistics execution control process component and the site logistics processing process component includes the transmission of:
  a site logistics request message from the logistics execution control process component to the site logistics processing process component, the site logistics request message comprising a request to execute a site logistics process for a certain quantity of material by a certain time;
  a site logistics request confirmation message from the site logistics processing process component to the logistics execution control process component, the site logistics request confirmation message comprising a confirmation of receipt of a corresponding request to execute a site logistics process and acknowledgement of the request's quantities and delivery dates; and
  a site logistics request confirmation reconciliation notification message from the site logistics processing process component to the logistics execution control process component, the site logistics request confirmation reconciliation notification message comprising a notification to the logistics execution control process component of a reconciliation of a site logistics request confirmation;

the sales order processing process component and the customer requirement processing process component, where the pair-wise interaction between the sales order processing process component and the customer requirement process component includes the transmission of:
  a product available to promise check request message from the sales order processing process component to the customer requirement processing process component, the product available to promise check request message comprising a binding request to check the availability of specified amounts of specified materials at specified dates and to reply with a binding statement concerning which amounts of which materials are available at which dates;
  a product available to promise check confirmation message from the customer requirement processing process component to the sales order processing process component, the product available to promise check confirmation message comprising a confirmation of the availability of certain amounts of certain products at certain dates in response to the product available to promise check request message;
  a provisional customer requirement delete notification message from the sales order processing process component to the customer requirement processing process component, the provisional customer requirement delete notification message comprising a notification to delete provisional customer requirements at the customer requirement processing process component;
  a customer requirement fulfillment request message from the sales order processing process component to the customer requirement processing process component, the customer requirement fulfillment request message comprising a request to fulfill a sales order or the material flow-relevant parts of a service order;
  a product available to promise update notification message from the customer requirement processing process component to the sales order processing process component, the product available to promise update notification message comprising a notification to a creator of a customer requirement about an updated availability situation for products requested within the customer requirement;
  a customer requirement fulfillment confirmation message from the customer requirement processing process component to the sales order processing process component, the customer requirement fulfillment confirmation message comprising a confirmation partial or complete fulfillment of a customer requirement to a creator of the customer requirement;

the site logistics processing process component and the accounting process component, where the pair-wise interaction between the site logistics processing process component and the accounting process component includes the transmission of:
  an inventory change and activity confirmation accounting notification message from the site logistics processing process component to the accounting process component, the inventory change and activity confirmation accounting notification message comprising a notification of at least one confirmed logistic process change which results from the execution of a site logistics process at a specific time to cause the accounting process component to create at least one corresponding accounting document; and
  an inventory change and activity confirmation cancellation accounting notification from the site logistics processing process component to the accounting process component, the inventory change and activity confirmation cancellation accounting notification comprising notification of at least one cancelled logistic process change for the accounting process component;

the customer quote processing process component and the customer requirement processing process component, where the pair-wise interaction between the customer quote processing process component and the customer requirement processing process component includes the transmission of:
  a product availability query message from the customer quote processing process component to the customer requirement processing process component, the product availability query message comprising a request for product availability information for customer quote items; and
  a product availability response message from the customer requirement processing process component to the customer quote processing process component, the product availability response message comprising a non-binding response as to which amounts of products are available at which dates in response to a product availability query message;

the due item processing process component and the payment processing process component, where the pair-wise interaction between due item processing process component and the payment processing process component includes the transmission of:
  a payment order reservation request message from the due item processing process component to the payment processing process component, the payment order reservation request message comprising a request for payment information associated with a provisional reservation of money;

a payment order reservation confirmation message from the payment processing process component to the due item processing process component, the payment order reservation confirmation message comprising a confirmation of a payment order reservation request;

a payment order reservation change request message from the due item processing process component to the payment processing process component, the payment order reservation change request message comprising a request to change a reservation of payment;

a payment order reservation change confirmation message from the payment processing process component to the due item processing process component, the payment order reservation change confirmation message comprising a confirmation of a change to a payment order reservation in response to a payment order reservation change request;

a payment order reservation change cancellation notification message from the due item processing process component to the payment processing process component, the payment order reservation change cancellation notification message comprising a request to change a reservation of payment;

a payment order request message from the due item processing process component to the payment processing process component, the payment order request message comprising a request for creation of a request for payment;

a payment order cancellation request message from the due item processing process component to the payment processing process component, the payment order cancellation request message comprising a request for cancellation of a request for payment;

a payment order confirmation message from the payment processing process component to the due item processing process component, the payment order confirmation message comprising a confirmation of execution of a payment request or a payment cancellation request;

the customer invoice processing process component and the due item processing process component, where the pair-wise interaction between customer invoice processing process component and the due item processing process component includes the transmission of:

a receivables payables notification message from the customer invoice processing process component to the due item processing process component, the receivables payables notification message comprising a notification to the due item processing process component of an invoice in order to derive payment due data; and a receivables payables cancellation request message from the customer invoice processing process component to the due item processing process component, the receivables payables cancellation request message comprising notification of cancellation of an invoice to cancel the corresponding payment due data;

the sales order processing process component and the financial accounting master data management process component, where the pair-wise interaction between due item processing process component and the payment processing process component includes the transmission of:

a product and resource valuation query message from the sales order processing process component to the financial accounting master data management process component, the product and resource valuation query message comprising a request for a product valuation price of one or more goods or services included in an agreement between a seller and a buyer for delivery on a specific data, for a specific quantity, and for a specific price; and a product and valuation response message from the financial accounting master data management process component to the sales order processing process component, the product and valuation response message comprising a response to the request product and resource valuation query message including valuations for the one or more goods or services included in the agreement;

the inventory processing process component and the supply and demand matching process component, where the pair-wise interaction between the inventory processing process component and the supply and demand matching process component includes the transmission of:

a planning view of inventory reconciliation notification message from the inventory processing process component to the supply and demand matching process component, the planning view of inventory reconciliation notification message comprising a request for an inventory reconciliation at the supply and demand matching process component;

the customer quote processing process component and the financial accounting master data management process component, where the pair-wise interaction between the customer quote processing process component and the financial accounting master data management process component includes the transmission of:

a product and resource valuation query message from the customer quote processing process component to the financial accounting master data management process component, the product and resource valuation query message comprising a request for a product valuation of one or more goods or services included in an offer associated with a customer quote; and a product and resource valuation response message from the financial accounting master data management process component to the customer quote processing process component, the product and resource valuation response comprising a response to the product and resource valuation response message including valuations for the one or more goods or services included in the offer associated with the customer quote;

the site logistics processing process component and the site logistics processing process component;

the customer invoice processing process component and the balance of foreign payment management process component, where the pair-wise interaction between the customer invoice processing process component and the balance of foreign payment management process component includes the transmission of:

a foreign receivable payable notification message from the customer invoice processing process component to the balance of foreign payment management process component, the foreign receivable payable notification message comprising a notification of an invoice in order to track a receivable form, or a payable to, a non-resident business partner, where the balance of foreign payment management process component can create a corresponding foreign receivable or payable; and a foreign receivable payable cancellation request message from the customer invoice processing process component to the balance of foreign payment management process component, the foreign receivable payable cancellation request message comprising a notification of an invoice in order to cancel information about a receivable from, or a payable to, a non-resident business partner, and where the balance of foreign payment management process component can cancel a foreign receivable or payable; and the due item processing process component and the accounting process component, where the pair-wise interaction between customer quote processing process component and the financial accounting master data management process component includes the transmission of:

an invoice accounting notification from the due item processing process component to the accounting process component, the invoice accounting notification comprising a notification about the creation of a new supplier invoice or a change to an existing supplier invoice; and an invoice cancellation accounting notification from the due item processing process component to the accounting process component, the invoice cancellation accounting notification comprising a notification about cancellation of a supplier invoice.

13. The system of claim 12, wherein:
the plurality of process components further includes:
a pricing engine process component that processes price and tax calculations; and
a payment authorization process component that represents a reusable service that is used to process the authorization request for a payment made using a payment card at the clearing house; and
the pair-wise interactions between pairs of the process components include interactions between:
a bank statement creation at bank process component and the payment processing process component;
the customer quote processing process component and an RFQ processing at customer process component;
the customer invoice processing process component and a supplier invoice processing at customer process component;
the payment processing process component and a payment processing at business partner process component;
the payment processing process component and a payment order processing at house bank process component;
the outbound delivery processing process component and an inbound delivery processing at customer process component;
a purchase order processing at customer process component and the sales order processing process component;
the payment authorization process component and a settlement processing at clearing house process component;
the due item processing process component and the settlement processing at clearing house process component;
the pricing engine process component and an external tax calculation process component;
the payment processing process component and the payment processing at business partner process component; and
the outbound delivery processing process component and the inbound delivery processing at customer process component.

14. The system of claim 12, wherein:
each of the process components includes one or more business objects; and
none of the business objects of any one of the process components interacts directly with any of the business objects included in any of the other process components.

15. The system of claim 12, wherein none of the business objects included in any one of the process components is included in any of the other process components.

16. The system of claim 12, further comprising a plurality of process agents, each process agent being either an inbound process agent or an outbound process agent, an inbound process agent being operable to receive a message from an inbound operation, an outbound process agent being operable to cause an outbound operation to send a message and each process agent being associated with exactly one process component.

17. The system of claim 12, the system comprising multiple hardware platforms, wherein:
the accounting process component and the financial accounting master data management process component are deployed on a first hardware platform;
the outbound delivery processing process component, the site logistics processing process component, and the inventory processing process component are deployed on a second hardware platform;
the customer requirement processing process component, the supply and demand matching process component, and the logistics execution control process component are deployed on a third hardware platform;
the balance of foreign payment management process component and the due item processing process component are deployed on a fourth hardware platform;
the payment processing process component is deployed on a fifth hardware platform;
the customer invoice processing process component is deployed on a sixth hardware platform; and
the customer quote processing process component and the sales order processing process component are deployed on a seventh hardware platform.

18. The system of claim 17, wherein each of the first through the seventh hardware platforms are distinct and separate from each other.

* * * * *